(12) United States Patent
Derfler et al.

(10) Patent No.: US 10,896,786 B2
(45) Date of Patent: Jan. 19, 2021

(54) PROCESSES AND SYSTEMS FOR SUPERCAPACITOR STACK FABRICATION

(71) Applicant: POCELL TECH LTD., Netanya (IL)

(72) Inventors: Frederic Derfler, Haifa (IL); Ervin Tal-Gutelmacher, Hod HaSharon (IL); Mordechay Moshkovich, Ra'anana (IL); Tamir Stein, Ariel (IL)

(73) Assignee: POCELL TECH LTD., Netanya (IL)

( * ) Notice: Subject to any disclaimer, the term of this patent is extended or adjusted under 35 U.S.C. 154(b) by 0 days.

(21) Appl. No.: 16/475,151

(22) PCT Filed: Dec. 28, 2017

(86) PCT No.: PCT/IL2017/051397
§ 371 (c)(1),
(2) Date: Jul. 1, 2019

(87) PCT Pub. No.: WO2018/122851
PCT Pub. Date: Jul. 5, 2018

(65) Prior Publication Data
US 2019/0333717 A1    Oct. 31, 2019

(30) Foreign Application Priority Data

Dec. 29, 2016 (IL) .......................... 249865
Jan. 19, 2017 (IL) .......................... 250208

(51) Int. Cl.
*H01G 4/06* (2006.01)
*H01G 11/86* (2013.01)
(Continued)

(52) U.S. Cl.
CPC ............. *H01G 11/86* (2013.01); *H01G 11/12* (2013.01); *H01G 11/26* (2013.01); *H01G 11/70* (2013.01)

(58) Field of Classification Search
CPC ........ H01G 4/12; H01G 4/1218; H01G 4/248; H01G 4/30; H01G 4/38; H01G 4/385;
(Continued)

(56) References Cited

U.S. PATENT DOCUMENTS 4,552,823 A   11/1985  Wozniak
5,595,839 A   1/1997   Hossain
(Continued)

FOREIGN PATENT DOCUMENTS

CA         2829224 A1    9/2012
DE    102013013291 A1    2/2015
(Continued)

OTHER PUBLICATIONS

International Search Report for PCT/12017/051397, dated Aug. 30, 2018 (7 pages).
(Continued)

*Primary Examiner* — Brook Kebede
(74) *Attorney, Agent, or Firm* — Roach, Brown, McCarthy & Gruber, P.C.; Kevin D. McCarthy

(57) ABSTRACT

The present invention provides a process for fabricating an n-cell supercapacitor stack, including a step of providing at least n+1 identical, or substantially identical, electrically inert conductive sheets having a defined perimeter, n identical, or substantially identical, ion-permeable insulating sheets having a defined perimeter, n identical, or substantially identical, first electrodes having a defined perimeter, n identical, or substantially identical, second electrodes having a defined perimeter, and at least n matching dielectric frames having an outer perimeter, which is larger than the perimeter of the conductive sheet and the perimeter of the insulating sheet; a step of assembling the supercapacitor stack, a step of disposing an additional conductive sheet on top of the nth second electrode; and a step of attaching
(Continued)

adjacent units onto one another, such that at least one of the frames within each unit is attached to at least one of the frames within each respective unit adjacent thereto. Further provided is a sealing system for use in fabricating a supercapacitor stack, which includes matching current collectors and separators having externally extending framing structures.

20 Claims, 40 Drawing Sheets

(51) Int. Cl.
*H01G 11/12* (2013.01)
*H01G 11/26* (2013.01)
*H01G 11/70* (2013.01)

(58) Field of Classification Search
CPC ........ H01G 11/86; H01G 11/12; H01G 11/26; H01G 11/70
USPC ...................... 361/303, 313, 321.2, 328, 330
See application file for complete search history.

(56) References Cited

U.S. PATENT DOCUMENTS

| | | | |
|---|---|---|---|
| 6,152,970 A | 11/2000 | Wei et al. | |
| 6,377,441 B1 | 4/2002 | Ohya et al. | |
| 6,773,468 B2 | 8/2004 | Lang | |
| 9,190,221 B2 | 11/2015 | Kokotov et al. | |
| 9,330,855 B2 | 5/2016 | Kokotov et al. | |
| 2002/0051335 A1 | 5/2002 | Ohya et al. | |
| 2003/0194605 A1 | 10/2003 | Fauteux et al. | |
| 2004/0233613 A1 | 11/2004 | Kasahara et al. | |
| 2006/0120020 A1* | 6/2006 | Dowgiallo, Jr. | H01G 4/1218 361/313 |
| 2006/0286450 A1 | 12/2006 | Yoon et al. | |
| 2007/0042264 A1 | 2/2007 | Desilvestro et al. | |
| 2009/0168300 A1* | 7/2009 | Birkle | H01G 4/385 361/328 |
| 2013/0029205 A1 | 1/2013 | Adams et al. | |
| 2013/0209850 A1 | 8/2013 | Yokoyama et al. | |
| 2014/0287277 A1 | 9/2014 | Mehta et al. | |
| 2015/0049416 A1 | 2/2015 | Kokotov et al. | |

FOREIGN PATENT DOCUMENTS

| | | |
|---|---|---|
| EP | 1744383 A1 | 1/2007 |
| JP | H1050556 A | 2/1998 |
| JP | 2001196276 A | 7/2001 |
| JP | 2007227425 A | 9/2007 |
| JP | 2007317812 A | 12/2007 |
| JP | 4940718 B2 | 5/2012 |
| WO | 2013160932 A1 | 10/2013 |
| WO | 2018122850 A2 | 7/2018 |

OTHER PUBLICATIONS

Written Opinion of the International Searching Authority for PCT/IL2017/051397, dated Aug. 30, 2018 (14 pages).

* cited by examiner

View A-A

View B-B

View C-C

View D-D

PROCESSES AND SYSTEMS FOR SUPERCAPACITOR STACK FABRICATION

FIELD OF THE INVENTION

The invention, in some embodiments, relates to the field of supercapacitors and more particularly, but not exclusively, to processes and systems for manufacturing supercapacitor stacks.

BACKGROUND OF THE INVENTION

An electric double-layer capacitor (EDLC), also known as a "supercapacitor" or "ultracapacitor", is a type of electrochemical capacitor. A basic EDLC cell configuration is a pair of highly porous electrodes, disposed on opposite faces of parallel conductive plates. The electrodes are impregnated with an electrolyte, and separated by a separator consisting of a porous electrically-insulating and ion-permeable membrane. When a voltage is applied between the electrodes, negative ions from the electrolyte flow to the positive electrode while positive ions from the electrolyte flow to the negative electrode, such that an electric double layer is formed at each electrode/electrolyte interface by the accumulated ionic charges. As a result, energy is stored by the separation of positive and negative charges at each interface. When the EDLC is discharged, the voltage across the electrodes results in current flow as the ions discharge from the electrode surfaces. An EDLC has a far longer lifespan than a battery and can undergo many more charge cycles with little degradation. EDLCs are also environmentally friendly (have a long lifespan and are recyclable), safe (no corrosive electrolytes and other toxic materials r), lightweight, and have a very low internal resistance (ESR). The charging process of an EDLC is also relatively simple, as the EDLC charges only to the required voltage and is therefore not subject to overcharging.

Supercapacitors, despite the beneficial features, still present some disadvantages. One of said drawbacks is the electrolyte leakage from the elements of the supercapacitors, said leakage decreases the energy storage capability of the supercapacitor and the cycle life thereof. Furthermore, during operation at high operating temperatures and/or high operating voltages, various potentially detrimental parasitic effects tend to occur. In particular, electrochemical reactions cause excessive pressures in the electrode composition, resulting in the discharge of gases. The built up pressures from the discharged gases could result in swelling or bursting of the capacitor elements.

U.S. Pat. No. 9,190,221 to some of the inventors of the present invention is directed to an electric double-layer capacitor and method for manufacturing thereof, wherein the ELDC includes at least one capacitor cell with two parallel current collectors, two opposite polarity electrodes, a separator, a rigid dielectric frame, and at least one evacuation mechanism. The frame is disposed along the perimeter on the surface of a current collector and enclosing the electrodes. The evacuation mechanism removes superfluous fluid material from the capacitor cell interior. The evacuation mechanism may be a compartment in the frame, operative to collect residual electrolyte that seeps out from the electrodes, or a capillary formed within the frame and extending into a portion of the electrode, the capillary composed of a porous hydrophobic material and operative to evacuate discharged gases from the electrodes out of the EDLC.

US Patent Application Publication No. 2014/0287277 is directed to energy storage structures and fabrication methods including providing first and second conductive sheet portions separated by a permeable separator sheet, and defining, at least in part, outer walls of the energy storage structure, the first and second surface regions of the first and second conductive sheet portions including first and second electrodes facing first and second (opposite) surfaces of the permeable separator sheet; forming an electrolyte receiving chamber, defined, at least in part, by the first and second surface regions, including: bonding the first and second conductive sheet portions, and the permeable separator sheet together with at least one bonding border forming a bordering frame around at least a portion of the first and second electrodes; and providing an electrolyte within the electrolyte receiving chamber, including in contact with the first and second electrodes, with the electrolyte being capable of passing through the permeable separator sheet.

U.S. Pat. No. 6,773,468 is directed to a preparation method for an electrochemical capacitor cell that includes: a pair of current collector plates placed in parallel; flat electrodes containing aqueous electrolyte printed on opposing faces of the current collectors; and a separator intersposed between the electrodes. The electrodes are printed such that a peripheral region not covered by the electrode is defined on each of the faces of the current collectors.

The separator includes a central region permeable to the electrolyte surrounded by a peripheral masked region nonpermeable to the electrolyte, where the permeable region coincides with the electrodes. A sealant is impregnated in the pores in the peripheral region of the separator. At least one layer of adhesive is deposited on the sealant.

There still exists an unmet need for a cost-efficient and reliable supercapacitor, having enhanced mechanical and electrochemical stability and high energy storage capability and a convenient and easily automatable process for the manufacturing thereof.

SUMMARY OF THE INVENTION

Aspects of the invention, in some embodiments thereof, relate to supercapacitors. More specifically, aspects of the invention, in some embodiments thereof, relate to methods and apparatuses for supercapacitor stack manufacture.

The present invention, in some embodiments thereof, is directed to methods and apparatuses for the manufacture of supercapacitors highly resistant to swelling and to bursting at high operating temperatures and/or high operating voltages, and with a low rate of electrolyte leakage and resultant short-circuits, thereby potentially increasing the service lifetime and reliability thereof. Advantageously, the present invention allows fabrication of supercapacitor stacks which have improved sealing, as compared to the currently available multiunit supercapacitors, in particular, those vertically stacked in a rectangular case. Said improved sealing, which reduces swelling and electrolyte leakage is afforded, inter alia, by providing matching dielectric frames, having an outer perimeter which is larger than the perimeter of the current collectors of the supercapacitor stack, assembling the supercapacitor units such that each unit comprises at least one frame, which extends beyond the edge of the current collector throughout the entire perimeter of the current collector, and attaching adjacent units of the supercapacitor onto one another, such that at least one of the frames within each unit is attached to at least one of the frames within each respective unit adjacent thereto. Provision and attachment of said dielectric frames ensure electric insulation between the electrodes and provide effective sealing of the supercapacitor cells and stack as a whole, by forming continuous external insulating case, which protects the stack from chemical and mechanical degradation, e.g., by electrolyte leakage.

The present invention, in some embodiments thereof, is directed to methods and apparatuses facilitating increased control in the placing and positioning of supercapacitor components during the manufacturing process thereof. In some embodiments, the dielectric frames are mutually self-aligning, such as, for example, including an identical, or substantially identical, geometrical feature, which facilitates assembly, alignment and fixation of the supercapacitor components, e.g., current collectors and separators, which are in contact with said frames, during stack fabrication. The mutually self-aligning dielectric frames therefore not only afford for the improved sealing of the supercapacitor cells and stacks but also allow optimization of the manufacturing process of the supercapacitor stacks, promoting its automation and simplifying quality control.

Thus, according to an aspect of some embodiments, there is provided a process for fabricating an n-cell supercapacitor stack. The process includes:

A step of providing
- at least n+1 identical, or substantially identical, electrically inert conductive sheets having a defined perimeter.
- n identical, or substantially identical, ion-permeable insulating sheets having a defined perimeter.
- n identical, or substantially identical, first electrodes having a defined perimeter.
- n identical, or substantially identical, second electrodes having a defined perimeter.
- At least n matching dielectric frames. Each of the dielectric frames has an inner perimeter, which is smaller than the perimeter of the conductive sheet, and/or the perimeter of the insulating sheet, and which is larger than the perimeter of the first electrode and the perimeter of the second electrode. Each of the dielectric frames further has an outer perimeter, which is larger than the perimeter of the conductive sheet and the perimeter of the insulating sheet.

A step of assembling the supercapacitor stack, including:
Assembling n units each on top of the other. Each unit includes a conductive sheet, a first electrode, an insulating sheet, a second electrode, and at least one frame. The first electrode is disposed between, and aligned with, the conductive sheet and the insulating sheet. The second electrode is disposed between, and aligned with, the insulating sheet and a conductive sheet of the adjacent unit.

Disposing an additional conductive sheet on top of the nth second electrode.

A step of attaching adjacent units onto one another, such that at least one of the frames within each unit is attached to at least one of the frames within each respective unit adjacent thereto.

According to some currently preferred embodiments of the process, during the step of assembling the supercapacitor stack, the at least one frame extends beyond the edge of the conductive sheet throughout the entire perimeter of the conductive sheet. In further embodiments, the at least one frame extends beyond the edge of the insulating sheet throughout the entire perimeter of the insulating sheet.

According to some embodiments of the process, a width of the portion of the dielectric frame which extends beyond the edge of the conductive sheet constitutes at least about 12.5% of the total width of the dielectric frame.

According to some embodiments of the process, a width of the portion of the dielectric frame which extends beyond the edge of the insulating sheet constitutes at least about 20% of the total width of the dielectric frame.

According to some embodiments of the process, the dielectric frames are identical. According to some embodiments of the process, the outer perimeter of the dielectric frame is larger than the perimeter of the conductive sheet by at least about 25%.

According to some embodiments of the process, the outer perimeter of the dielectric frame is larger than the perimeter of the insulating sheet by at least about 40%.

According to some embodiments of the process, the step of assembling the supercapacitor stack comprises aligning the dielectric frame with at least one of the conductive sheet and the insulating sheet. In further embodiments, the dielectric frame is aligned concentrically with the at least one the conductive sheet and the insulating sheet.

According to some embodiments of the process, each of the dielectric frames includes an identical, or substantially identical, geometrical feature rendering the dielectric frames mutually self-aligning.

According to some embodiments of the process, the geometrical feature is in the form of a wave-like projection extending fully there around the dielectric frame.

According to some embodiments of the process, the at least one frame is disposed between the conductive sheet and the insulating sheet, or between the insulating sheet and the conductive sheet of the adjacent unit.

According to some embodiments of the process, the conductive sheet and the dielectric frame within each unit are provided attached onto one another in the form of a framed current collector with an externally extending framing structure.

According to some embodiments of the process, at least some of the units include two dielectric frames: a first frame and a second frame. The first frame is disposed below the conductive sheet of the unit, and the second frame is disposed between the conductive sheet and the insulating sheet of the unit. The step of attaching further includes attaching the first frame to the second frame.

According to some embodiments of the process, each of the units includes two dielectric frames: a first frame and a second frame. The conductive sheet and the two dielectric frames within each unit are provided in the form of a framed current collector with an externally extending framing structure, such that the two dielectric frames are attached onto one another with the conductive sheet sandwiched there between.

According to some embodiments of the process, at least some of the units include three dielectric frames: a first frame, a second frame, and a third frame. The first frame is disposed below the conductive sheet of the unit, the second frame is disposed between the conductive sheet and the insulating sheet of the unit, and the third frame is disposed above the insulating sheet of the unit, or the first frame is disposed below the conductive sheet of the unit, and the second frame and the third frame are disposed between the insulating sheet and the conductive sheet of the unit. The step of attaching further includes attaching the first frame to the second frame and the second frame to the third frame.

According to some embodiments of the process, each of the units includes three dielectric frames: a first frame, a second frame, and a third frame. The conductive sheet and the first frame within each unit are provided in the form of a framed current collector with an externally extending framing structure. The insulating sheet, the second frame, and the third frame within each unit are provided in the form of a framed separator with an externally extending framing structure, such that the second frame and third frame are attached onto one another with the insulating sheet sandwiched there between.

According to some embodiments of the process, at least some of the units include four dielectric frames: a first frame, a second frame, a third frame, and a fourth frame. The first frame is disposed below the conductive sheet of the unit. The second frame and the third frame are disposed between the conductive sheet and the insulating sheet of the unit. The fourth frame is disposed above the insulating sheet of the unit. The step of attaching further includes attaching the first frame to the second frame, the second frame to the third frame, and the third frame to the fourth frame.

According to some embodiments of the process, each of the units includes four dielectric frames: a first frame, a second frame, a third frame, and a fourth frame. The conductive sheet, the first frame, and the second frame within each unit are provided in the form of a framed current collector with an externally extending framing structure, such that the first frame and second frame are attached onto one another with the conductive sheet sandwiched there between. The insulating sheet, the third frame, and the fourth frame within each unit are provided in the form of a framed separator with an externally extending framing structure, such that the third frame and fourth frame are attached onto one another with the insulating sheet sandwiched there between.

According to some embodiments of the process, additional n−1 conductive sheets are provided. Each unit includes one of the additional conductive sheets disposed above the second electrode thereof, thereby rendering the unit into a supercapacitor cell, and thereby fabricating the n-cell supercapacitor stack in a distinct-cell configuration.

According to some embodiments of the process, the top conductive sheet, disposed on top of nth insulating sheet, is provided together with one or two dielectric frames, in the form of a framed current collector with an externally extending framing structure. The step of providing further includes providing additional n−1 framed current collectors, each with an externally extending framing structure. Each of the first n−1 units further includes a respective one of the additional framed current collectors on a top thereof. The step of attaching further includes attaching the framing structure of the top framed current collector within a unit to the dielectric frame adjacent thereto from below, thereby rendering the unit into a supercapacitor cell, and thereby fabricating the n-cell supercapacitor stack in a distinct-cell configuration.

According to some embodiments of the process, the process further includes disposing filling material on the top conductive sheet in the cell prior to the attachment of the top dielectric frame in a cell to the bottom dielectric frame in a cell adjacent from above.

According to some embodiments of the process, the step of assembling precedes the step of attaching.

According to some embodiments of the process, the step of assembling is effected simultaneously with at a least a part of the step of attaching.

According to some embodiments of the process, the step of attaching includes two substeps:
  A first substep, effected simultaneously with the step of assembling, wherein an initial attachment is formed.
  A second substep, wherein the initial attachment is strengthened.

According to some embodiments of the process, the forming of the initial attachment establishes a physical connection between the dielectric frames thereby attached, and the strengthening of the attachment establishes a chemical connection between the dielectric frames thereby attached.

According to some embodiments of the process, the forming of the initial attachment is effected by heat-pressing and the strengthening of the attachment is effected by heat-fusing adjacent dielectric frames onto one another.

According to some embodiments of the process, the strengthening of the attachment seals the supercapacitor stack.

According to some embodiments of the process, each of the first electrodes is provided already applied to the top surface of a respective one of conductive sheets, or applied to the bottom surface of a respective one of the insulating sheets. Each of the second electrodes is provided already applied to the top surface of a respective one of insulating sheets, or applied to the bottom surface of a respective one of the conductive sheets. The application process is selected from the group consisting of pressing, printing, 3D printing, coating, and casting.

According to some embodiments of the process, the first electrodes and the second electrodes are identical, the fabricated supercapacitor stack being thereby configured symmetrically.

According to some embodiments of the process, the first electrodes and the second electrodes are not identical, the fabricated supercapacitor stack being thereby configured asymmetrically.

According to some embodiments of the process, the step of assembling, and/or the step of attaching, further includes pressing the partially or fully assembled supercapacitor stack to remove potential excesses of electrolyte, and to force out air, from the partially or fully assembled supercapacitor stack.

According to some embodiments of the process, the step of attaching includes lowering a heating mold over the assembled supercapacitor stack, with the supercapacitor stack being aligned with the heating mold. The heating mold includes:
  Vertical mold inner walls defining a mold inner perimeter substantially equal to, or slightly smaller than, the outer perimeters of the dielectric frames.
  A heating element configured to heat the mold inner walls.
  The mold inner walls are heated, thereby heating at least a portion of the assembled supercapacitor stack.

According to some embodiments of the process, the mold inner perimeter is slightly smaller than the outer perimeters of the dielectric frames of the assembled supercapacitor stack, and the lowering of the heating mold trims off respective rim portions of the dielectric frames.

According to some embodiments of the process, a mold bottom of the heating mold is configured for cutting.

According to some embodiments of the process, the mold bottom is sharp.

According to some embodiments of the process, an inner edge of the mold bottom is convex.

According to some embodiments of the process, the mold inner walls are heated to a temperature slightly below the thermal decomposition temperature of the dielectric material from which the dielectric frames are made.

According to some embodiments of the process, the dielectric frames are made of PVC and the mold inner walls are heated to a temperature of about 225° (degrees Celsius).

According to some embodiments of the process, prior to the lowering of the heating mold, the supercapacitor stack is placed on a base top surface of a placement base, such as to be aligned relative thereto. The placement base has vertical sidewalls and a placement base perimeter of substantially equal dimensions to the mold inner perimeter.

According to some embodiments of the process, each of the dielectric frames includes an identical, or substantially identical, geometrical feature rendering the dielectric frames mutually self-aligning. The base top surface includes a jig, such as to facilitate aligning the supercapacitor stack on the base top surface.

According to some embodiments of the process, the geometrical feature of the dielectric frames is in the form of a wave-like projection extending fully there around the dielectric frame.

According to an aspect of some embodiments, there is provided a supercapacitor stack fabricated by the process as described in the various embodiments herein above. According to some embodiments, said supercapacitor stack is fluidly sealed.

According to an aspect of some embodiments, there is provided a sealing system for use in fabricating a supercapacitor stack, which includes matching current collectors and separators having externally extending framing structures. The sealing system includes a placement base, a securing fixture, and a heating mold. The placement base includes a base top surface, configured for placing thereon a pre-sealed supercapacitor stack, and base sidewalls defining a base perimeter. The securing fixture includes a fixture bottom surface and fixture sidewalls defining a fixture perimeter. The securing fixture is configured for controllable maneuvering thereof such as to allow pressing the fixture bottom surface against a top surface of a supercapacitor stack placed on the base top surface, thereby securing the pre-sealed supercapacitor stack on the placement base. The heating mold includes a mold top, a mold bottom, mold sidewalls, vertical mold inner walls, and at least one heating element configured to heat the mold inner walls. The mold inner walls define a mold inner perimeter, which is substantially equal to the base perimeter and larger than, or substantially equal to, the fixture perimeter, and a mold inner space, open from above and from below. The heating mold is controllably switchable between at least two configurations:
  a first configuration wherein the mold bottom is elevated relative to the placement base top surface; and
  a second configuration wherein the mold bottom is substantially level with, or slightly below, the placement base top surface;
thereby allowing to lower the heating mold on a supercapacitor stack, secured on the placement base, and apply heat to at least a portion of the pre-sealed supercapacitor stack.

According to some embodiments of the sealing system, the heating mold is controllably switchable between at least three configurations: the first configuration, the second configuration, and a third configuration wherein the mold top is substantially level with, or positioned below, the placement base top surface.

According to some embodiments of the sealing system, the fixture bottom surface includes a central surface and a peripheral surface surrounding the central surface. The central surface is slightly depressed relative to an outer edge of the peripheral surface. The securing fixture is thereby configured to apply pressure on a top surface of a supercapacitor stack, secured on the placement base, such that force is directly applied only on a top side of a framing structure of a top current collector in the supercapacitor stack.

According to some embodiments of the sealing system, the securing fixture is configured to allow heating the peripheral surface of the fixture bottom surface, and the placement base is configured to allow heating an area on the base top surface facing the peripheral surface. The peripheral surface and the area on the base top surface having about equal lateral dimensions. The sealing system is thereby configured to apply heat to a framing structure of a top current collector and a framing structure of a bottom current collector in a pre-sealed supercapacitor stack, secured on the sealing system, during the sealing thereof.

According to some embodiments of the sealing system, the placement base top surface and the fixture bottom surface include matching respective geometrical features configured to function as jigs for the placement and securing, respectively, of a pre-sealed supercapacitor stack which includes self-aligning current collectors and self-aligning separators, each having respective geometrical features matching from below the geometrical feature of the base top surface and matching from above the geometrical feature of the fixture bottom surface.

According to some embodiments of the sealing system, the geometrical feature of the base top surface includes a wave-like projection and the geometrical feature of the fixture bottom surface includes a depression matching the wave-like projection.

According to some embodiments of the sealing system, the mold bottom is configured for cutting.

According to some embodiments of the sealing system, the mold bottom is sharp.

According to some embodiments of the sealing system, an inner edge of the mold bottom is convex.

According to some embodiments of the sealing system, the at least one heating element is further configured to heat the mold bottom.

Certain embodiments of the present invention may include some, all, or none of the above advantages. Further advantages may be readily apparent to those skilled in the art from the figures, descriptions, and claims included herein. Aspects and embodiments of the invention are further described in the specification hereinbelow and in the appended claims.

Unless otherwise defined, all technical and scientific terms used herein have the same meaning as commonly understood by one of ordinary skill in the art to which this invention pertains. In case of conflict, the patent specification, including definitions, governs. As used herein, the indefinite articles "a" and "an" mean "at least one" or "one or more" unless the context clearly dictates otherwise.

BRIEF DESCRIPTION OF THE FIGURES

Some of the embodiments of the invention are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the invention. For the sake of clarity, some objects depicted in the figures are not to scale.

In the figures.

DETAILED DESCRIPTION OF SOME EMBODIMENTS

Figure 1A:
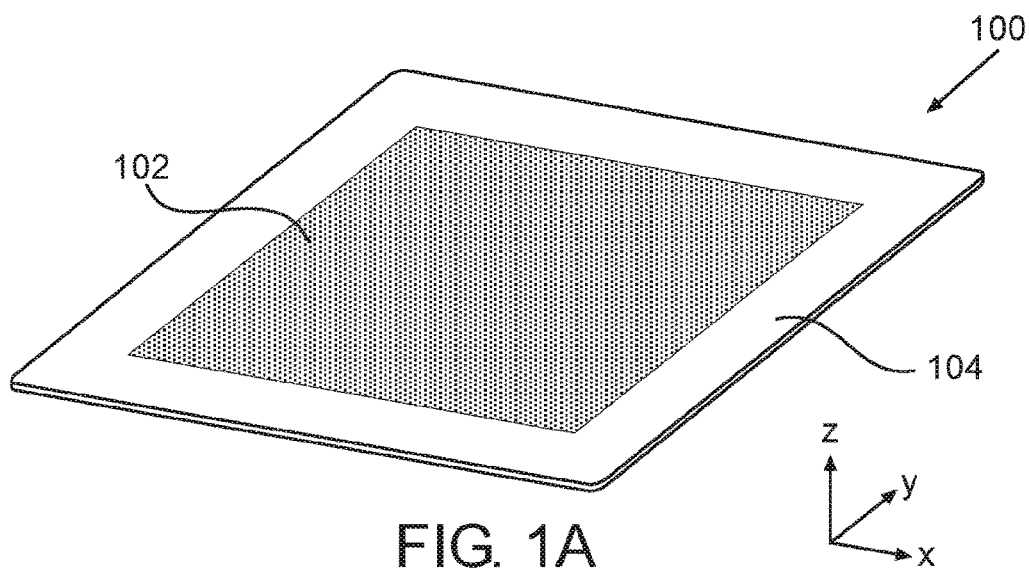
FIG. 1A schematically depicts a supercapacitor current collector, according to some embodiments.
Figure 1B:
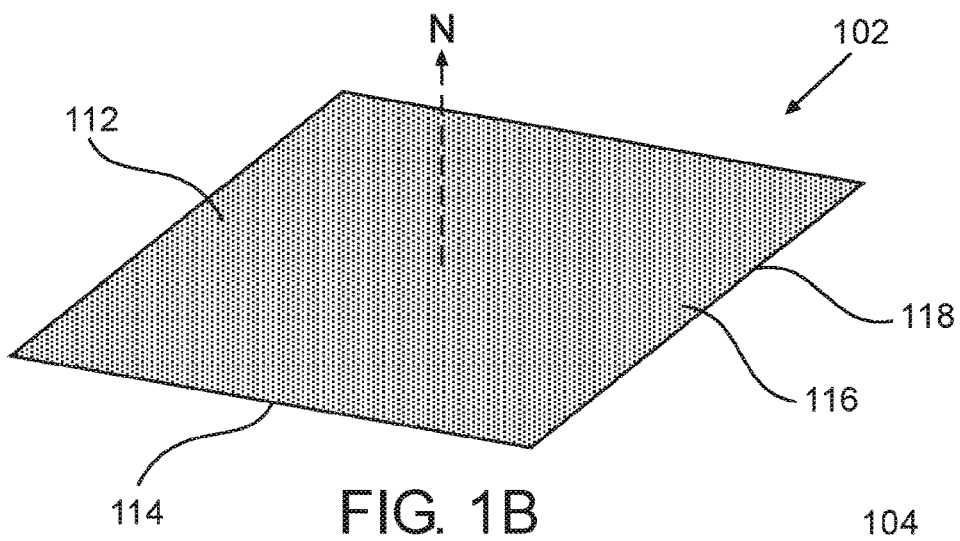
FIG. 1B schematically depicts a conductive sheet of the current collector of FIG. 1A, according to some embodiments.

The principles, uses and implementations of the teachings herein may be better understood with reference to the accompanying description and figures. Upon perusal of the description and figures present herein, one skilled in the art is able to implement the teachings herein without undue effort or experimentation.

In the figures, the same reference numerals refer to the same parts/components throughout. The present application also adopts a convention wherein a reference numeral with a lower-case letter adjoined thereto, serves to indicate an element identical or substantially identical to a previously introduced element, which is referenced by the same numeral without the lower-case letter.

As used herein, the term "about" means in the region of, roughly, or around. A quantity (e.g. a temperature) is said to be "about", or equal to "about", a numerical value when it is within with a range, thereby extending the boundaries above and below the numerical value set forth. In general, the term "about" is used to modify a numerical value above and below the stated value by 10% thereof. According to some embodiments, the term "about" is used to modify a numerical value above and below the stated value by 5% thereof. Similarly, in general, the term "approximately" is used to modify a numerical value above and below the stated value by 2% thereof.

As used herein, the term "identical" is used interchangeably with "substantially identical". As used herein, the term "supercapacitor" refers to an electric double-layer capacitor, a pseudo-capacitor, or an electrochemical capacitor which combines double-layer capacitance with pseudo-capacitance.

As used herein, the term "perimetral", according to some embodiments, is interchangeable with the term "peripheral".

As used herein, an "inert" material, or an "electrolyte-inert" material, refers to a material which is not chemically reactive with one or more types of aqueous electrolytes, at least under parameter (e.g. pressure, temperature) regimes involved in the standard use and the manufacture of the embodiments disclosed herein.

Supercapacitor Current Collectors and Separators

According to an aspect of some embodiments, there is provided a framed current collector. FIGS. 1A-1F schematically depict a first embodiment of a framed current collector 100. Making reference to FIGS. 1A-1B, current collector 100 includes an electrically conductive sheet 102 (e.g. a thin metal film or foil) and an electrically insulating framing structure 104. Conductive sheet 102 includes a top surface 112 and a bottom surface 114. An edge portion 116 of conductive sheet 102 extends along an edge 118 (i.e. the perimeter) of conductive sheet 102.

A Cartesian coordinate system (with axes x, y, and z) is introduced to facilitate the description. The z-axis will be used herein to indicate an "upwards" direction. It is further assumed that current collector 100 lies on a plane parallel to the xy-plane.

Conductive sheet 102 is made of a material inert to one or more types of electrolytes, as elaborated on below. According to some embodiments, conductive sheet 102 is made of an electrically conductive polymer material, such as polyvinyl chloride (PVC) embedded with carbon particles. According to some embodiments, the electrical conductivity of the polymer material is anisotropic, being greater in a direction perpendicular to the plane defined by conductive sheet 102 (that is to say, the plane on which conductive sheet 102 lies, which is parallel to the xy-plane), than in directions parallel to the plane. An arrow N points in parallel to the z-axis and perpendicularly to conductive sheet 102. According to some embodiments, the electrically conductive material includes a metal, e.g. aluminum.

According to some embodiments, conductive sheet 102 thickness can be as low as about 10 μm. According to some embodiments, conductive sheet 102 thickness can be as high as about 100 μm. According to some embodiments, wherein conductive sheet 102 is a conductive polymer, conductive sheet 102 may between about 20 μm to about 200 μm thick. According to some embodiments, the thickness of conductive sheet 102 is no larger than about 20% of the thickness of framing structure 104.

According to some embodiments, conductive sheet 102 has an electrode applied thereto, as elaborated on below. According to some embodiments, the electrode is applied to top surface 112. According to some embodiments, the electrode is applied to bottom surface 114.

According to some embodiments, a first electrode is applied to top surface 112 and a second electrode is applied to bottom surface 114.

According to some embodiments, conductive sheet 102 has an electrode printed thereon, as elaborated on below. According to some embodiments, the electrode is printed on top surface 112. According to some embodiments, the electrode is printed on bottom surface 114.

According to some embodiments, a first electrode is printed on top surface 112 and a second electrode is printed on bottom surface 114.

According to some embodiments, the application process is selected from the group consisting of pressing, printing, 3D printing, coating, and casting.

Figure 1C:
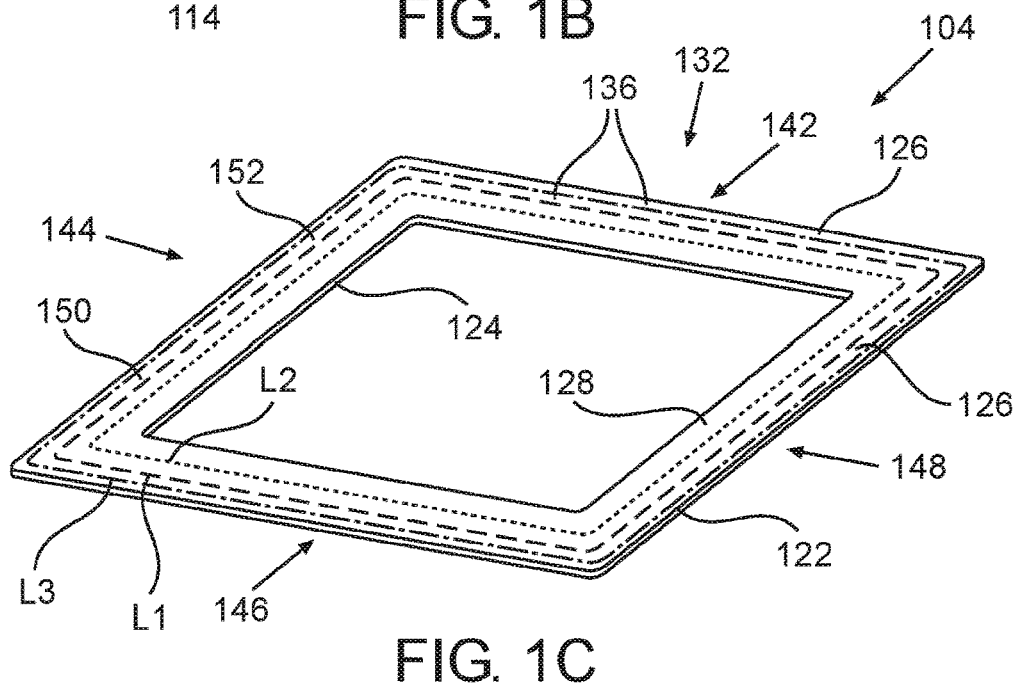
FIG. 1C schematically depicts a framing structure of the current collector of FIG. 1A, according to some embodiments.

Making reference also to FIG. 1C, framing structure 104 is shaped as a closed-frame, e.g. a rectangular frame (as depicted in FIG. 1A and FIG. 1C) or a round frame, having an outer perimeter 122 and an inner perimeter 124. An outer perimetral portion 126 of framing structure 104 extends inwards (i.e. towards inner perimeter 124) from outer perimeter 122, having an inner border indicated by a dashed line L1, which runs parallel to outer perimeter 122. An inner perimetral portion 128 of framing structure 104 extends outwards (i.e. towards outer perimeter 122) from inner perimeter 124, having an outer border indicated by a dotted line L2, which runs parallel to inner perimeter 124. According to some embodiments, outer perimetral portion 126 and inner perimetral portion 128 are complementary, that is to say, framing structure 104 consists of outer perimetral portion 126 and inner perimetral portion 128. (In such embodiments, dashed line L1 and dotted line L2 coincide.)

According to some embodiments, framing structure 104 is shaped as a polyform-like frame. According to some embodiments, framing structure 104 is shaped as a convex polyform-like frame.

Framing structure 104 includes a contact portion 150. Contact portion 150 has an inner border indicated by dashed line L1 and an outer border indicated by a dashed-dotted line L3, which surrounds dashed line L1 and runs parallel thereto. Contact portion 150 is included in outer perimetral portion 126. According to some embodiments, outer perimetral portion 126 consists of contact portion 150 (in such embodiments, dashed-dotted line L3 coincides with outer perimeter 122).

Figure 1D:
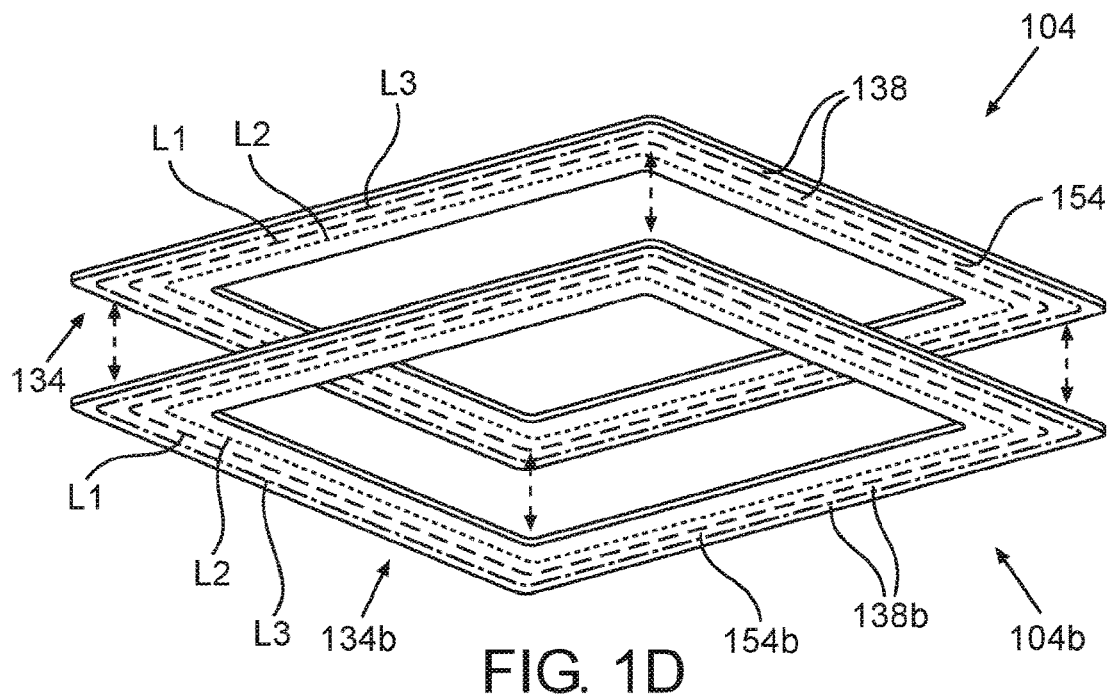
FIG. 1D presents an exploded bottom view of a framing structure of the current collector of FIG. 1C with an identical framing structure placed on a top thereof, according to some embodiments.

Framing structure 104 further includes a top side 132 and a bottom side 134 (shown in FIG. 1D). An outer portion top side 136 consists of the top side of outer perimetral portion 126. An outer portion bottom side 138 (shown in FIG. 1D) consists of the bottom side of outer perimetral portion 126. A contact portion top side 152 consists of the top side of contact portion 150. A contact portion bottom side 154 (shown in FIG. 1D) consists of the bottom side of contact portion 150. Contact portion top side 152 and contact portion bottom side 154 define two matching surfaces, as elaborated on below, which according to some embodiments are flat. According to some embodiments, contact portion top side 152 and contact portion bottom side 154 are parallel to the xy-plane. According to some embodiments, outer portion top side 136 and outer portion bottom side 138 define two matching surfaces, as elaborated on below, which according to some embodiments are flat. According to some embodiments, outer portion top side 136 and outer portion bottom side 138 are parallel to the xy-plane.

According to some embodiments, framing structure top side 132 and framing structure bottom side 134 define two matching surfaces, which in some such embodiments are flat. According to some embodiments, top side 132 and bottom side 134 are parallel to the xy-plane.

According to some embodiments, as depicted in FIG. 1C, framing structure 104 is rectangular, including four arms: a first arm 142, a second arm 144, a third arm 146, and a fourth arm 148. First arm 142 is joined at respective ends thereof (not numbered) to second arm 144 and fourth arm 148. Third arm 146 is joined at respective ends thereof (not numbered) to second arm 144 and fourth arm 148. Third arm 146 is positioned oppositely to first arm 142 and extends parallel thereto. Fourth arm 148 is positioned oppositely to second arm 144 and extends parallel thereto.

FIG. 1D presents an exploded view from below of framing structure 104 placed on top of a second framing structure 104b, which is identical thereto, as elaborated on below.

Figure 1E:
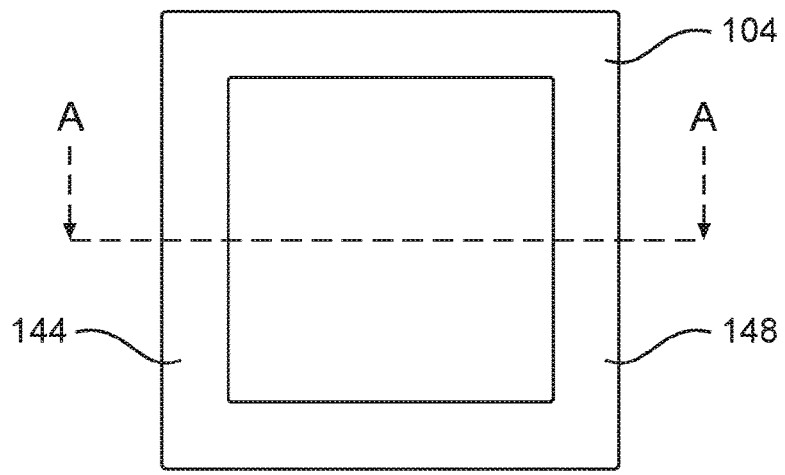
FIG. 1E presents a top view of the framing structure of FIG. 1D, placed on top of the second framing structure of FIG. 1D, according to some embodiments.

FIG. 1E presents a top view of framing structure 104. Framing structure 104 is placed on a second framing structure 104b (shown in FIG. 1F, but not shown in FIG. 1E due to being hidden from view by framing structure 104).

Figure 1F:
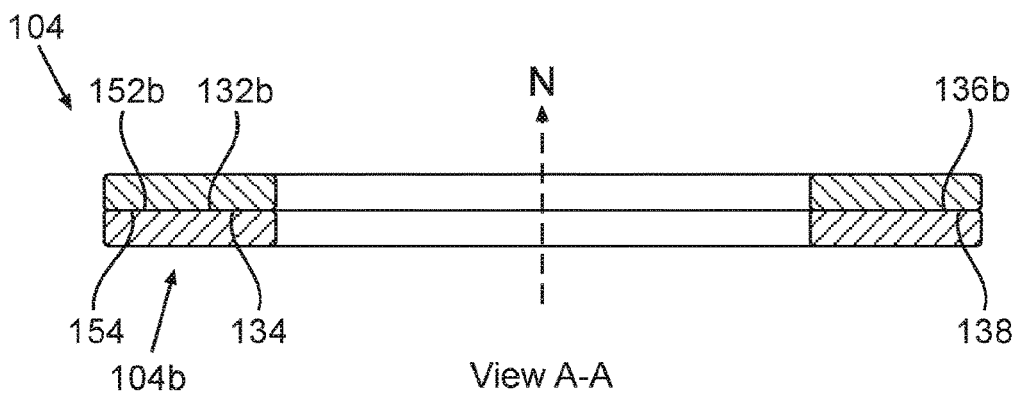
FIG. 1F presents a cross-sectional view of the framing structures of FIG. 1E, according to some embodiments.

FIG. 1F presents a cross-sectional view, taken along a cross-section A-A (indicated in FIG. 1E), of framing structure 104 and second framing structure 104b, on which framing structure 104 is placed. Cross-section A-A is perpendicular to the xy-plane and bisects both second arm 144 and fourth arm 148, and a second arm 144b and a fourth arm 148b of second framing structure 104b.

As shown in FIGS. 1D-1F, framing structure 104 is configured (shaped) to allow the placing thereof on second framing structure 104b, such that contact portion bottom side 154 and a contact portion top side 152b (the top side of the contact portion (not numbered) of second framing structure 104b) are contiguous or substantially contiguous. More specifically, framing structure 104 is shaped to allow the placing thereof on second framing structure 104b, such that substantially every location on contact portion bottom side 154 is contiguous, or substantially contiguous, to a corresponding location on contact portion top side 152b (i.e. substantially every location on contact portion bottom side 154 is in contact, or nearly in contact, with a corresponding location on contact portion top side 152b).

According to some embodiments, framing structure 104 is configured (shaped) to allow the placing thereof on second framing structure 104b, such that outer portion bottom side 138 and an outer portion top side 136b (the top side of the outer portion (not numbered) of second framing structure 104b) are contiguous or substantially contiguous. More specifically, framing structure 104 is shaped to allow the placing thereof on second framing structure 104b, such that substantially every location on outer portion bottom side 138 is contiguous, or substantially contiguous, to a corresponding location on outer portion top side 136b (i.e. substantially every location on outer portion bottom side 138 is in contact, or nearly in contact, with a corresponding location on outer portion top side 136b).

According to some embodiments, framing structure 104 can be placed on top of second framing structure 104b, such that substantially every location on bottom side 134 is contiguous or substantially contiguous to a corresponding location on a top side 132b of second framing structure 104b.

It is noted that since framing structure 104 and second framing structure 104b are identical, second framing structure 104b can equally be placed on framing structure 104, such that substantially every location on contact portion top side 152 is contiguous or substantially contiguous to a corresponding location on a contact portion bottom side 154b (the bottom side of the contact portion of second framing structure 104b; contact portion bottom side 154b is shown in FIG. 1D).

Framing structure 104 is made of a dielectric material. According to some embodiments, framing structure 104 is made of a thermoplastic material, such as PVC, polyethylene (PE), or polypropylene (PP). According to some embodiments, framing structure 104 is fabricated using injection molding techniques. According to some embodiments, framing structure 104 is fabricated using thermoforming or vacuum forming techniques. According to some embodiments, framing structure 104 is rigid, in particular, not including any plasticizer-type additives. According to some embodiments, framing structure 104 is resiliently flexible.

According to some embodiments, framing structure 104 is substantially square, and the arms of framing structure 104 measure about 20 cm in length. According to some embodiments, the width of framing structure 104 (the distance between inner perimeter 124 and outer perimeter 122) is about 10 mm. According to some embodiments, the width of inner perimetral portion 128 (the distance between inner perimeter 124 and dotted line L1) is at least about 40% of framing structure 104 width, that is to say, at least about 4 mm when framing structure 104 width is 10 mm. According to some embodiments, the width of inner perimetral portion 128 is as large as approximately 90% of framing structure 104 width.

According to some embodiments, outer perimeter 122 of framing structure 104 is greater than perimeter 118 of conductive sheet 102 by at least about 25%. According to further embodiments, the outer perimeter of the framing structure is greater than the perimeter of the conductive sheet by at least about 30%, at least about 35%, at least about 40%, at least about 45%, or at least about 50%. Each possibility represents a separate embodiment of the invention.

According to some embodiments, a width of outer perimetral portion 126 of framing structure 104 constitutes at least about 12.5% of the total width of framed current collector 100. As indicated hereinabove, outer perimetral portion 126 extends from outer perimeter 122 of framing structure 104 to the inner border indicated by a dashed line L1. In some embodiments, outer perimetral portion 126 extends from outer perimeter 122 to outer border of inner perimetral portion 128 indicated by a dashed line L2. In additional embodiments, outer perimetral portion 126 extends from outer perimeter 122 to edge 118 of conductive sheet 102. In further embodiments, width of the outer perimetral portion of the framing structure constitutes at least about 15% of the total width of the framed current collector, at least about 20%, at least about 25%, at least about 30%, or at least about 35% of the total width of the framed current collector. Each possibility represents a separate embodiment of the invention.

According to some embodiments, the thickness of framing structure 104, that is to say the distance between top side 132 and bottom side 134, can be as small as about 0.2 mm, or even about 0.1 mm. According to some embodiments, the thickness of framing structure 104, can be as large as about 0.7 mm, about 1 mm, about 1.4 mm, or even as large as about 2 mm. Framing structure 104 circumscribes conductive sheet 102. Conductive sheet 102 and framing structure 104 are attached onto one another at edge portion 116 and inner perimetral portion 128, respectively, as elaborated on below. Conductive sheet 102 attachment to framing structure 104 allows placing current collector 100 on a second current collector 100b (which includes second framing structure 104b), identical thereto, such as to be aligned therewith, as elaborated on below. Conductive sheet 102 and framing structure 104 may be attached onto one another using a suitable adhesion technique and/or adhesive material (e.g. heating, pressing, heat-pressing, heat-fusing, laser, laser welding, ultrasonic welding, soldering, and the like, and/or glue), as elaborated on below.

Figure 2A:
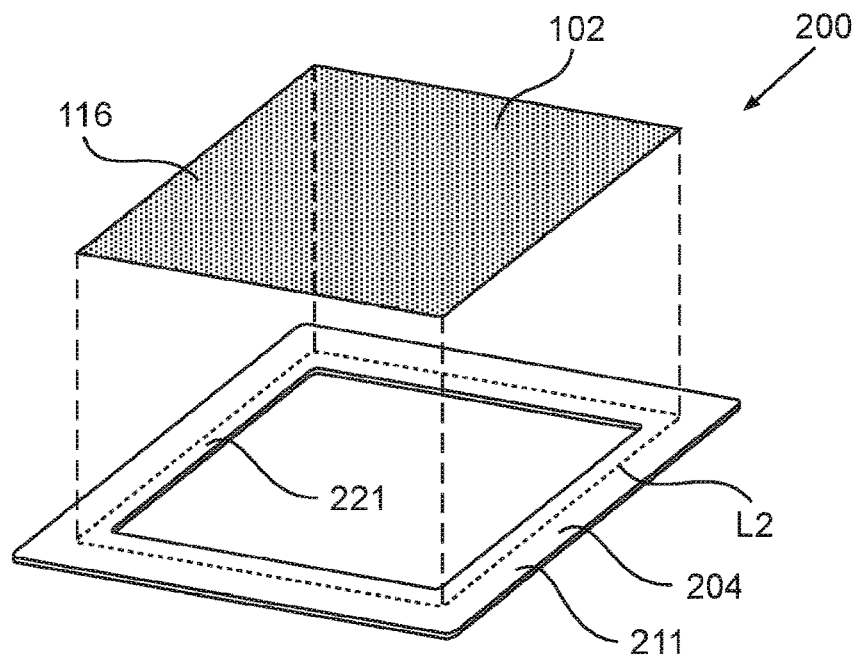
FIG. 2A presents an exploded-view of a specific embodiment of the current collector of FIG. 1A, wherein the framing structure consists essentially of a single dielectric frame.

FIG. 2A presents an exploded view of a current collector 200. Current collector 200 is a specific embodiment of current collector 100, and includes conductive sheet 102 and a framing structure 204. Framing structure 204, which is a specific embodiment of framing structure 104, consists essentially of a single dielectric frame 211. Conductive sheet 102 may be attached onto dielectric frame 211 from the top (as depicted in FIG. 2A), or from the bottom. According to some embodiments (e.g. wherein conductive sheet 102 is made of a conductive polymer), conductive sheet 102 is heat-fused onto dielectric frame 211. According to some embodiments (e.g. wherein conductive sheet 102 is metallic), conductive sheet 102 attachment onto dielectric frame 211 may be effected by heat-pressing and/or gluing edge portion 116 onto an inner perimetral portion 221 of dielectric frame 211.

According to some embodiments, the thickness of dielectric frame 211 can be as small as about 0.1 mm. According to some embodiments, the thickness of dielectric frame 211, can be as large as about 0.7 mm, or even as large as about 1 mm.

Figure 2B:
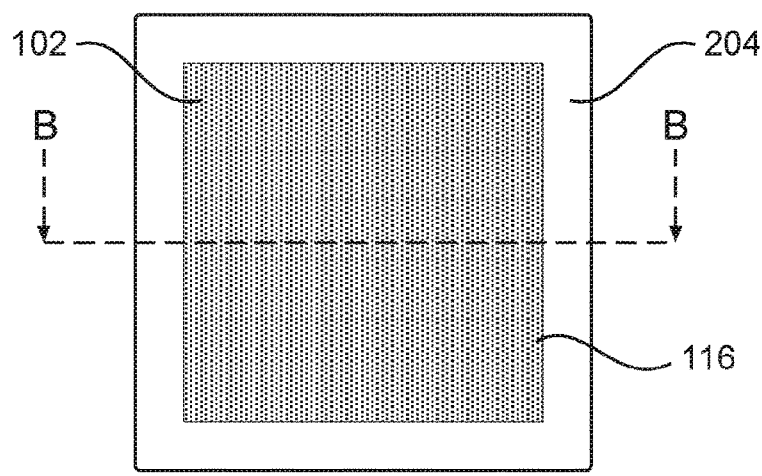
FIG. 2B presents a top view of the current collector of FIG. 2A, placed on top of a second current collector identical thereto, according to some embodiments.

FIG. 2B presents a top view of current collector 200. Current collector 200 is placed on a second current collector 200b identical thereto. (Second current collector 200b is shown in FIG. 2C, but is not shown in FIG. 2B due to being hidden from view by current collector 200).

Figure 2C:
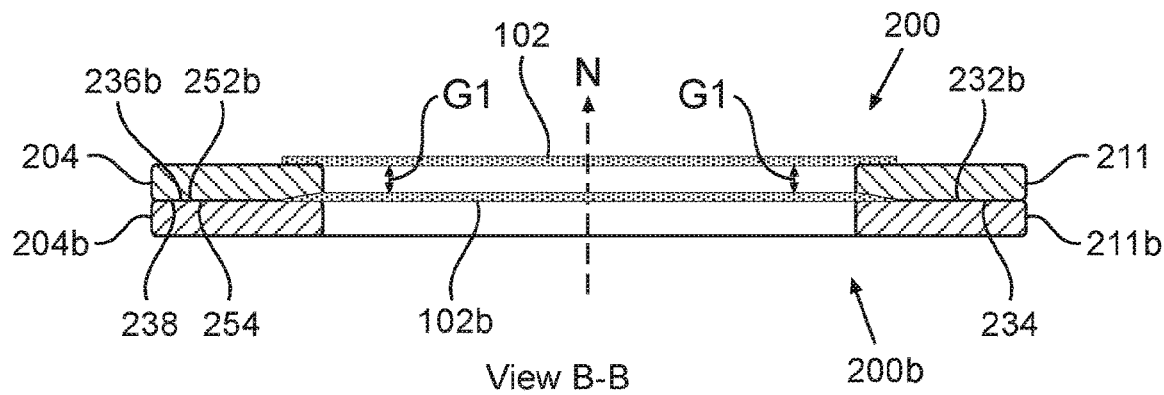
FIG. 2C presents a cross-sectional view of the current collectors of FIG. 2B, according to some embodiments.

FIG. 2C presents a cross-sectional view, taken along a cross-section B-B (indicated in FIG. 2B), of current collector 200 and second current collector 200b, on which current collector 200 is placed. Cross-section B-B is perpendicular to the xy-plane and bisects two opposite arms (not numbered) of current collector 200, as well as bisecting two opposite arms (not numbered) of second current collector 200b.

As shown in FIG. 2C, conductive sheet 102 attachment to framing structure 204 allows placing current collector 200 on second current collector 200b, such that substantially every location on a contact portion bottom side 254 of framing structure 204 (i.e. dielectric frame 211) is contiguous or substantially contiguous to a corresponding location on a contact portion top side 252b of a framing structure 204b (i.e. a dielectric frame 211b) of second current collector 200b. According to some embodiments, conductive sheet 102 attachment to framing structure 204 allows placing current collector 200 on second current collector 200b, such that substantially every location on an outer portion bottom side 238 of framing structure 204 is contiguous or substantially contiguous to a corresponding location on an outer portion top side 236b of a framing structure 204b of second current collector 200b. According to some embodiments, conductive sheet 102 attachment to framing structure 204 allows placing current collector 200 on second current collector 200b, such that substantially every location on a bottom side 234 of framing structure 204 is contiguous, or substantially contiguous, to a corresponding location to a top side 232b of framing structure 204b.

As used herein, two current collectors, such as current collector 200 and second current collector 200b (and such as the current collector pairs described below in the description of FIGS. 3A-9), placed one on the top of the other, as described above, may be referred to as being "aligned" or "mutually aligned".

Further, according to some embodiments, current collector 200 is configured such that when mutually aligned with second current collector 200b, conductive sheet 102 and a second conductive sheet 102b (the conductive sheet of second current collector 200b) are separated by a gap G1. According to some embodiments, gap G1 measures between about 0.1 mm and about 0.7 mm. For example, when dielectric frame 211 is 0.5 mm thick and conductive sheet 102 is 50 µm thick, then gap G1 will measure about 0.5 mm. According to some embodiments, gap G1 is broad enough to allow disposing therein, in a layered manner, a first electrode, an insulating sheet, and a second electrode, as elaborated on below in the subsection "Supercapacitor stacks".

Figure 3A:
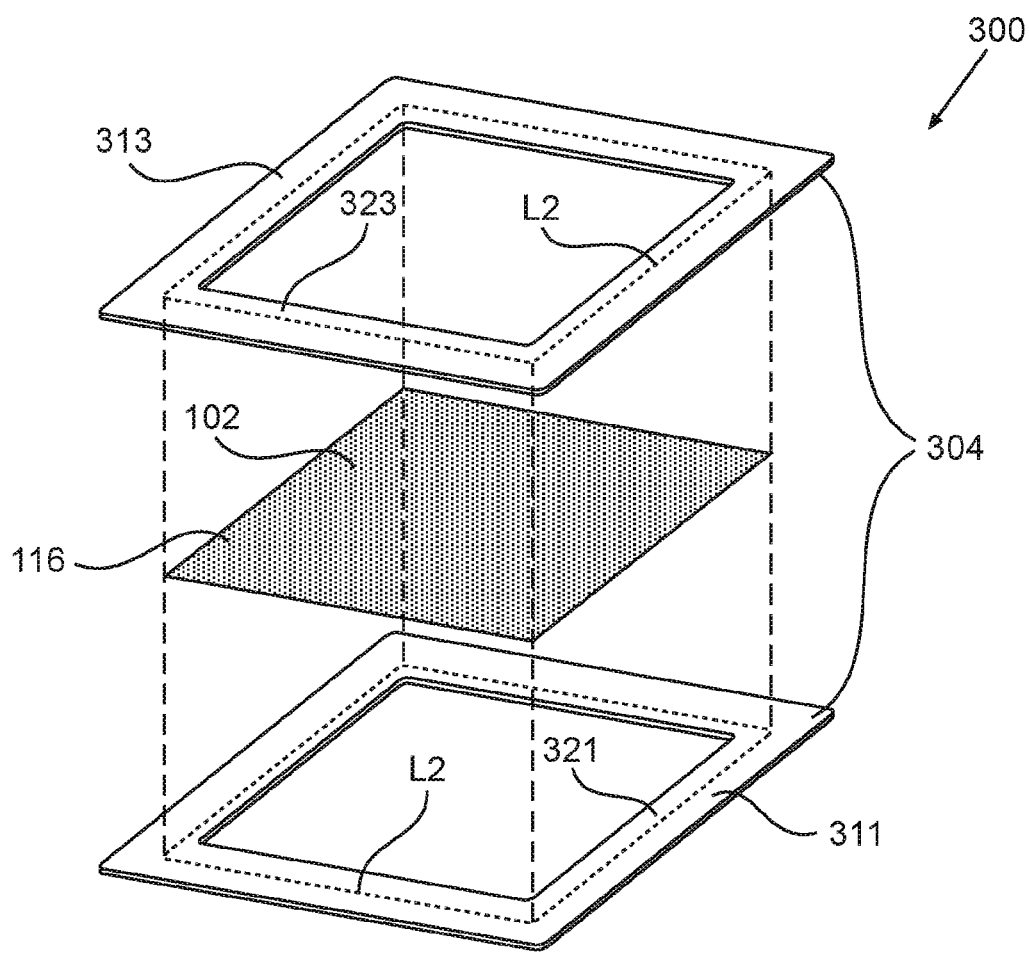
FIG. 3A presents an exploded-view of a specific embodiment of the current collector of FIG. 1A, wherein the framing structure includes two dielectric frames.

FIG. 3A presents an exploded view of a current collector 300. Current collector 300 is a specific embodiment of current collector 100, and includes conductive sheet 102 and a framing structure 304. Framing structure 304, which is a specific embodiment of framing structure 104, includes a pair of dielectric frames: a first dielectric frame 311 and a second dielectric frame 313. Edge portion 116 is sandwiched between an inner perimetral portion 321 of first dielectric frame 311 and an inner perimetral portion 323 of second dielectric frame 313 (thereby attaching conductive sheet 102 onto framing structure 304, as elaborated on below). Inner perimetral portion 321 extends along the inner perimeter (not numbered) of first dielectric frame 311, and inner perimetral portion 323 extends along the inner perimeter (not numbered) of second dielectric frame 313. Inner perimetral portions 321 and 323 make up the inner perimetral portion of framing structure 304. According to some embodiments, first dielectric frame 311 and second dielectric frame 313 are identical. According to some embodiments, first dielectric frame 311 and second dielectric frame 313 differ in thickness.

According to some embodiments (e.g. wherein conductive sheet 102 is made of a conductive polymer), conductive sheet 102 is heat-fused onto first dielectric frame 311 at a bottom surface of edge portion 116 and at a top side (not numbered) of inner perimetral portion 321, respectively. Conductive sheet 102 is further heat-fused onto second dielectric frame 313 at a top surface (not numbered) of edge portion 116 and at a bottom side of inner perimetral portion 323, respectively. According to some embodiments (e.g. wherein conductive sheet 102 is metallic), conductive sheet 102 attachment onto dielectric frames 311 and 313 is effected by heat pressing and/or gluing edge portion 116 between inner perimetral portion 321 and inner perimetral portion 323. As used herein, according to some embodiments, "heat pressing" refers to an at least in part simultaneous application of heat and pressure, such as by a heated pressing frame. According to some embodiments, heat pressing may be used to effect a physical connection (e.g. electrostatic connection) between elements (e.g. adjacent framing structures, a frame and a conductive/insulating sheet) or a chemical connection there between. Other bonding techniques include ultrasonic welding and laser welding.

According to some embodiments, the thickness of dielectric frame 311 and 313 can be as small as about 0.1 mm. According to some embodiments, the thickness of dielectric frame 311 and 313 can be as large as about 0.7 mm, or even as large as about 1 mm.

Figure 3B:
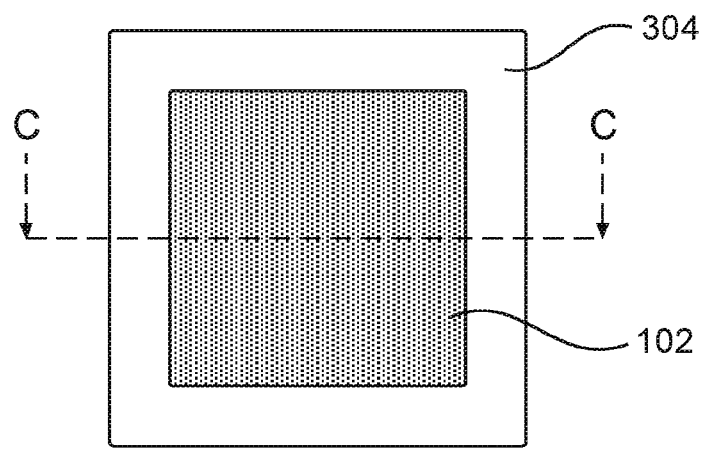
FIG. 3B presents a top view of the current collector of FIG. 3A, placed on top of a second current collector identical thereto, according to some embodiments.

FIG. 3B presents a top view of current collector 300. Current collector 300 is placed on a second current collector 300b identical thereto, such as to be aligned therewith. (Second current collector 300b is shown in FIG. 3C, but is not shown in FIG. 3B due to being hidden from view by current collector 300).

Figure 3C:
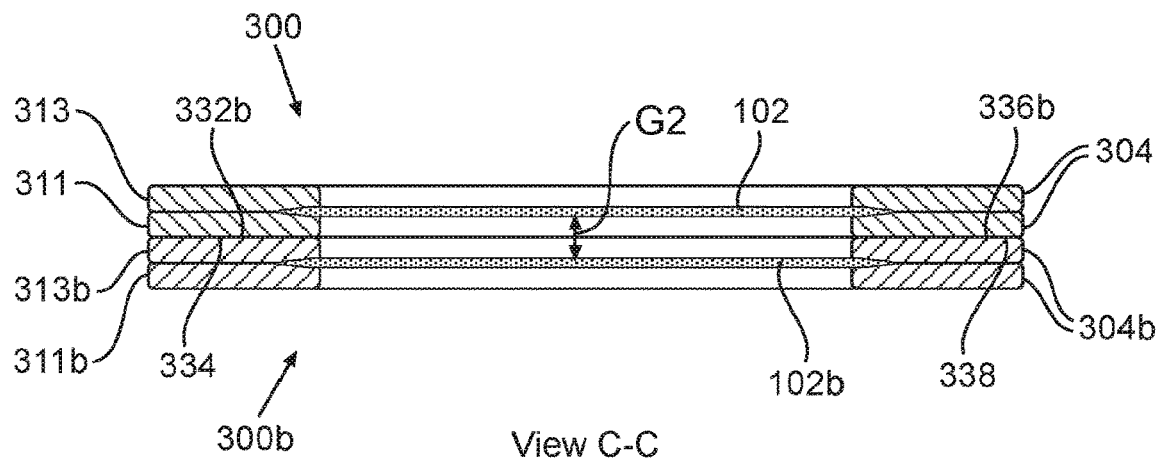
FIG. 3C presents a cross-sectional view of the current collectors of FIG. 3B, according to some embodiments.

FIG. 3C presents a cross-sectional view, taken along a cross-section C-C (indicated in FIG. 3B), of current collector 300 and second current collector 300b, on which current collector 300 is placed. Cross-section C-C is perpendicular to the xy-plane and bisects two opposite arms (not numbered) of current collector 300, as well as bisecting two opposite arms (not numbered) of second current collector 300b.

As shown in FIG. 3C, conductive sheet 102 attachment to framing structure 304 allows placing current collector 300 on second current collector 300b, such that substantially every location on an outer portion bottom side 338 of framing structure 304 (i.e. the bottom side of inner perimetral portion 321) is contiguous, or substantially contiguous, to a corresponding location on an outer portion top side 336b of a framing structure 304b (i.e. the top side of the inner perimetral portion of a second (and top) dielectric frame 313b) of second current collector 300b. According to some embodiments, conductive sheet 102 attachment to framing structure 304 allows placing current collector 300 on second current collector 300b, such that substantially every location on a bottom side 334 of framing structure 304 is contiguous, or substantially contiguous, to a corresponding location on a top side 332b of framing structure 304b.

Further, according to some embodiments, current collector 300 is configured such that when mutually aligned with second current collector 300b, conductive sheet 102 and a second conductive sheet 102b (the conductive sheet of second current collector 300b) are separated by a gap G2. According to some embodiments, gap G2 measures between about 0.2 mm and about 2 mm. For example, when dielectric frames 311 and 313 are each 0.5 mm thick and conductive sheet 102 is 50 µm thick, then gap G2 will measure about 1 mm. According to some embodiments, gap G2 will measure slightly less than 1 mm, for example, if the edge portion of the conductive sheet is compressed between the two dielectric frames (e.g. due to pressing). According to some embodiments, gap G2 is broad enough to allow disposing therein, in a layered manner, a first electrode, an insulating sheet, and a second electrode, as elaborated on below in the subsection "Supercapacitor stacks".

According to some embodiments of current collector 100 (not shown in the figures), framing structure 104 is overmolded over conductive sheet 102, such that edge portion 116 is fixed between a lower half of inner perimetral portion 128 and an upper half of inner perimetral portion 128 (similarly to how edge portion 116 is fixed between inner perimetral portions 321 and 323 in FIG. 3C, but with the difference that framing structure 104 is fabricated as a single piece and not out of two frames (i.e. dielectric frames 311 and 313)).

According to some embodiments of current collector 100 (not shown in the figures), framing structure 104 is made of elastomer, and the attachment to conductive sheet 102 is gasket-like.

Figure 4A:
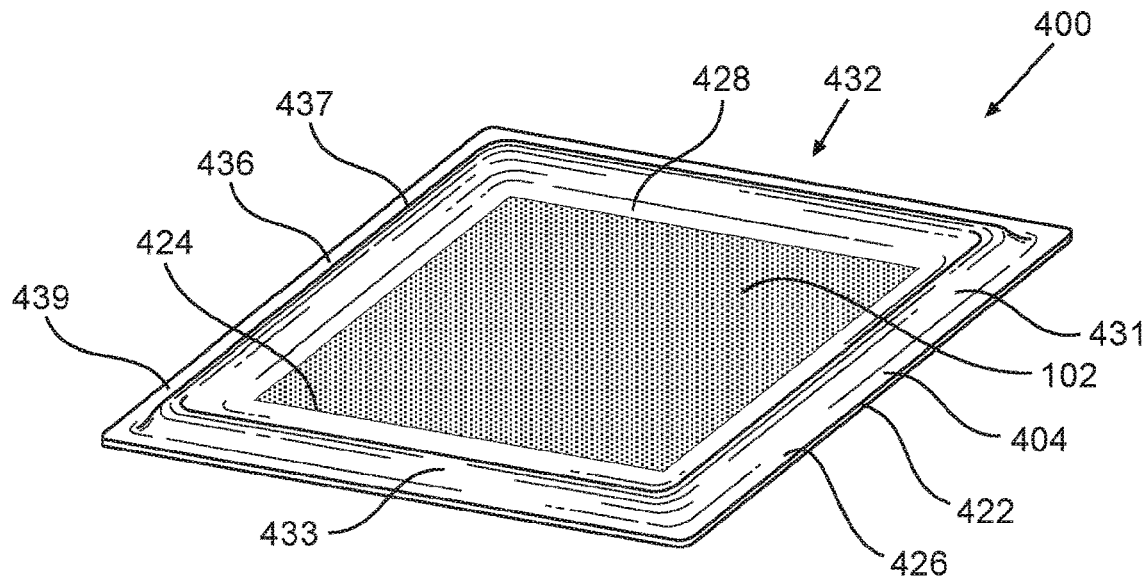
FIG. 4A schematically depicts a self-aligning current collector with a wave-like geometrical feature, according to some embodiments.
Figure 4B:
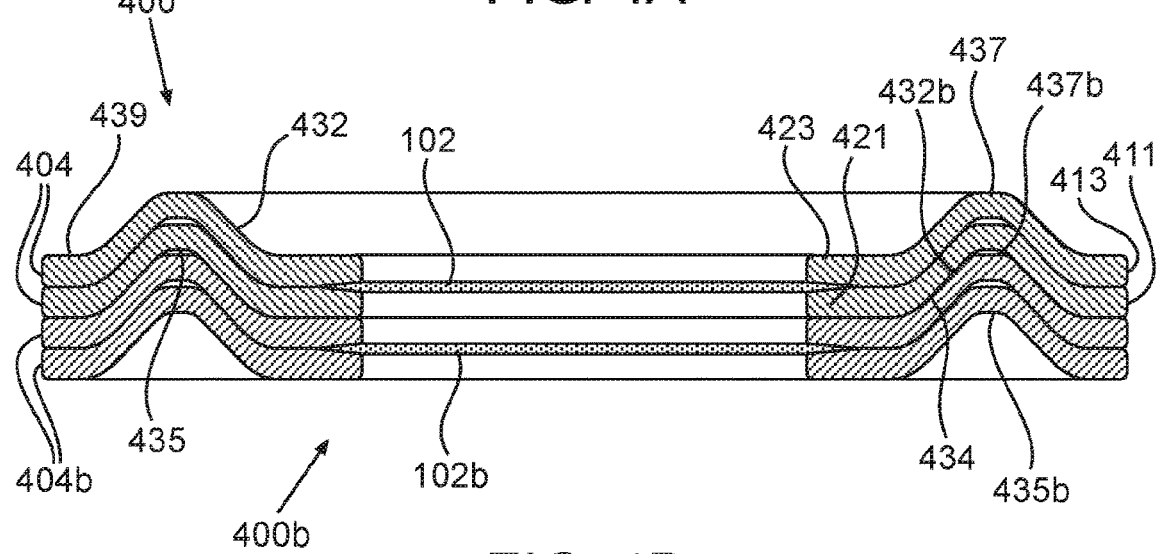
FIG. 4B presents a cross-sectional view of the self-aligning current collector of FIG. 4A, placed on top of a second self-aligning current collector identical thereto, according to some embodiments.

FIG. 4A schematically depicts a current collector 400. Current collector 400 is a specific, self-aligning embodiment of current collector 100, as elaborated on below. FIG. 4B presents a cross-sectional view of a pair of identical current collectors: current collector 400 and a second current collector 400b. Current collectors 400 and 400b are mutually self-aligned, with current collector 400 being placed on second current collector 400b, as elaborated on below. The cross-section is taken along a plane perpendicular to the xy-plane, which bisects current collectors 400 and 400b, similarly to how cross-section C-C bisects current collectors 300 and 300b in FIG. 3B.

Making reference to FIG. 4A, current collector 400 includes conductive sheet 102 and a framing structure 404, which is a specific embodiment of framing structure 104. An outer perimeter 422, an inner perimeter 424, an outer perimetral portion 426, an inner perimetral portion 428, a top side 432, a bottom side 434, and an outer portion top side 436 are specific embodiments of outer perimeter 122, inner perimeter 124, outer perimetral portion 126, inner perimetral portion 128, top side 132, bottom side 134, and outer portion top side 136, respectively.

Framing structure 404 includes a geometrical feature 431. Geometrical feature 431 includes a wave-like projection 433 on top side 432. Wave-like projection 433 extends fully around framing structure 404. A crest 437 (i.e. a contour line of highest "elevation") of wave-like projection 433 runs parallel to outer perimeter 422 (and inner perimeter 424). On bottom side 434 geometrical feature 431 forms an indentation 435 (hidden from view in FIG. 4A but shown in FIG.

4B) in the upwards direction, which matches wave-like projection 433. In other words, and as shown in FIG. 4B, the cross-section of framing structure 404 defines a wave-like shaped curve. According to some embodiments, the cross-section of framing structure 404 substantially defines an "inverted V"-shaped curve. According to some such embodiments, the "arms" (not numbered) of the "V" subtend an angle of about 45° there between, and crest 437 projects between about 2 mm to about 4 mm from top side 432 (for example, when framing structure 404 is about 10 mm wide).

Top side 432 and bottom side 434 constitute matching surfaces, thereby allowing placing current collector 400 on second current collector 400b, such as to be aligned therewith, that is to say, such that substantially every location on bottom side 434 is contiguous, or substantially contiguous, to a corresponding location on a top side 432b of second current collector 400b. In particular, when two current collectors, such as current collectors 400 and 400b, are thus mutually aligned, the crests of the respective geometrical features thereof (i.e. crest 437 and a crest 437b of second current collector 400b) are positioned substantially directly one above the other.

According to some embodiments, and as depicted in FIGS. 4A-4B, framing structure 404 includes a flat shelf-like portion 439 surrounding wave-like projection 433.

According to some embodiments of current collector 400, and as depicted in FIG. 4B, framing structure 404 includes a pair of dielectric frames: a first dielectric frame 411 and a second dielectric frame 413. Edge portion 116 is sandwiched between an inner perimetral portion 421 of first dielectric frame 411 and an inner perimetral portion 423 of second dielectric frame 413, essentially as described with respect to conductive sheet 102 and dielectric frames 311 and 313 in FIGS. 3A-3C.

Current collector 400 is said to be "self-aligning" in the sense that geometrical feature 431 functions as a jig or fixture for the placement of a second current collector, identical to current collector 400, on current collector 400, and for the alignment of the second current collector relative to current collector 400. Further, according to some embodiments, geometrical feature 431 functions as a jig for the placement of conductive sheet 102 on first dielectric frame 411 during the fabrication of current collector 400. In addition, when a pair of current collectors identical to current collector 400, are mutually aligned (but are not attached to one another), then due to the shape of the geometrical features thereof, induced small misalignments between the current collectors (i.e. small displacements of one current collector relative to the other) may be self-corrected without resorting to external means. For instance, a light knock might only momentarily dislodge the top current collector, as gravity will act to restore (e.g. slide back) the top current collector into place.

Figure 5:
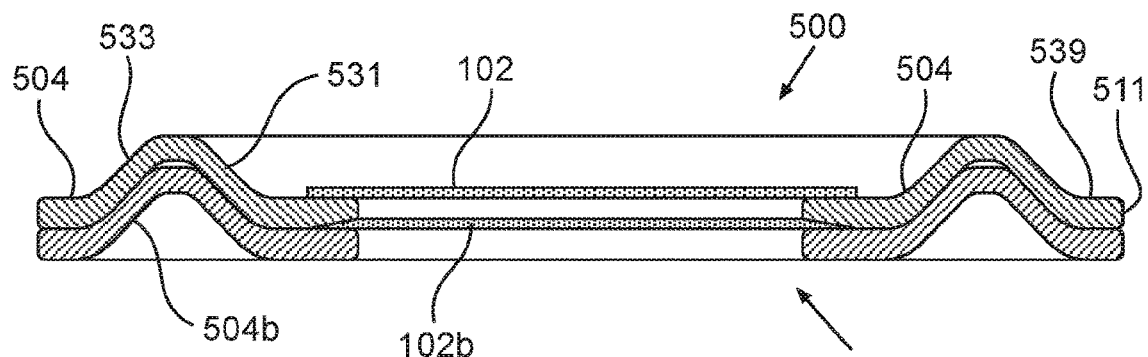
FIG. 5 presents a cross-sectional view of a self-aligning current collector with a wave-like geometrical feature, placed on top of a second self-aligning current collector identical thereto, according to some embodiments.

FIG. 5 presents a cross-sectional view of a pair of identical self-aligning current collectors: a current collector 500 and a second current collector 500b. The cross-sectional view is taken along a plane perpendicular to the xy-plane, which bisects current collectors 500 and 500b, similarly to cross-section B-B in FIG. 2B. Current collector 500 is a specific embodiment of current collector 200, and includes conductive sheet 102 and a framing structure 504, which is a specific embodiment of framing structure 204. That is to say, framing structure 504 consists essentially of a single dielectric frame 511. Conductive sheet 102 may be attached onto dielectric frame 511 from the top (as depicted in FIG. 5), or from the bottom, essentially as described with respect to conductive sheet 102 and dielectric frame 211 in the description of FIGS. 2A-2C. Current collector 500 includes a geometrical feature 531 in the form of a wave-like projection 533 similar to wave-like projection 433 of current collector 400. According to some embodiments, and as depicted in FIG. 5, framing structure 504 includes a flat shelf-like portion 539 surrounding wave-like projection 533.

Figure 6:
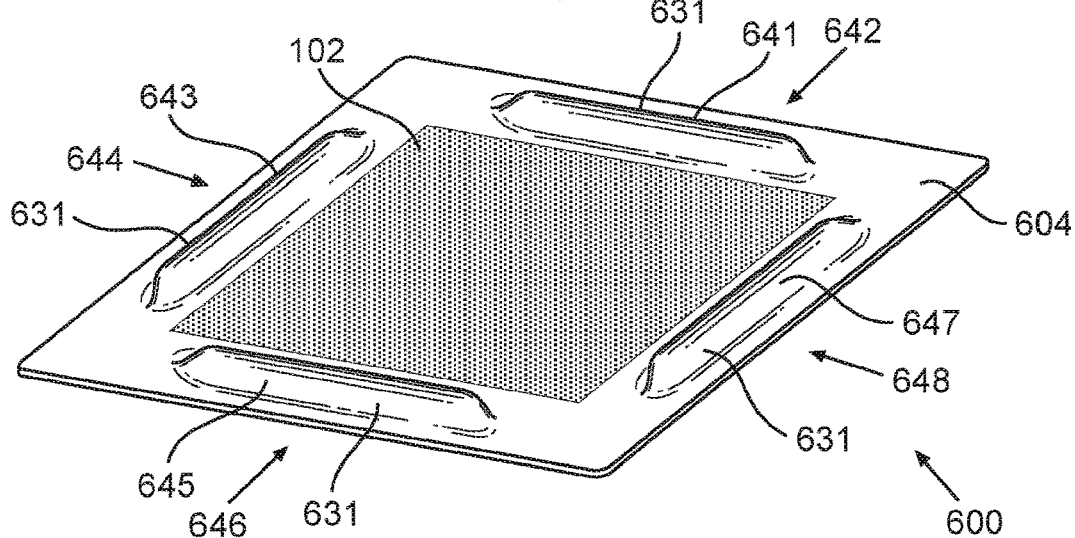
FIG. 6 schematically depicts a self-aligning current collector with four wave-like projections, identical thereto, according to some embodiments.

FIG. 6 schematically depicts another embodiment of a self-aligning current collector: a current collector 600. Current collector 600 is a specific embodiment of current collector 100. Current collector 600 includes conductive sheet 102 and a framing structure 604, which is a specific embodiment of framing structure 104. Framing structure 604 includes a first arm 642, a second arm 644, a third arm 646 (opposite first arm 642), and a fourth arm 648 (opposite second arm 644). Framing structure 604 further includes a geometrical feature 631. Geometrical feature 631 is similar to geometrical 431 but differs therefrom in including four wave-like projections (instead of a single projection): a first projection 641, a second projection 643, a third projection 645, and a fourth projection 647. Unlike wave-like projection 433, each of projections 641, 643, 645, and 647 does not extend fully around framing structure 604, extending instead along a respective arm: First projection 641 extends along a part of first arm 642. Second projection 643 extends along a part of second arm 644. Third projection 645 extends along a part of third arm 646. Fourth projection 647 extends along a part of fourth arm 648. (Projections 641, 643, 645, and 647 are distinct from one another, that is to say, disconnected from one another.)

Figure 7A:
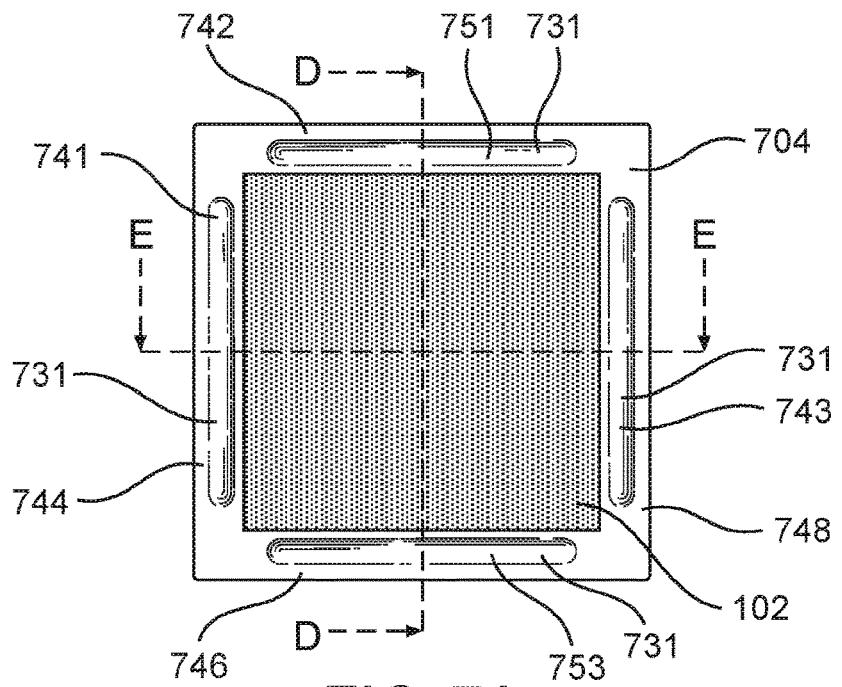
FIG. 7A presents a top view of a self-aligning current collector with two projections and two depressions, placed on top of a second self-aligning current collector identical thereto, according to some embodiments.

FIG. 7A presents a top view of a self-aligning current collector 700, which is a specific embodiment of current collector 300. Current collector 700 is placed on a second current collector 700b identical thereto, such as to be aligned therewith. (Second current collector 700b is shown in FIG. 7B, but is not shown in FIG. 7A due to being hidden from view by current collector 700).

Current collector 700 includes conductive sheet 102 and a framing structure 704, which is a specific embodiment of framing structure 304. Framing structure 704 includes a first arm 742, a second arm 744, a third arm 746, and a fourth arm 748. Third arm 746 is opposite to first arm 742. Fourth arm 748 is opposite to second arm 744. Framing structure 704 further includes a geometrical feature 731 in the form of a first projection 741 and a second projection 743, and a first depression 751 and a second depression 753 (i.e. projections extending in the downwards direction). First depression 751 and second depression 753 extend along first arm 742 and third arm 746, respectively. First projection 741 and second projection 743 extend along second arm 744 and fourth arm 748, respectively. According to some embodiments, projections 741 and 743 are wave-like, and depressions 751 and 753 are "inverted wave"-like. The "inverted wave"-like profile of depressions 751 and 753 is depicted in FIG. 7B.

Figure 7B:
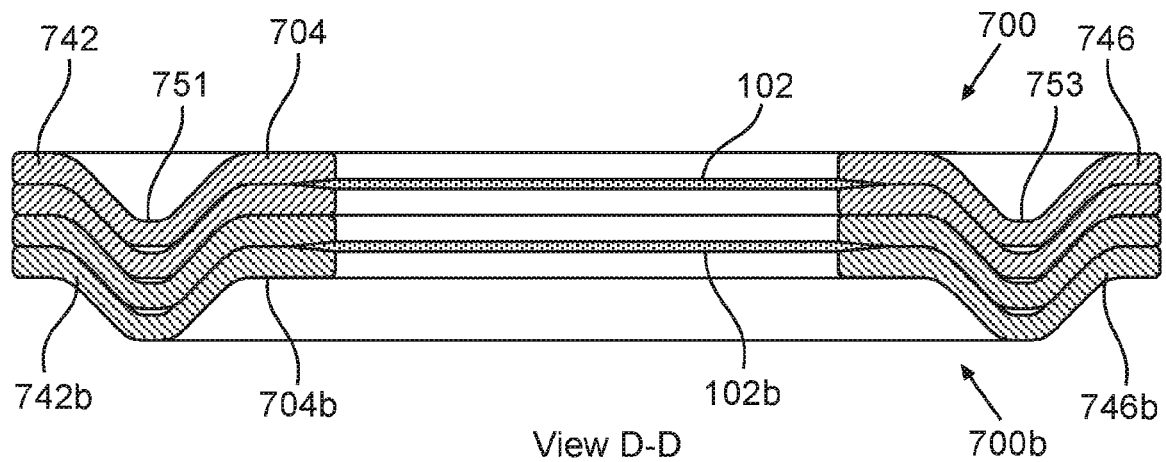
FIG. 7B presents a cross-sectional view of the self-aligning current collectors with of FIG. 7A, depicting the depressions, according to some embodiments.

FIG. 7B presents a cross-sectional view, taken along a cross-section D-D (indicated in FIG. 7A) of current collector 700 and second current collector 700b, on which current collector 700 is placed. Cross-section D-D is perpendicular to the xy-plane and bisects first arm 742 and third arm 746, as well as bisecting a first arm 742b and a third arm 746b of second current collector 700b.

A cross-section E-E is perpendicular to the xy-plane and bisects second arm 744 and fourth arm 748, as well as bisecting the second arm (not shown) and the fourth arm (not shown) of second current collector 700b. The view along cross-section E-E is essentially similar to that depicted in FIG. 4B.

Figure 8:
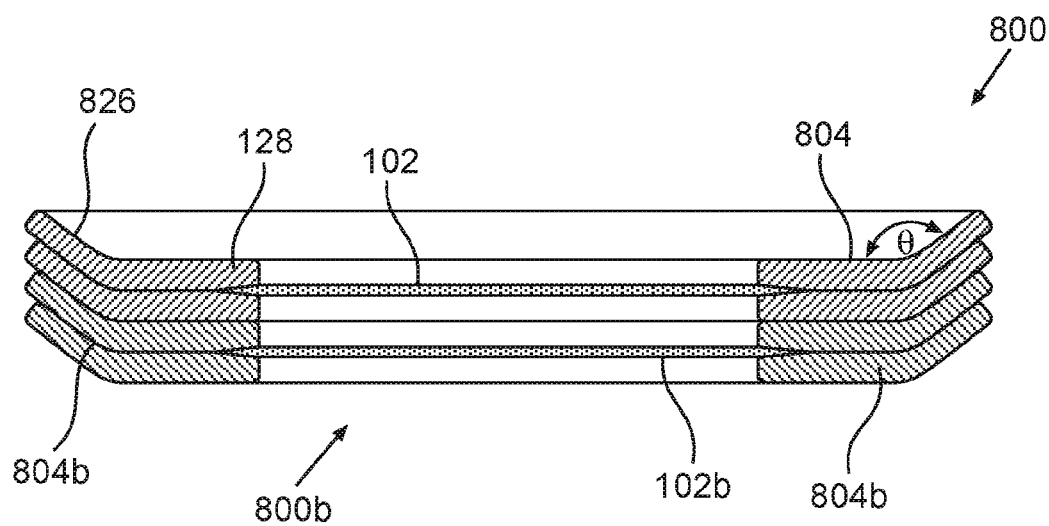
FIG. 8 presents a cross-sectional view of a self-aligning current collector, placed on top of a second self-aligning current collector identical thereto, according to some embodiments.

FIG. 8 presents a cross-sectional view of a pair of identical self-aligning current collectors: a current collector 800 and a second current collector 800*b*. Current collector 800 is placed on second current collector 800*b*, such as to be aligned therewith. Current collector 800 is a specific embodiment of current collector 100 and includes conductive sheet 102 and a framing structure 804, which is a specific embodiment of framing structure 104. The cross-section is taken along a plane perpendicular to the xy-plane and that bisects two opposite arms (not numbered) of current collector 800 and two opposite arms (not numbered) of second current collector 800*b* (similarly to cross-section D-D in FIG. 7).

Framing structure 804 includes inner perimetral portion 128 and an outer perimetral portion 826 (which is a specific embodiment of outer perimetral portion 126). Outer perimetral portion 826 is tilted relative to inner perimetral portion 128, such that an angle $90°<\theta<180°$ is subtended between outer perimetral portion 826 and inner perimetral portion 128. (The tilting of outer perimetral portion 826 constitutes a geometrical feature, which renders current collector 800 self-aligning.) According to some embodiments, θ equals about 45°. According to some embodiments, as depicted in FIG. 8, framing structure 804 includes two dielectric frames, similarly to framing structure 304 of current collector 300.

Figure 9:
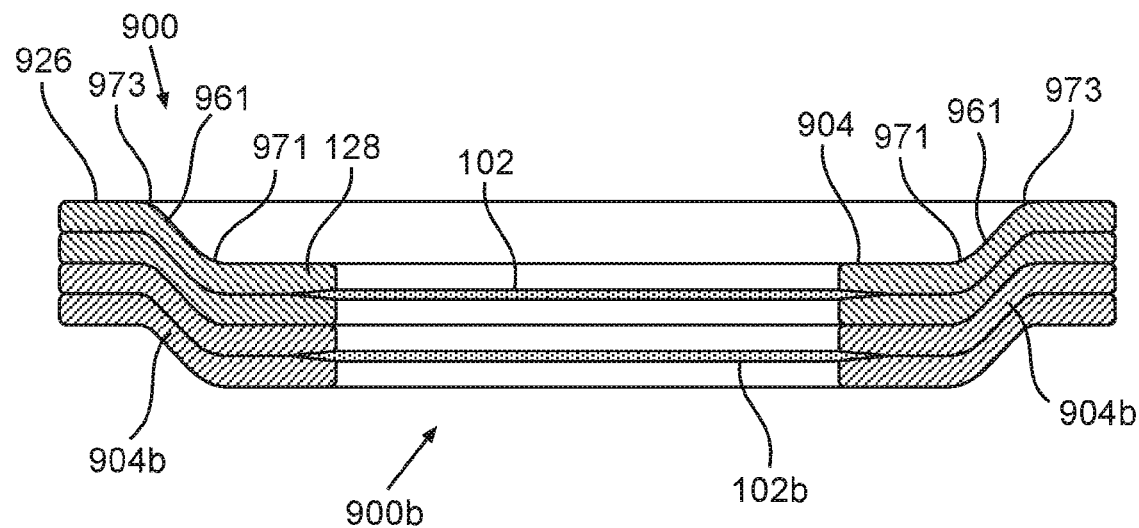
FIG. 9 presents a cross-sectional view of a self-aligning current collector, placed on top of a second self-aligning current collector identical thereto, according to some embodiments.

FIG. 9 presents a cross-sectional view of a pair of identical self-aligning current collectors: a current collector 900 and a second current collector 900*b*. Current collector 900 is placed on second current collector 900*b*, such as to be aligned therewith. Current collector 900 is a specific embodiment of current collector 100 and includes conductive sheet 102 and a framing structure 904, which is a specific embodiment of framing structure 104. The cross-section is taken along a plane perpendicular to the xy-plane and that bisects two opposite arms (not numbered) of current collector 900 and two opposite arms of second current collector 900*b* (similarly to cross-section D-D in FIG. 7).

Framing structure 904 includes inner perimetral portion 128, an outer perimetral portion 926, which is a specific embodiment of outer perimetral portion 126, and an intermediate portion 961, positioned there between. Intermediate portion 961 is bordered at an intermediate portion inner border 971 by inner perimetral portion 128, and at an intermediate portion outer border 973 by outer perimetral portion 926. Intermediate portion 961 is tilted relative to both inner perimetral portion 128 and outer perimetral portion 926, such that intermediate portion outer border 973 is elevated relative to intermediate portion inner border 971. According to some embodiments, inner perimetral portion 128 and outer perimetral portion 926 are parallel. In some such embodiments, inner perimetral portion 128 and outer perimetral portion 926 are parallel to the xy-plane—outer perimetral portion 926 constituting a flat shelf surrounding intermediate portion 961. (The tilting of intermediate portion 961 constitutes a geometrical feature, which renders current collector 900 self-aligning.) According to some embodiments, intermediate portion 961 is included in outer perimetral portion 926, which borders inner perimetral portion 128.

According to some embodiments, as depicted in FIG. 9, framing structure 904 includes two dielectric frames, essentially similarly to framing structure 304 of current collector 300.

According to an aspect of some embodiments, there is provided a framed separator. FIGS. 10A-10D schematically depict a first embodiment of a framed separator 1000. Making reference to FIGS. 10A-10B, separator 1000 includes an electrically insulating sheet 1002 (e.g. a thin electrically insulating film or foil, as elaborated on below) and a dielectric framing structure 1004. Insulating sheet 1002 and framing structure 1004 are shaped similarly to conductive sheet 102 and collector framing structure 104, respectively, but may differ in dimensions and in composition, as elaborated on below. Insulating sheet 1002 includes a top surface 1012 and a bottom surface 1014. An edge portion 1016 of insulating sheet 1002 extends along an edge 1018 of insulating sheet 1002. To facilitate the description, separator 1000 is assumed to lie on a plane parallel to the xy-plane.

Insulating sheet 1002 is made of an ion-permeable material, that is to say, a material allowing the passage of ions therethrough (and being electrically insulating, preventing the passage of electrons therethrough). According to some embodiments, insulating sheet 1002 is a single highly porous membrane (i.e. the membrane includes pores). According to some embodiments, insulating sheet 1002 is multi-layered, e.g. being made of a number of separate highly porous membranes, which are arranged successively. According to some embodiments, the one or more membranes are made of a hydrophilic material. According to some embodiments, the one or more membranes are made of polyvinyl alcohol (PVA), polyethylene coated with PVA, and cellulose-based materials.

According to some embodiments, insulating sheet 1002 thickness can be as low as about 10 μm. According to some embodiments, insulating sheet 1002 thickness can be as high as about 70 μm.

According to some embodiments, insulating sheet 1002 has an electrode applied thereto, as elaborated on below. According to some embodiments, the electrode is applied to top surface 1012. According to some embodiments, the electrode is applied to bottom surface 1014. According to some embodiments, a first electrode is applied to top surface 1012 and a second electrode is applied to bottom surface 1014.

According to some embodiments, insulating sheet 1002 has an electrode printed thereon, as elaborated on below. According to some embodiments, the electrode is printed on top surface 1012. According to some embodiments, the electrode is printed on bottom surface 1014. According to some embodiments, a first electrode is printed on top surface 1012 and a second electrode is printed on bottom surface 1014.

According to some embodiments, the application process is selected from the group consisting of pressing, printing, 3D printing, coating, and casting.

Figure 10A:
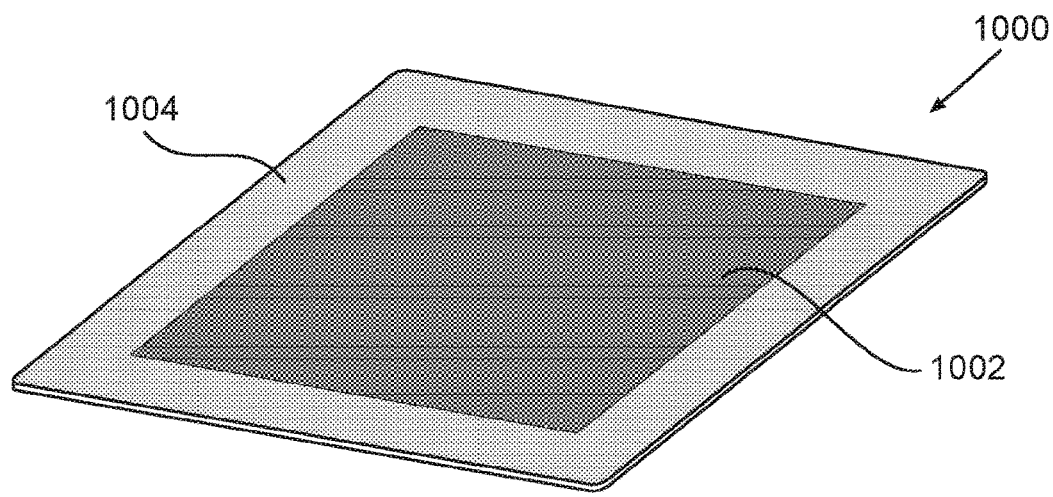
FIG. 10A schematically depicts a supercapacitor separator, according to some embodiments.
Figure 10B:
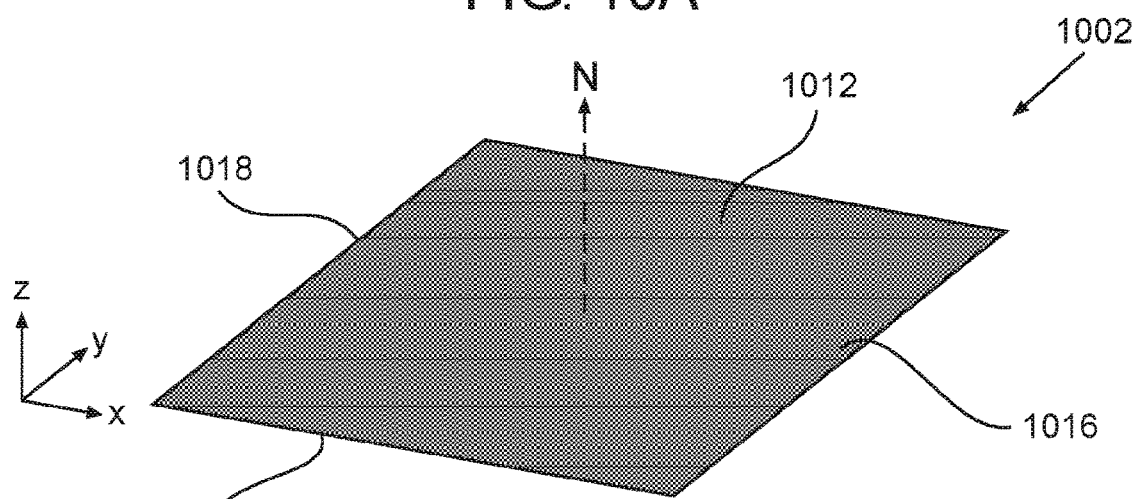
FIG. 10B schematically depicts an insulating sheet of the separator of FIG. 9A, according to some embodiments.
Figure 10C:
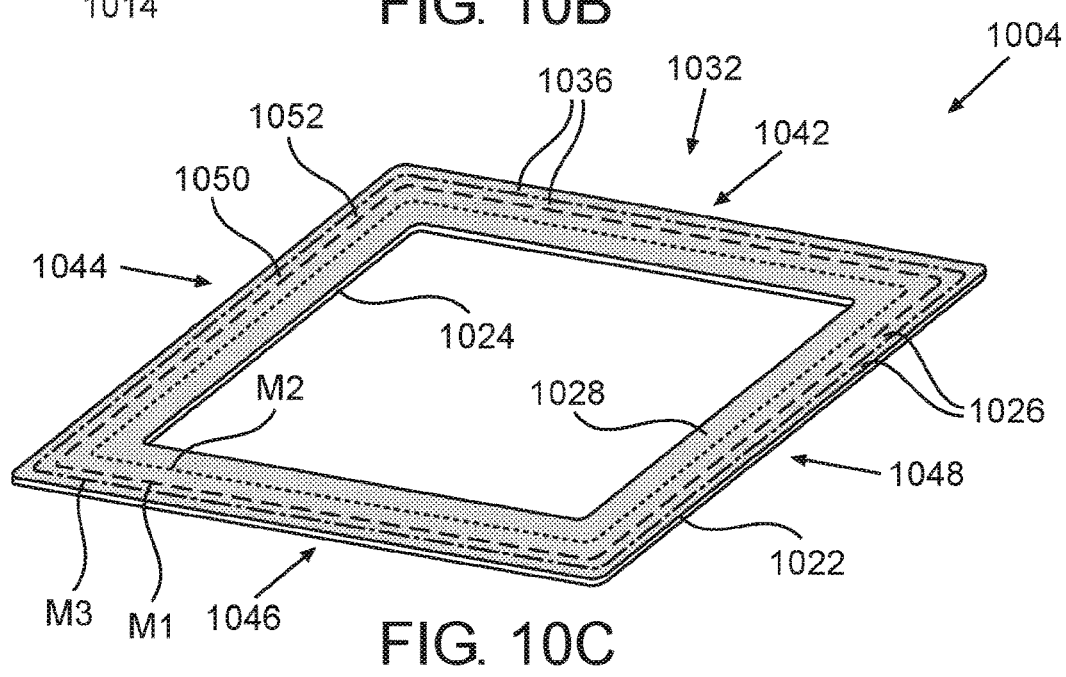
FIG. 10C schematically depicts a framing structure of the separator of FIG. 9A, according to some embodiments.

Making reference also to FIG. 10C, framing structure 1004 is shaped as a closed-frame, e.g. a rectangular frame (as depicted in FIGS. 10A and 10C) or a round frame, having an outer perimeter 1022 and an inner perimeter 1024. An outer perimetral portion 1026 of framing structure 1004 extends inwards (i.e. towards inner perimeter 1024) from outer perimeter 1022, having an inner border indicated by a dashed line M1, which runs parallel to outer perimeter 1022. An inner perimetral portion 1028 of framing structure 1004 extends outwards (i.e. towards outer perimeter 1022) from inner perimeter 1024, having an outer border indicated by a dotted line M2, which runs parallel inner perimeter 1024. According to some embodiments, outer perimetral portion 1026 and inner perimetral portion 1028 are complementary.

According to some embodiments, framing structure 1004 is shaped as a polyform-like frame. According to some embodiments, framing structure 1004 is shaped as a convex polyform-like frame.

Framing structure 1004 includes a contact portion 1050. Contact portion 1050 has an inner border indicated by dashed line M1 and an outer border indicated by a dashed-dotted line M3, which surrounds dashed line M1 and runs parallel thereto. Contact portion 1050 is included in outer perimetral portion 1026. According to some embodiments, outer perimetral portion 1026 consists of contact portion 1050 (in such embodiments, dashed-dotted line M3 coincides with outer perimeter 1022).

Figure 10D:
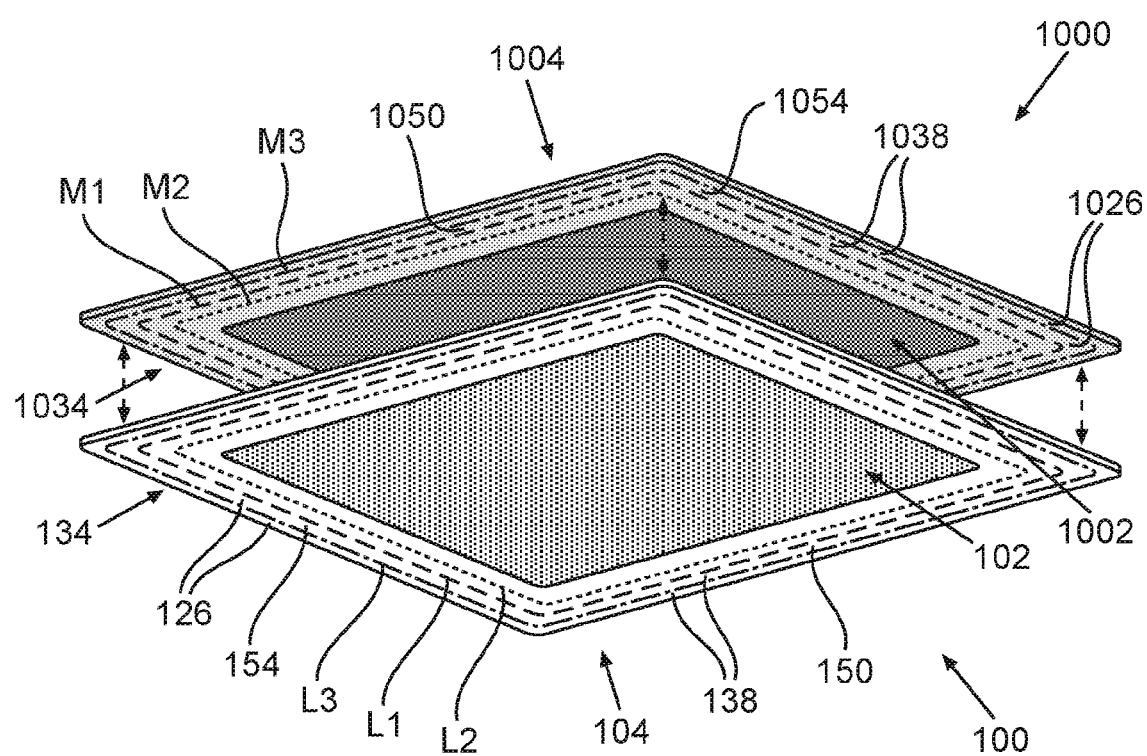

Framing structure 1004 further includes a top side 1032 and a bottom side 1034 (shown in FIG. 10D). An outer portion top side 1036 consists of the top side of outer perimetral portion 1026. An outer portion bottom side 1038 (shown in FIG. 10D) consists of the bottom side of outer perimetral portion 1026. A contact portion top side 1052 consists of the top side of contact portion 1050. A contact portion bottom side 1054 (shown in FIG. 10D) consists of the bottom side of contact portion 1050. Contact portion top side 1052 and contact portion bottom side 1054 define two matching surfaces, as elaborated on below (and similarly to contact portion top side 152 and contact portion bottom side 154 of current collector 100). According to some embodiments, contact portion top side 1052 and contact portion bottom side 1054 are flat. According to some embodiments, contact portion top side 1052 and outer portion bottom side 1054 are parallel to the xy-plane. According to some embodiments, outer portion top side 1036 and outer portion bottom side 1038 define two matching surfaces, similarly to outer portion top side 136 and outer portion bottom side 138 of current collector 100. According to some embodiments, outer portion top side 1036 and outer portion bottom side 1038 are flat. According to some embodiments, outer portion top side 1036 and outer portion bottom side 1038 are parallel to the xy-plane. According to some embodiments, framing structure top side 1032 and framing structure bottom side 1034 define two matching surfaces.

According to some embodiments, as depicted in FIG. 10C, framing structure 1004 is rectangular, including four arms: a first arm 1042, a second arm 1044, a third arm 1046, and a fourth arm 1048. First arm 1042 is joined at respective ends thereof (not numbered) to second arm 1044 and fourth arm 1048. Third arm 1046 is joined at respective ends thereof (not numbered) to second arm 1044 and fourth arm 1048. Third arm 1046 is positioned oppositely to first arm 1042 and extends parallel thereto. Fourth arm 1048 is positioned oppositely to second arm 1044 and extends parallel thereto.

Essentially similarly to collector framing structure 104, separator framing structure 1004 is configured (shaped) to allow the alignment thereof on a second framing structure identical thereto. More specifically, framing structure 1004 is shaped to allow the placing thereof on the second framing structure, such that substantially every location on contact portion bottom side 1054 is contiguous, or substantially contiguous, to a corresponding location on the top side of the contact portion of the second framing structure.

According to some embodiments, framing structure 1004 is shaped to allow the placing thereof on the second framing structure, such that substantially every location on outer portion bottom side 1038 is contiguous, or substantially contiguous, to a corresponding location on the top side of the outer portion of the second framing structure.

According to some embodiments, framing structure 1004 can be placed on the second framing structure, such that substantially every location on bottom side 1034 is contiguous, or substantially contiguous, to a corresponding location on the top side of the second framing structure.

It is noted that since framing structure 1004 and the second framing structure are identical, the second framing structure can equally be placed on framing structure 1004, such that the bottom side of the contact portion of the second framing structure is contiguous, or substantially contiguous, to contact portion top side 1052.

Similarly to collector framing structure 104, separator framing structure 1004 is made of a dielectric material, such as the thermoplastics listed above in the description of collector framing structure 104. According to some embodiments, framing structure 1004 is rigid, in particular, not including any plasticizer-type additives. According to some embodiments, framing structure 1004 is resiliently flexible.

According to some embodiments, framing structure 1004 is substantially square, and the arms of framing structure 1004 measure about 20 cm in length. According to some embodiments, the width of framing structure 1004 is about 10 mm. According to some embodiments, the width of inner perimetral portion 1028 (the distance between inner perimeter 1024 and dotted line M1) is at least about 40% (up to approximately 90%) of framing structure 1004 width, that is to say, at least about 4 mm when framing structure 1004 width is 10 mm. According to some embodiments, the width of inner perimetral portion 1028 is as large as about 50% of the width of framing structure 1004.

According to some embodiments, outer perimeter 1022 of framing structure 1004 is greater than perimeter 1018 of insulating sheet 1002 by at least about 40%. According to further embodiments, the outer perimeter of the framing structure is greater than the perimeter of the conductive sheet by at least about 45%, at least about 50%, at least about 55%, at least about 60%, or at least about 65%. Each possibility represents a separate embodiment of the invention.

According to some embodiments, a width of outer perimetral portion 1026 of framing structure 1004 constitutes at least about 20% of the total width of framed separator 1000. As indicated hereinabove, outer perimetral portion 1026 extends from outer perimeter 1022 of framing structure 1004 to the inner border indicated by a dashed line M1. In some embodiments, outer perimetral portion 1026 extends from outer perimeter 1022 to outer border of inner perimetral portion 1028 indicated by a dashed line M2. In additional embodiments, outer perimetral portion 1026 extends from outer perimeter 1022 to edge 1018 of insulating sheet 1002. In further embodiments, width of the outer perimetral portion of the framing structure constitutes at least about 25% of the total width of the framed separator, at least about 30%, at least about 35%, at least about 40%, or at least about 45% of the total width of the framed separator. Each possibility represents a separate embodiment of the invention.

According to some embodiments, the thickness of framing structure 1004 can be as small as about 0.2 mm, or even about 0.1 mm. According to some embodiments, the thickness of framing structure 1004, can be as large as about 0.7 mm, about 1 mm, about 1.4 mm, or even as large as about 2 mm.

Framing structure 1004 circumscribes insulating sheet 1002. Insulating sheet 1002 and framing structure 1004 are attached onto one another at edge portion 1016 and inner perimetral portion 1028, respectively, as elaborated on below. Essentially similarly to conductive sheet 102 and collector framing structure 104, insulating sheet 1002 attachment to separator framing structure 1004 allows mutually aligning separator 1000 with a second separator identical thereto (and which includes the second framing structure described above), as elaborated on below. Insulating sheet 1002 and framing structure 1004 may be attached onto one another using a suitable adhesion technique and/or adhesive material (e.g. heating, pressing, heat-pressing, heat-fusing, laser, laser welding, ultrasonic welding, soldering, and the like, and/or glue), as elaborated on below.

Making reference to FIG. 10D, according to some embodiments, wherein current collector 100 and separator 1000 are fabricated as components of a same supercapacitor stack model, current collector 100 and separator 1000 can be mutually aligned one on top of the other.

More specifically, in such embodiments, collector framing structure 104 and separator framing structure 1004 match, in the sense that contact portion top side 152 (of collector framing structure 104) and contact portion bottom side 1054 (of separator framing structure 1004) constitute matching surfaces, and outer portion bottom side 154 (of collector framing structure 104) and outer portion top side 1052 (of separator framing structure 1004) constitute matching surfaces. That is to say, separator 1000 can be placed on current collector 100 such that substantially every location on contact portion bottom side 1054 (of separator framing structure 1004) is contiguous or substantially contiguous to a corresponding location on contact portion top side 152 (of collector framing structure 104). Similarly, current collector 100 can be placed on separator 1000 such that substantially every location on contact portion bottom side 154 (of collector framing structure 104) is contiguous or substantially contiguous to a corresponding location on contact portion top side 1052 (of separator framing structure 1004). According to some such embodiments, collector framing structure 104 and separator framing structure 1004 match, in the sense that outer portion top side 136 (of collector framing structure 104) and outer portion bottom side 1038 (of separator framing structure 1004) constitute matching surfaces, and outer portion bottom side 138 (of collector framing structure 104) and outer portion top side 1036 (of separator framing structure 1004) constitute matching surfaces. According to some such embodiments, collector framing structure 104 and separator framing structure 1004 match, in the sense that top side 132 (of collector framing structure 104) and bottom side 1034 (of separator framing structure 1004) constitute matching surfaces, and bottom side 134 (of collector framing structure 104) and top side 1032 (of separator framing structure 1004) constitute matching surfaces. It is noted that in some such embodiments, collector framing structure 104 and separator framing structure 1004 differ in thickness and/or conductive sheet 102 and insulating sheet 1002 differ in thickness.

It is noted that the term "matching", with reference two or more elements (e.g. parts), as used in various embodiments, should not be construed as requiring identity of the elements (though some of the embodiments disclosed herein, include identical elements which are matching, such as current collector 400 and second current collector 400*b*). For example, if we partition a square into two non-symmetrical parts (e.g. such that one of the parts has a convex edge (resulting from the partition) and the other one has a concave edge), the two parts are matching but are not identical.

Figure 11A:
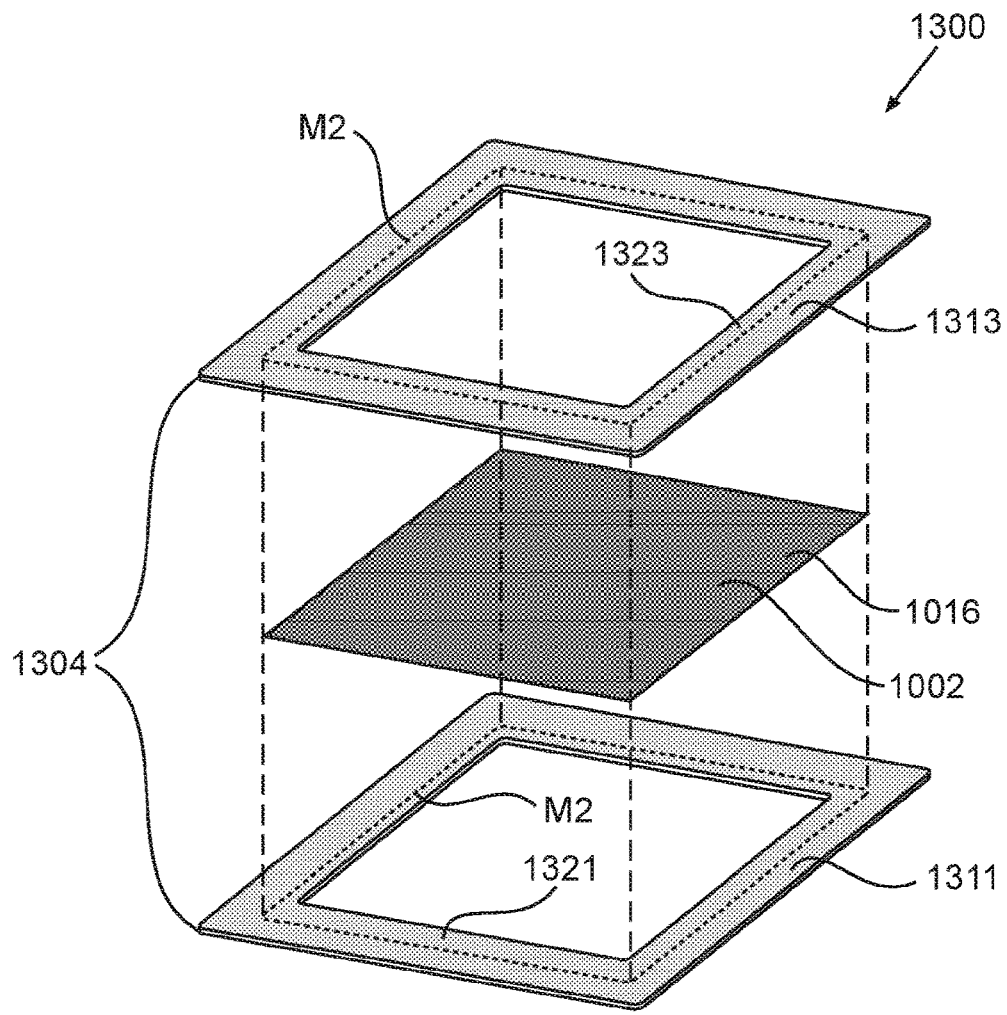
FIG. 11A presents an exploded-view of a specific embodiment of the separator of FIG. 10A, wherein the framing structure includes two dielectric frames.

FIG. 11A schematically depicts an exploded view of a separator 1300. Separator 1300 is a specific embodiment of separator 1000, and includes insulating sheet 1002 and a framing structure 1304. Framing structure 1304, which is a specific embodiment of framing structure 1004, includes a pair of dielectric frames: a first dielectric frame 1311 and a second dielectric frame 1313. Edge portion 1016 is sandwiched between an inner perimetral portion 1321 of first dielectric frame 1311 and an inner perimetral portion 1323 of second dielectric frame 1313 (thereby attaching insulating sheet 1002 onto framing structure 1304, as elaborated on below). Inner perimetral portion 1321 extends along the inner perimeter (not numbered) of first dielectric frame 1311, and inner perimetral portion 1323 extends along the inner perimeter (not numbered) of second dielectric frame 1313. Inner perimetral portions 1321 and 1323 make up the inner perimetral portion of framing structure 1304. According to some embodiments, first dielectric frame 1311 and second dielectric frame 1313 are identical. According to some embodiments, first dielectric frame 1311 and second dielectric frame 1313 differ in thickness. According to some embodiments, insulating sheet 1002 is bonded onto dielectric frames 1311 and 1313 by heat-pressing and/or gluing edge portion 1016 between inner perimetral portion 1321 and inner perimetral portion 1323.

Figure 11B:
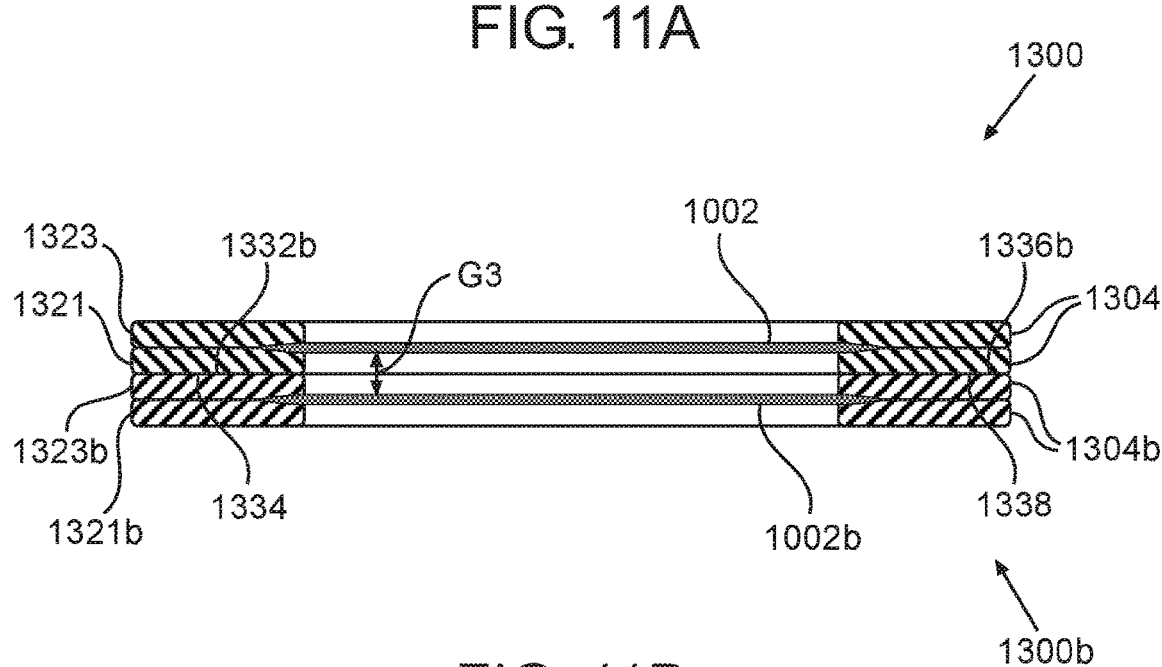
FIG. 11B presents a cross-sectional view of the separator of FIG. 11A, placed on top a second separator identical thereto, according to some embodiments.

FIG. 11B presents a cross-sectional view of separator 1300 and a second separator 1300*b*, identical thereto, on which separator 1300 is placed such as be aligned therewith. The cross-section is taken along a plane perpendicular to the xy-plane, and that bisects two opposite arms (not numbered) of separator 1300 and two opposite arms of second separator 1300*b* (similarly to cross-section C-C in FIG. 3C).

As shown in FIG. 11B, insulating sheet 1002 attachment to framing structure 1304 allows mutually aligning separator 1300 and second separator 1300*b*. More specifically, insulating sheet 1002 attachment to framing structure 1304 allows placing separator 1300 on second separator 1300*b*, such that an outer portion bottom side 1338 of framing structure 1304 is contiguous or substantially contiguous to an outer portion top side 1336*b* of the framing structure of second separator 1300*b*. According to some embodiments, insulating sheet 1002 attachment to framing structure 1304 allows placing separator 1300 on second separator 1300*b*, such that a bottom side 1334 of framing structure 1304 is contiguous or substantially contiguous to a top side 1332*b* of the framing structure of second separator 1300*b*. Further, according to some embodiments, separator 1300 is configured such that when mutually aligned with second separator 1300*b*, insulating sheet 1002 and a second insulating sheet 1002*b* (the insulating sheet of second separator 1300*b*) are separated by a gap G3. According to some embodiments, gap G3 is broad enough to allow disposing therein, in a layered manner, a first electrode, a conductive sheet, and a second electrode, as elaborated on below in the subsection "Supercapacitor stacks".

According to some embodiments, wherein current collector 300 and separator 1300 are fabricated as components of a same supercapacitor stack model, current collector 300 and separator 1300 can be mutually aligned one on top of the other.

According to some embodiments, wherein current collector 200 and separator 1300 are fabricated as components of a same supercapacitor stack model, current collector 200 and separator 1300 can be mutually aligned one on top of the other.

According to some embodiments of separator 1000 (not shown in the figures), framing structure 1004 consists essentially of a single dielectric frame. The dielectric frame may be attached onto insulating sheet 1002 from the top, or from the bottom (similarly to collector dielectric frame 211 and conductive sheet 102), using similar bonding techniques/materials to those described above in the description of separator 1300.

According to some embodiments of separator 1000 (not shown in the figures), framing structure 1004 is over-molded over insulating sheet 1002, similarly to as described above with respect to current collector 100.

According to some embodiments of separator 1000 (not shown in the figures), framing structure 1004 is made of an elastomer, and the attachment to conductive sheet 102 is gasket-like.

Figure 12A:
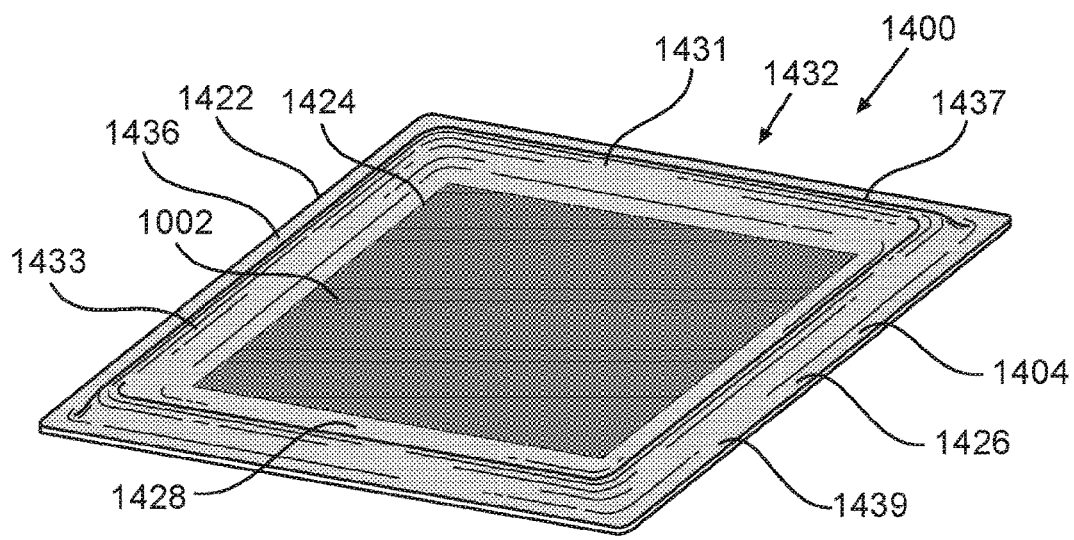
FIG. 12A schematically depicts a self-aligning separator with a wave-like geometrical feature, according to some embodiments.
Figure 12B:
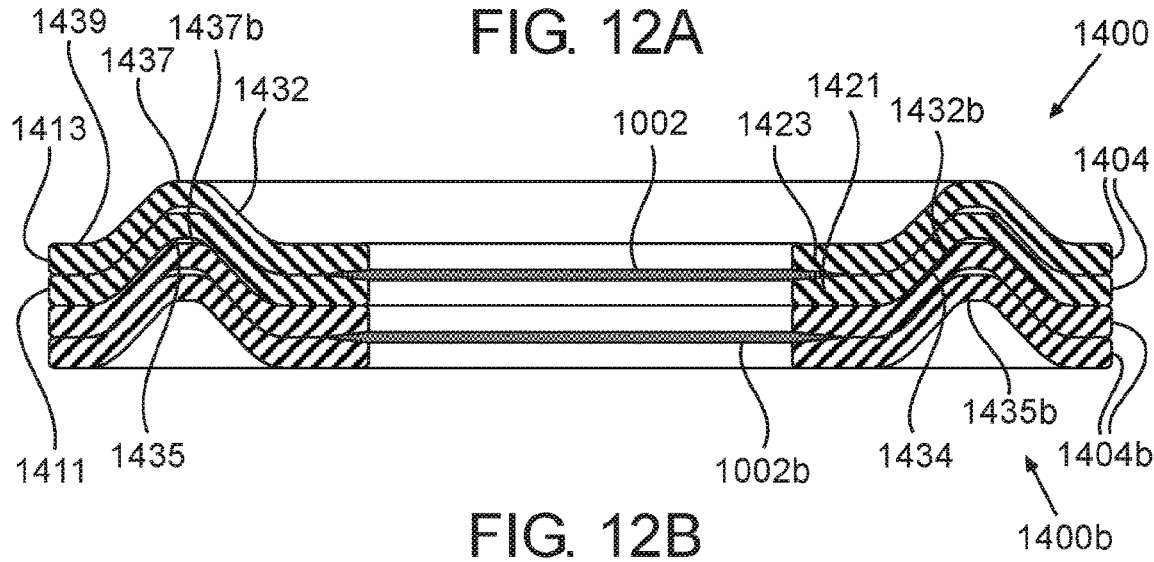
FIG. 12B presents a cross-sectional view of the self-aligning separator of FIG. 12A, placed on top of a second self-aligning separator identical thereto, according to some embodiments.

FIG. 12A schematically depicts a framed separator 1400. Separator 1400 is a specific embodiment of framed separator 1000 and is self-aligning, essentially similarly to current collector 400. FIG. 12B presents a cross-sectional view of a pair of identical separators: separator 1400 and a second separator 1400b. Separators 1400 and 1400b are mutually self-aligned with separator 1400 being placed on second separator 1400b, as elaborated on below.

The cross-section is taken along a plane perpendicular to the xy-plane, which bisects separators 1400 and 1400b, similarly to how cross-section C-C bisects current collectors 300 and 300b in FIG. 3B.

Making reference to FIG. 12A, separator 1400 includes insulating sheet 1002 and a framing structure 1404, which is a specific embodiment of framing structure 1004. An outer perimeter 1422, an inner perimeter 1424, an outer perimetral portion 1426, an inner perimetral portion 1428, a top side 1432, a bottom side 1434 (shown in FIG. 12B), and an outer portion top side 1436 are specific embodiments of outer perimeter 1022, inner perimeter 1024, outer perimetral portion 1026, inner perimetral portion 1028, top side 1032, bottom side 1034, and outer portion top side 1036, respectively.

Framing structure 1404 includes a geometrical feature 1431. Geometrical feature 1431 is similar to collector geometrical feature 431, and includes a wave-like projection 1433 on top side 1432. Wave-like projection 1433 extends fully around framing structure 1404. A crest 1437 of wave-like projection 1433 runs parallel to perimeters 1422 and 1424. On bottom side 1434 geometrical feature 1431 forms an indentation 1435 (hidden from view in FIG. 12A but shown in FIG. 12B) in the upwards direction, which matches wave-like projection 1433. In other words, and as shown in FIG. 12B, the cross-section of framing structure 1404 defines a wave-like shaped curve. According to some embodiments, the cross-section of framing structure 1404 substantially defines an "inverted V"-shaped curve. According to some such embodiments, the "arms" (not numbered) of the "V" subtend an angle of about 45° there between, and crest 1437 projects between about 2 mm to about 4 mm from top side 1432 (for example, when framing structure 1404 is about 10 mm wide).

Top side 1432 and bottom side 1434 constitute matching surfaces, thereby allowing placing separator 1400 on second separator 1400b, such as to be aligned therewith, that is to say, such that substantially every location on bottom side 1434 is contiguous, or substantially contiguous, to a corresponding location on a top side 1432b of the framing structure of second separator 1400b. In particular, when two separators, such as separators 1400 and 1400b, are thus mutually aligned, the crests of the respective geometrical features thereof (i.e. crest 1437 and a crest 1437b of second separator 1400b) are positioned substantially directly one above the other.

According to some embodiments, and as depicted in FIGS. 12A-12B, framing structure 1404 includes a flat shelf-like portion 1439 surrounding wave-like projection 1433.

According to some embodiments of separator 1400, and as depicted in FIG. 12B, framing structure 1404 includes a pair of dielectric frames: a first dielectric frame 1411 and a second dielectric frame 1413. Edge portion 1016 is sandwiched between an inner perimetral portion 1421 of first dielectric frame 1411 and an inner perimetral portion 1423 of second dielectric frame 1413, essentially as described with respect to insulating sheet 1002 and dielectric frames 1311 and 1313 in the description of FIGS. 11A-11B.

Similarly to current collector 400, separator 1400 is said to be "self-aligning" in the sense that geometrical feature 1431 functions as a jig or fixture for the placement of a second separator, identical to current separator 1400, on separator 1400, and for the alignment of the second separator relative to separator 1400. Further, according to some embodiments, geometrical feature 1431 functions as a jig for the placement of insulating sheet 1002 on first dielectric frame 1411 during the fabrication of separator 1400.

According to some embodiments, wherein current collector 400 and separator 1400 are fabricated as components of a same supercapacitor stack model, current collector 400 and separator 1400 can be mutually aligned one on top of the other.

According to some embodiments, wherein current collector 500 and separator 1400 are fabricated as components of a same supercapacitor stack model, current collector 500 and separator 1400 can be mutually aligned one on top of the other.

According to some embodiments disclosed herein, there is provided a self-aligning separator (not depicted in the figures), including a geometrical feature essentially similar to collector geometrical feature 631, depicted in FIG. 6.

According to some embodiments disclosed herein, there is provided a self-aligning separator (not depicted in the figures), including a geometrical feature essentially similar to collector geometrical feature 731, depicted in FIGS. 7A-7B.

According to some embodiments disclosed herein, there is provided a self-aligning separator (not depicted in the figures), including a tilted outer perimetral portion essentially similar to (the tilted) collector outer perimetral portion 826, depicted in FIG. 8.

According to some embodiments disclosed herein, there is provided a self-aligning separator (not depicted in the figures), including a tiled intermediate portion essentially similar to (the tilted) collector intermediate portion 961, depicted in FIG. 9.

Supercapacitor stacks According to an aspect of some embodiments, there is provided a sealed (e.g. fluidly sealed) supercapacitor stack. According to some embodiments, the supercapacitor stack includes a plurality of supercapacitor cells connected in a series. According to some embodiments, as depicted in FIG. 13B and FIG. 14B, adjacent supercapacitor cells share a current collector (such as framed current collector 100 or framed current collector 400), that is to say, the top current collector of a first supercapacitor cell is the bottom current collector of a second supercapacitor cell adjacent to the first supercapacitor cell from above. As used herein, the term "common current collector configuration" with reference to a supercapacitor stack, refers to a configuration of a supercapacitor stack, wherein adjacent supercapacitor cells have a common current collector (i.e. share a current collector). In certain such embodiments, the second electrode of the first supercapacitor cell contacts the bottom surface of the conductive sheet of the common current collector, and the first electrode of the second supercapacitor cell contacts the top surface of the conductive sheet of the common current collector (the common current collector is "shared" between the first supercapacitor cell and the second supercapacitor cell).

Figure 13A:
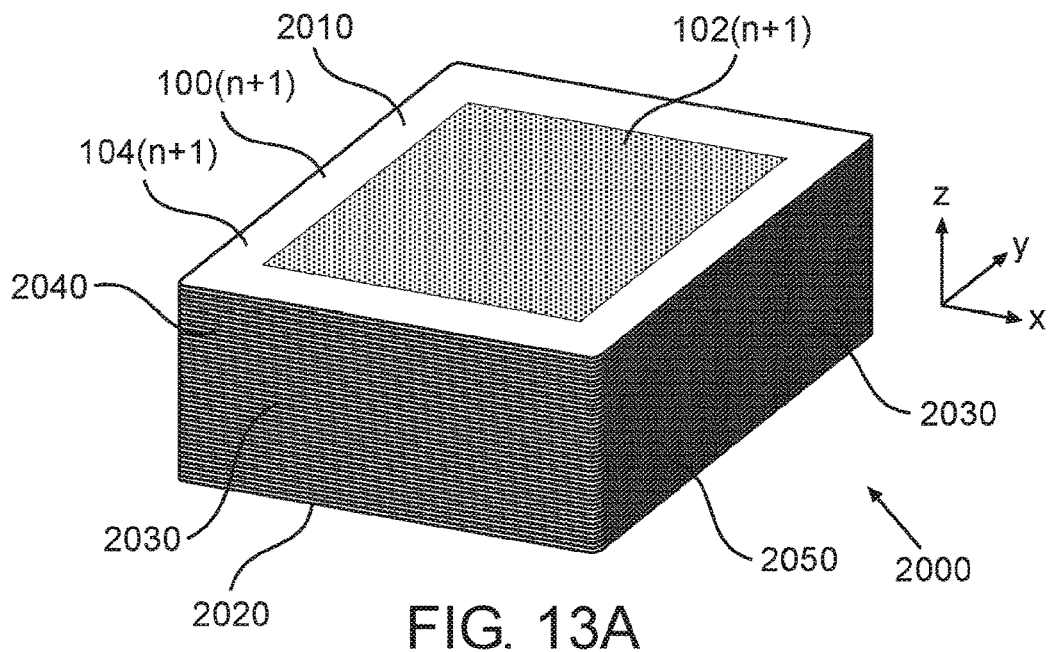
FIG. 13A schematically depicts a fluidly sealed supercapacitor stack, including current collectors and separators identical to the current collector of FIG. 1A and the separator of FIG. 10A, respectively, according to some embodiments.
Figure 13B:
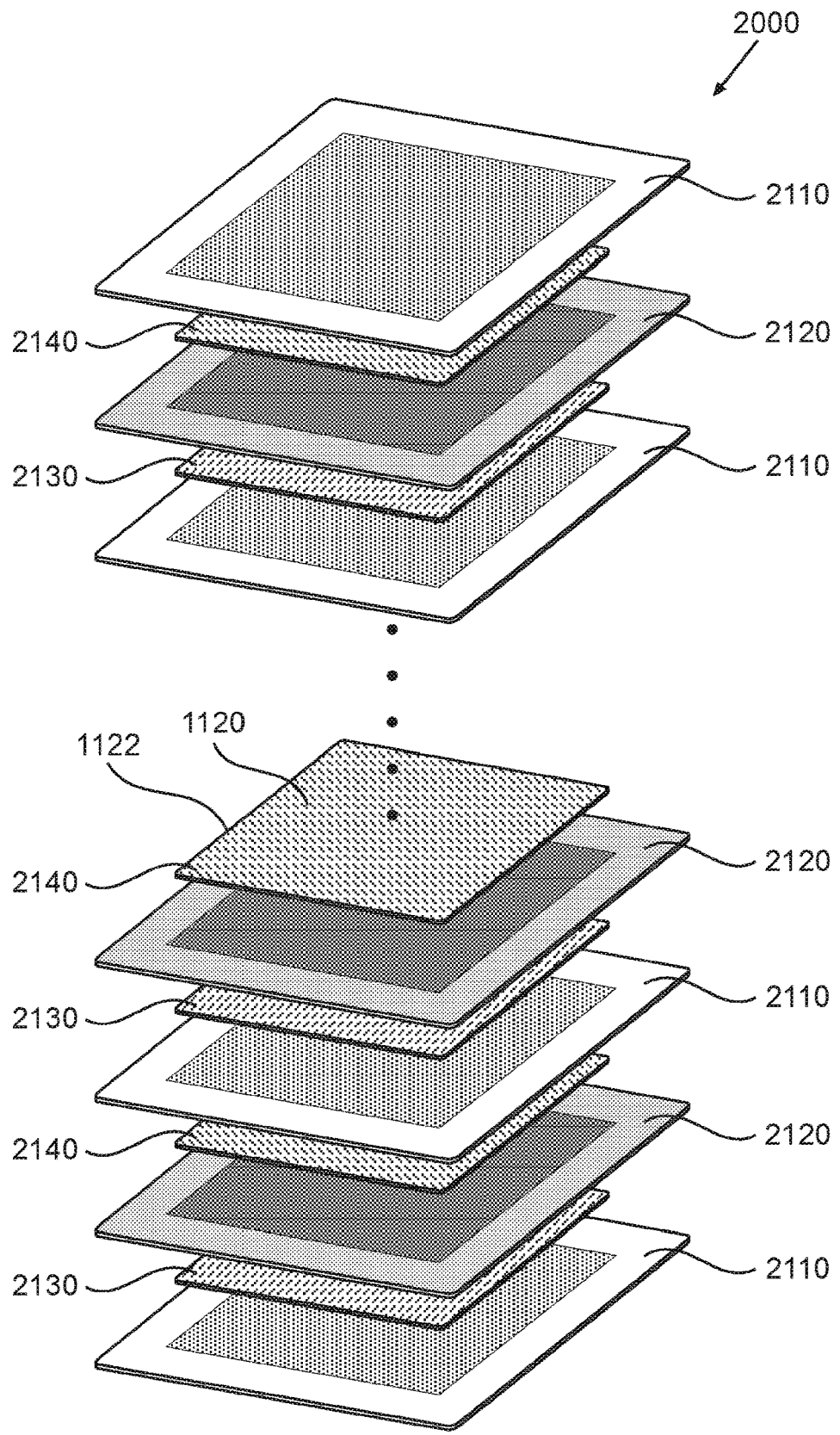
FIG. 13B presents an exploded view of the supercapacitor stack of FIG. 13A, according to some embodiments.
Figure 13C:
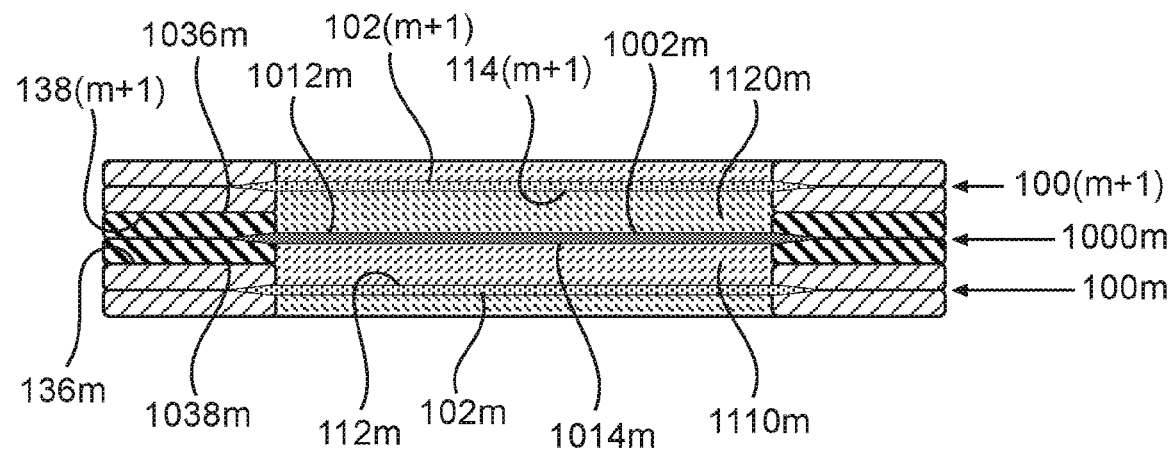
FIG. 13C presents a cross-sectional view of three structural strata of the supercapacitor stack of FIG. 13A, according to some embodiments.

FIGS. 13A-13C schematically depict a first embodiment of a supercapacitor stack 2000. Making reference to FIG. 13A, stack 2000 includes a stack top 2010, a stack bottom 2020, and stack sides 2030. Stack 2000 further includes a stack top portion 2040 and a stack base portion 2050.

FIG. 13B presents an exploded view of stack 2000. Stack 2000 includes 2n+1 structural strata, consisting of n+1 framed current collectors 2110 and n framed separators 2120. Each of framed current collectors 2110 is identical to framed current collector 100. Each of framed separators 2120 is identical to separator 1000. Stack 2000 further includes n first electrodes 2130, each being identical to a first electrode 1110 (shown in full in FIG. 14b), and n second electrodes 2140, each being identical to a second electrode 1120 (shown in full in FIG. 13b).

According to some embodiments, n=1. According to some embodiments, depending on the thickness of the current collectors, separators, and electrodes, n can be as large as 50, or even 100. For example, according to some embodiments, wherein the framing structures of current collectors 2110 and separators 2120 are rectangular, having the same dimensions parallel to the xy-plane, with each of the two shorter arms and the two longer arms of each of the framing structures having lengths a and b, respectively, the height of stack 2000 is no greater than about 2a.

As shown in FIG. 13A, the uppermost of current collectors 2110, an (n+1)th framed current collector 100(n+1), is exposed on stack top 2010. The bottommost of current collectors 2110 (not numbered) is exposed on stack bottom 2020.

First electrode 1110 and second electrode 1120 are each porous (i.e. the respective surfaces thereof include pores, which extend into the bulk of the electrodes). In some embodiments, wherein the electrodes are not printed on the conductive sheets and/or insulating sheets, the electrodes may be prepared as thin sheets. According to some embodiments, the electrodes have lateral dimensions (parallel to the xy-plane) slightly smaller than those of the inner perimeters of the framing structures of the current collectors and the separators. The lateral dimensions of first electrode 1110 and second electrode 1120 are defined by a first electrode perimeter 1112 and a second electrode perimeter 1122, respectively (indicated in FIG. 14B and in FIG. 13B, respectively). In such embodiments, the slightly smaller lateral dimensions of the electrodes, as compared to those of the inner perimeters of the framing structures of the current collectors and the separators, provide space for electrolyte seeping out from the electrodes and the insulating sheets (e.g. during use of the supercapacitor stacks, or during the pressing thereof).

According to some embodiments, first electrode 1110 and second electrode 1120 are identical and may be carbon-based. According to some embodiments, first electrode 1110 and second electrode 1120 are configured asymmetrically, such as to e.g. (i) be composed of different materials, (ii) have different weights, and/or (iii) have different thicknesses. For example, first electrode 1110 may include a transition metal oxide and second electrode 1120 may be carbon-based (so that first electrode 1110 will function as the cathode and second electrode 1120 will function as the anode). Alternatively, first electrode 1110 and second electrode 1120 can include different types of carbon or different types of transition metal oxides. Non-limiting examples of transition metal oxide include manganese oxide and ruthenium oxide.

Each of first electrodes 2130, second electrodes 2140, and each of the insulating sheets of separators 2120 (being identical to insulating sheet 1002) is impregnated with an aqueous electrolyte (not shown). That is to say, the electrolyte fills (e.g. saturates) the pores (not shown) within the separators and the electrodes. According to some embodiments, the electrolyte is an aqueous-based solution which can be alkaline, acidic, or neutral. Each possibility represents a separate embodiment of the invention. Non-limiting examples of suitable aqueous electrolytes include aqueous solutions of potassium hydroxide (KOH), sodium hydroxide (NaOH), lithium oxide (LiOH), potassium sulfate ($K_2SO_4$), sodium sulfate ($Na_2SO_4$), lithium sulfate ($Li_2SO_4$), potassium chloride (KCl), sodium perchlorate ($NaClO_4$), sulfuric acid ($H_2SO_4$), hydrochloric acid (HCl), nitric acid ($HNO_3$), metanesulfonic acid (MSA, $CH_3SO_3H$), and tetrafluoroboric acid ($HBF_4$). In some embodiments, the electrolyte is an organic solvent-based electrolyte. Non-limiting examples of said organic solvent-based electrolytes include ethylene carbonate (EC), propylene carbonate (PC), diethyl carbonate (DEC), dimethyl carbonate (DMC), ethyl formate (EF), methyl formate (MF), 1-ethyl-3-methylimidazolium bis (trifluoromethylsulfonyl)imide, 1-ethyl-3-methylimidazolium trifluoromethanesulfonate, 1-hexyl-3-methylimidazolium hexafluorophosphate, 1-ethyl-3-methylimidazolium dicyanamide, and 11-methyl-3-octylimidazolium tetrafluoroborate.

Current collectors 2110, separators 2120, first electrodes 2130, and second electrodes 2140 are sequentially arranged one on top of the other as follows. Each of separators 2120 is disposed between a respective pair from current collectors 2110, such as to be mutually aligned with both of the current collectors, and such that a respective one of first electrodes 2130 is sandwiched between the separator and the lower of the two current collectors, and a respective one of second electrodes 2140 is sandwiched between the separator and the upper of the two current collectors. For example, as shown in FIG. 13C—which depicts a cross-sectional-like view of three structural strata of stack 2000 along a plane parallel to the zx-plane which bisects stack 2000—an mth separator 1000m, which is the mth separator from stack bottom 2020, is mutually aligned with an mth current collector 100m and an (m+1)th current collector 100(m+1), which are the mth and (m+1)th current collectors, respectively, from stack bottom 2020. (The first current collector from stack bottom 2020 is exposed thereon.) An mth first electrode 1110m, which is the mth first electrode from stack bottom 2020, is sandwiched between a top surface 112m of a conductive sheet 102m (i.e. the conductive sheet of mth current collector 100m) and a bottom surface 1014m of an insulating sheet 1002m (i.e. the insulating sheet of mth separator 1000m). An mth second electrode 1120m, which is the mth second electrode from stack bottom 2020, is sandwiched between a top surface 1012m of insulating sheet 1002m and a bottom surface 114(m+1) of a conductive sheet 102(m+1) (i.e. the conductive sheet of (m+1)th current collector 100(m+1)).

Adjacent structural strata are pressed onto one another. The pressing may be effected prior to the sealing of the stack, e.g. once all the current collectors, separators, and electrodes are assembled one on top of the other, thereby, according to some embodiments, compressing the pre-sealed stack. The pressing serves to remove excesses of the aqueous electrolyte and to force out air from the pre-sealed stack, prior to the sealing thereof.

The outer perimetral portion of each separator is heat-fused (heat-welded) onto both the outer perimetral portion of the current collector immediately above thereto and the outer perimetral portion of the current collector immediately below thereto, thereby sealing (e.g. fluidly sealing) the stack.

More specifically, the outer portion top side of the framing structure each separator is heat-fused onto the outer portion bottom side of the framing structure of the current collector immediately above thereto: e.g. an outer portion top side 1036$m$ of mth separator 1000$m$ is heat-fused onto an outer portion bottom side 138$(m+1)$ of $(m+1)$th current collector 100$(m+1)$. Further, the outer portion bottom side of the framing structure of each separator is heat-fused onto the outer portion top side of framing structure of the current collector immediately below thereto: e.g. an outer portion bottom side 1038$m$ of mth separator 1000$m$ is heat-fused onto an outer portion top side 136$m$ of mth current collector 100$m$.

According to some embodiments, the heat-fusion is effected using hot plates, which are brought into contact with the sides of the pre-sealed stack, following or during the pressing/compressing thereof. According to some embodiments, to effect the heat-fusion, the hot plates are heated to a temperature slightly below the (first) thermal decomposition temperature of the thermoplastic from which the framing structures are made (or slightly below the lower of the two (first) thermal decomposition temperatures when the collector framing structures and the separator framing structures are made of different thermoplastics). According to some embodiments, wherein the framing structures of current collectors 2110 and separators 2120 are made of PVC, the hot plates are heated to a temperature between 190° and 240° (the first thermal decomposition temperature of some commercially available PVC being 247°). According to some such embodiments, the hot plates are heated to a temperature of approximately 225°.

According to some embodiments, the heat-fusing is performed while simultaneously applying pressure on stack 2000, such as to force out air from within stack 2000. According to some such embodiments, a pressure between about 1 bar to about 6 bar is applied on the framing structure of the top current collector in stack 2000 (i.e. an $(n+1)$th framing structure 104$(n+1)$ of $(n+1)$th current collector 100$(n+1)$), which in turn presses down on the framing structures below thereto.

It is noted that when n=1, supercapacitor stack 2000 consists essentially of two current collectors, a separator, a first electrode, and a second electrode, thereby defining a single supercapacitor cell.

According to some exemplary embodiments, n=10 and supercapacitor stack 2000 measures about 2.2 cm×10 cm×10 cm. More specifically, current collectors 2110 number 11 current collectors. Separators 2120 number 10 separators. First electrodes 2130 and second electrodes 2140 are identical and number 20 electrodes in total. The framing structure of each of the current collectors is 1 mm thick (e.g. consisting essentially of two 0.5 mm dielectric frames). The framing structure of each of the separators is 1 mm thick (e.g. consisting essentially of two 0.5 mm dielectric frames). Both the conductive sheets and the insulating sheets are 50 μm thick. The framing structures (of both the current collectors and the separators) are square; the outer perimeters thereof measuring 10 cm×10 cm (and the inner perimeters thereof measuring 9.2 cm×9.2 cm). Each of the electrodes is 1 mm thick, leading to supercapacitor stack 2000 measuring about 2.2 cm in height (in particular, according to some embodiments, supercapacitor stack 2000 may measure slightly less than 2.2 cm in height due to compressing thereof).

According to some exemplary embodiments, n=20 and supercapacitor stack 2000 measures about 4.3 cm×15 cm×15 cm. More specifically, current collectors 2110 number 21 current collectors. Separators 2120 number 20 separators. First electrodes 2130 number 20 electrodes and second electrodes 2140 number 20 electrodes. The framing structure of each of the current collectors is 1 mm thick consisting essentially of a bottom dielectric frame 0.6 mm thick, such as first dielectric frame 311, and a top dielectric frame 0.4 mm thick, such as second dielectric frame 313. The framing structure of each of the separators is 1 mm thick, consisting essentially of a bottom dielectric frame 0.4 mm thick, such as first dielectric frame 1311, and a top dielectric frame 0.6 mm thick, such as second dielectric frame 1313. Both the conductive sheets and the insulating sheets are 50 jm thick. The framing structures (of both the current collectors and the separators) are square; the outer perimeters thereof measuring 15 cm×15 cm (and the inner perimeters thereof measuring 14 cm×14 cm). Each of the of the first electrodes is 1.2 mm thick and each of the second electrodes is 0.8 mm thick, leading to supercapacitor stack 2000 measuring about 4.3 cm in height (in particular, according to some embodiments, supercapacitor stack 2000 may measure slightly less than 4.3 cm in height due to compressing thereof). It is noted that if both the first electrodes and the second are made of the same material, e.g. of a same carbon-based material, then the first electrodes will function as cathodes and the second electrodes will function as anodes.

According to some embodiments of stack 2000, the framing structure of each of the current collectors, apart from the top current collector, consists essentially of a single dielectric frame, as depicted in FIG. 2. That is to say, each of the current collectors, apart from the top current collector, is identical to current collector 200. The framing structure of the top current collector will consist essentially of two dielectric frames, as depicted in FIGS. 3A-3C. According to some embodiments of stack 2000, the framing structure of each of the current collectors includes two dielectric frames, as depicted in FIGS. 3A-3C (and in FIG. 13C). That is to say, each of the current collectors is identical to current collector 300. According to some embodiments of stack 2000, the framing structure of each of the separators includes two dielectric frames, as depicted in FIGS. 10A-10B (and in FIG. 13C). That is to say, each of the separators is identical to separator 1300.

Supercapacitor stacks, such as supercapacitor stack 2000, are typically operated at a temperature range of about −40° to about 65°. According to some embodiments, supercapacitor stack 2000 is configured to withstand temperatures as low as about −50° and as high as about 85°. According to some embodiments, supercapacitor stack 2000 is configured to withstand internal pressures (pressures within the stack) as a high as about 20 bar.

Figure 14A:
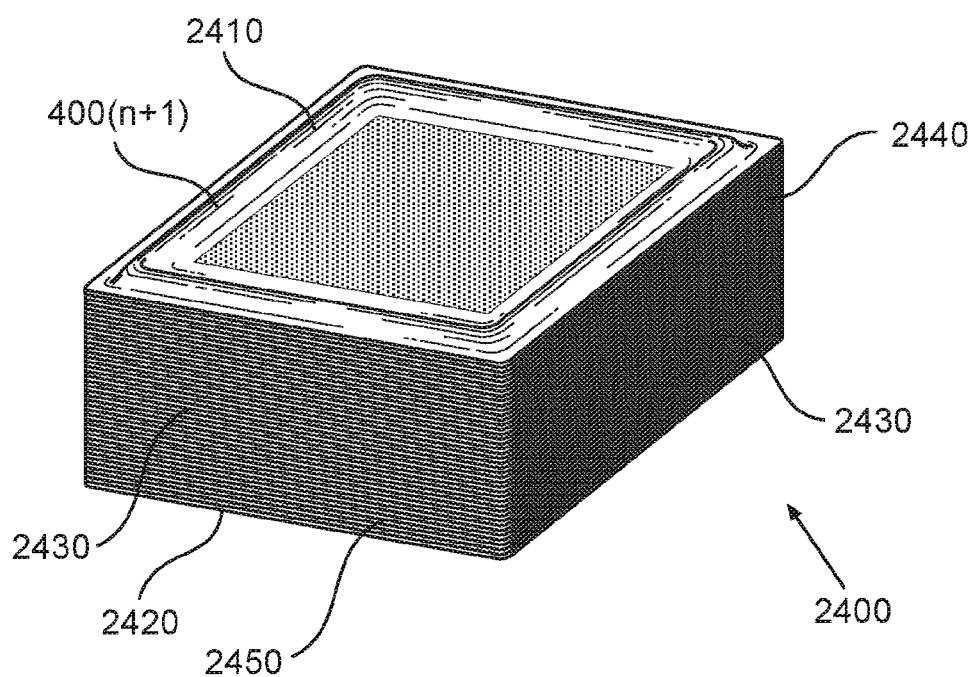
FIG. 14A schematically depicts a fluidly sealed supercapacitor stack, including self-aligning current collectors and self-aligning separators identical to the current collector of FIG. 4A and the separator of FIG. 12A, respectively, according to some embodiments.
Figure 14B:
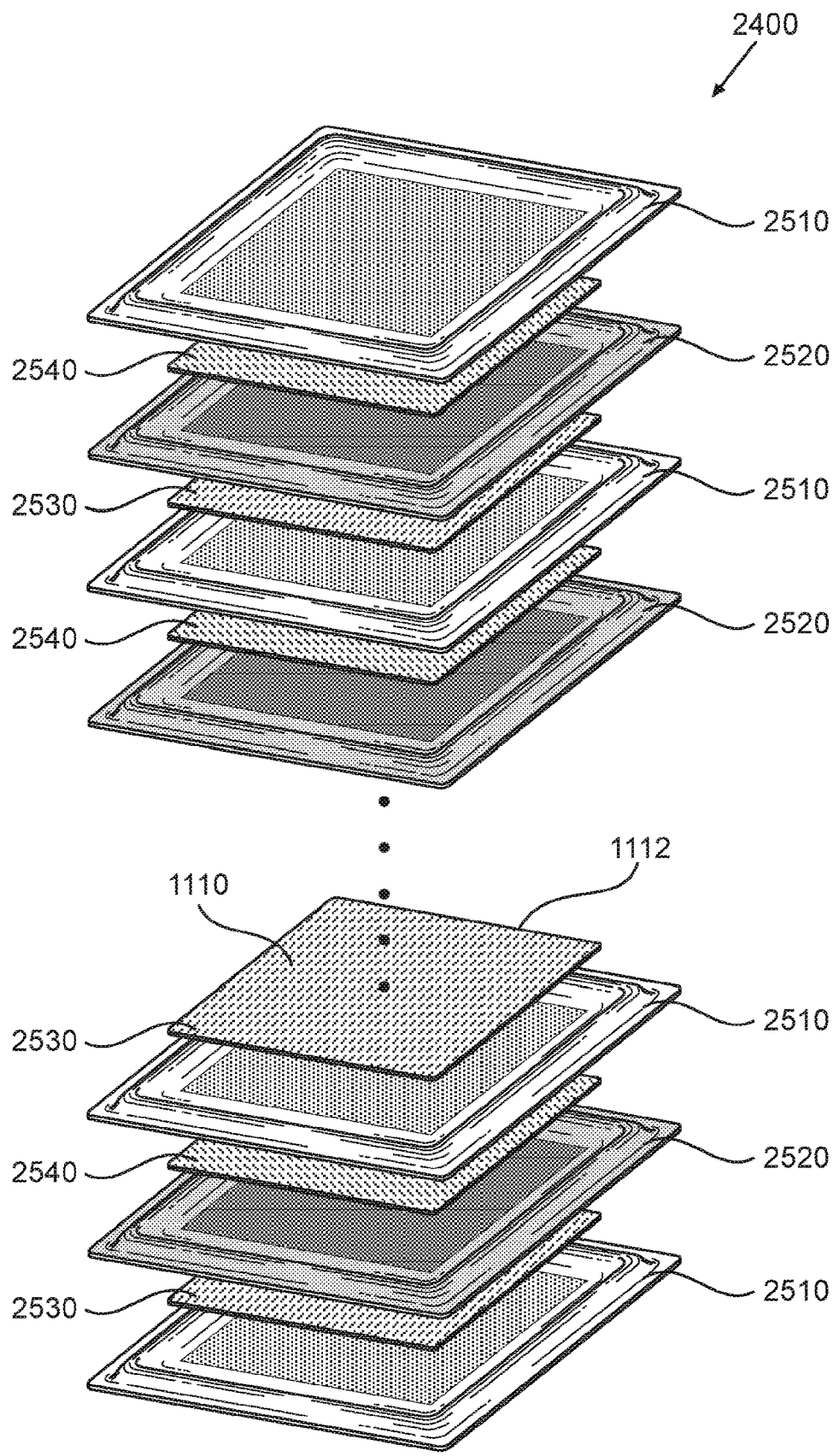
FIG. 14B presents an exploded view of the supercapacitor stack of FIG. 14A, according to some embodiments.
Figure 14C:
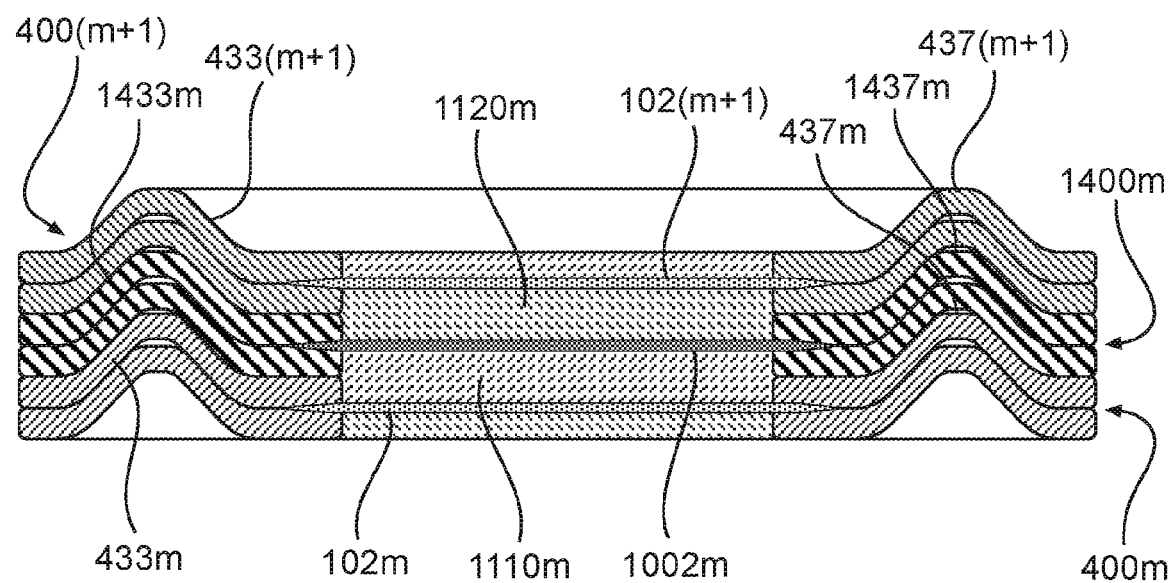
FIG. 14C presents a cross-sectional view of three structural strata of the supercapacitor stack of FIG. 14A, according to some embodiments.

FIGS. 14A-14C schematically depict a supercapacitor stack 2400. Supercapacitor stack 2400 is a specific embodiment of supercapacitor stack 2000, wherein each one of the current collectors together with each one of the separators constitute a mutually self-aligning current collector-separator pair. Making reference to FIG. 14A, stack 2400 includes a stack top 2410, a stack bottom 2420, stack sides 2430, a stack top portion 2440, and a stack base portion 2450, which are specific embodiments of stack top 2010, stack bottom 2020, stack sides 2030, stack top portion 2040, and stack base portion 2050, respectively.

FIG. 14B presents an exploded view of stack 2400. Stack 2400 includes 2n+1 structural strata, consisting of n+1 framed current collectors 2510 and n framed separators 2520, which are specific embodiments of framed current collectors 2110 and framed separators 2120, respectively.

Each of framed current collectors 2510 is self-aligning, being identical to framed current collector 400. Each of framed separators 2520 is self-aligning, being identical to framed separator 1400. Stack 2400 further includes n first electrodes 2530, identical to first electrode 1110, and n second electrodes 2540, identical to second electrode 1120.

As shown in FIG. 14A, the uppermost of current collectors 2510, an (n+1)th framed current collector 400(n+1), is exposed on stack top 2410. The bottommost of current collectors 2510 (not numbered) is exposed on stack bottom 2420.

First electrodes 2530, second electrodes 2540, and the insulating sheets of separators 2520 (being identical to insulating sheet 1002) are impregnated with an aqueous electrolyte (not shown), essentially as described in the description of FIG. 13B with respect to first electrodes 2130, second electrodes 2140, and the insulating sheets of separators 2120.

Current collectors 2510, separators 2520, first electrodes 2530, and second electrodes 2540 are sequentially arranged one on top of the other, similarly to current collectors 2110, separators 2120, first electrodes 2130, and second electrodes 2140 in stack 2000. Each of separators 2520 is disposed between a respective pair from current collectors 2510, such as to be mutually aligned with both of the current collectors, and such that a respective one of first electrodes 2530 is sandwiched between the separator and the lower of the two current collectors, and a respective one of second electrodes 2540 is sandwiched between the separator and the upper of the two current collectors. For example, as shown in FIG. 14C—which depicts a cross-sectional-like view of three structural strata of stack 2400 along a plane parallel to the zx-plane which bisects stack 2400—an mth separator 1400$m$, which is the mth separator from stack bottom 2420, is mutually aligned with an mth current collector 400$m$ and an (m+1)th current collector 400(m+1), which are the mth and (m+1)th current collectors, respectively, from stack bottom 2420. An mth first electrode 1110$m$, which is the mth first electrode from stack bottom 2420, is sandwiched between a conductive sheet 102$m$ (i.e. the conductive sheet of mth current collector 400$m$) and an insulating sheet 1002$m$ (i.e. the insulating sheet of mth separator 1400$m$). An mth second electrode 1120$m$, which is the mth second electrode from stack bottom 2420, is sandwiched between insulating sheet 1002$m$ and a conductive sheet 102(m+1) (i.e. the conductive sheet of (m+1)th current collector 400(m+1)). In particular, a wave-like projection 1433$m$ of mth separator 1400$m$ is mutually aligned with a wave-like projection 433$m$ of mth current collector 400$m$ and with a wave-like projection 433(m+1) of (m+1)th current collector 400(m+1) from below and from above separator wave-like projection 1433$m$, respectively. A crest 437$m$ of mth current collector 400$m$, a crest 1437$m$ of mth separator 1400$m$, and a crest 437(m+1) of (m+1)th current collector 400(m+1) are ordered one above the other, respectively.

According to some embodiments, wherein each of the current collectors and each of the separators constitute a mutually self-aligning current collector-separator pair, each of the current collectors includes geometrical feature 631 and each of the separators includes a matching geometrical feature.

According to some such embodiments, wherein each one of the current collectors and each of the separators constitute a mutually self-aligning current collector-separator pair, each of the current collectors includes geometrical feature 731 and each of the separators includes a matching geometrical feature.

According to some such embodiments, wherein each one of the current collectors and each of the separators constitute a mutually self-aligning current collector-separator pair, each of the current collectors includes collector outer perimetral portion 826 and each of the separators includes a matching (tilted) separator outer perimetral portion.

According to some such embodiments, wherein each one of the current collectors and each of the separators constitute a mutually self-aligning current collector-separator pair, each of the current collectors includes collector intermediate portion 961 and each of the separators includes a matching (tilted) separator intermediate portion.

According to some embodiments disclosed herein, there is provided a supercapacitor stack (not depicted in the figures), which is similar to supercapacitor stack 2000, but differs therefrom in including frameless separators instead of framed separators 2120. Each of the frameless separators consists essentially of an insulating sheet similar to insulating sheet 1002.

According to some embodiments disclosed herein, there is provided a supercapacitor stack (not depicted in the figures), which is similar to supercapacitor stack 2000, but differs therefrom in that the separators and some of the current collectors included therein are frameless. For example, according to some such embodiments, adjacent framed current collectors are separated by three frameless structural strata (consisting of two frameless separators and a frameless current collector), two first electrodes (such as first electrode 1110), and two second electrodes (such as second electrode 1120). Each frameless current collector includes a conductive sheet similar to conductive sheet 102. (Each frameless separator includes an insulating sheet similar to insulating sheet 1002). More specifically, adjacent framed current collectors have disposed there between, in a layered manner starting from the lower current collector, one of the first electrodes, one of the insulating sheets, one of the second electrodes, one of the conductive sheets, one of the first electrodes, one of the insulating sheets, and one of the second electrodes. In some such embodiments, the framing structures of the framed current collectors are thicker than the framing structures of framed current collectors 2110, respectively. The increased thickness compensates for the increased gap between the conductive sheets of adjacent framed current collectors.

As used herein, according to some embodiments, "current collector element" may refer to:
  (i) A framed current collector, such as framed current collector 100 or framed current collector 400.
  (ii) A frameless current collector, e.g. a conductive sheet similar to conductive sheet 102.
  (iii) A pair of identical framed current collectors. Each current collector in the pair is identical, for example, to framed current collector 100 or to framed current collector 400. The two current collectors are attached to one another (e.g. heat-fused) at the outer perimetral portions of the respective framing structures thereof.

According to some embodiments disclosed herein, there is provided a supercapacitor stack (not depicted in the figures), which is similar to supercapacitor stack 2000, but differs therefrom in that the supercapacitor cells thereof are distinct in the sense that the top current collector of a first supercapacitor cell is distinct from the bottom current collector of a second supercapacitor cell adjacent to the first supercapacitor cell from above. In such embodiments, the top current collector of each supercapacitor cell, apart from the top supercapacitor cell, has placed thereon the bottom current collector of the supercapacitor cell adjacent thereto from above, the two current collectors being mutually aligned, and attached (e.g. heat-fused) onto one another at the outer perimetral portions thereof. In some such embodiments, a gap between the conductive sheets of each pair of successive framed current collectors (that is to say, the gap between the top conductive sheet and the bottom conductive sheet of two successive supercapacitor cells) is filled with a filling material such as a sealant. As used herein, the term "distinct-cell configuration" with reference to a supercapacitor stack, refers to a configuration of the supercapacitor stack, wherein adjacent supercapacitor cells do not have a common current collector (i.e. do not share a current collector), as described above in this paragraph. In certain such embodiments, the second electrode of a first supercapacitor cell contacts the bottom surface of the conductive sheet of the top current collector in the first supercapacitor cell, and the bottom current collector of a second supercapacitor cell—adjacent to the first supercapacitor cell from above—contacts from above the top current collector of the first supercapacitor cell.

As used herein, according to some embodiments, the term "unit" with reference to a supercapacitor stack refers to a distinct assembly of elements (e.g. structural strata and electrodes), which is repeated in the supercapacitor stack. In a supercapacitor stack in a distinct-cell configuration, a "unit" is a supercapacitor cell. In a supercapacitor stack in a common current collector configuration, a "unit" is smaller than a supercapacitor cell. In particular, a "unit" includes a single current collector. In some embodiments, the unit includes a current collector, a first electrode, a separator, and a second electrode. For example, making reference to FIG. 13B, one framed current collector 2110, one framed separator 2120, one first electrode 2130, and one second electrode 2140 make up a unit of supercapacitor stack 2000, wherein said unit is repeated throughout the stack. Making reference to FIG. 13C, mth current collector 100m, mth first electrode 1010m, mth separator 1000m, and mth second electrode 1020m make up an "mth unit" of supercapacitor stack 2000. Similarly, making reference to FIG. 14C, mth current collector 400m, mth first electrode 1010m, mth separator 1400m, and mth second electrode 1020m make up an "mth unit" of supercapacitor stack 2400.

Figure 15A:
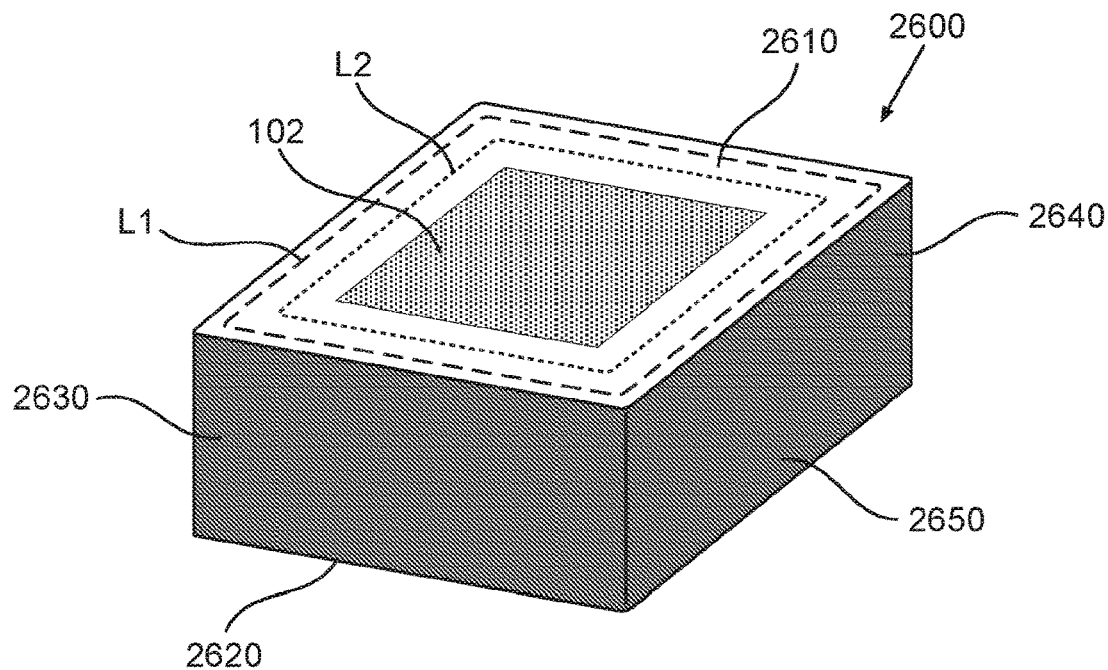
FIG. 15A schematically depicts a sealed supercapacitor stack, according to some embodiments.

FIG. 15A schematically depicts an embodiment of a supercapacitor stack 2600. Supercapacitor stack 2600 may be obtained from a pre-sealed supercapacitor stack 5000 (shown in FIG. 15B) by subjecting pre-sealed supercapacitor stack 5000 to a sealing procedure, as elaborated on below and particularly in the subsections "Supercapacitor stack fabrication methods" and "Systems for supercapacitor stack fabrication". Supercapacitor stack 2600 is similar to supercapacitor stack 2000, but differs therefrom as elaborated on below. Supercapacitor stack 2600 includes a stack top 2610, a stack bottom 2620, stack sides 2630, a stack top portion 2640, and a stack base portion 2650.

Figure 15B:
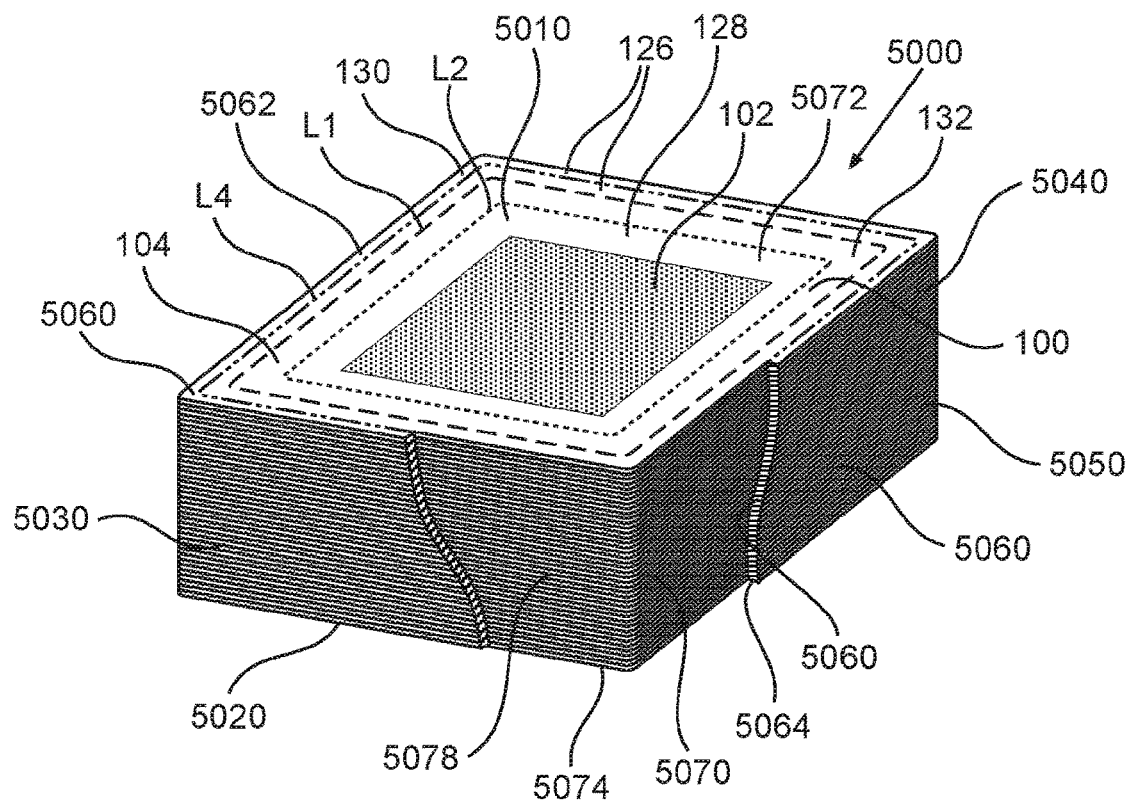
FIG. 15B presents a cutaway view of a pre-sealed supercapacitor stack, with a stack edge section shown partially cut away, according to some embodiments.

FIG. 15B presents a cutaway view of pre-sealed supercapacitor stack 5000. Pre-sealed stack 5000 includes a stack top 5010, a stack bottom 5020, stack sides 5030, a stack top portion 5040, and a stack base portion 5050. Pre-sealed stack 5000 is similar to stack 2000 but, according to some embodiments, differs therefrom in that the framing structures of adjacent structural strata are not attached onto one another. That is to say, pre-sealed stack 5000 is assembled, but has not gone any procedure to attach adjacent framing structures. According to some embodiments, pre-sealed stack 5000 differs from stack 2000 in that adjacent structural strata are only physically bonded onto one another (such as to provide an initial attachment, but not sealing) and are yet to be chemically bonded (e.g. heat-fused) onto one another.

The cutaway view "partitions" pre-sealed stack 5000 into two complementary parts: a stack internal portion 5070 and a stack edge section 5060, which surrounds stack internal portion 5070. Stack edge section 5060 includes an edge section top 5062, which forms an outermost part of stack top 5010, and an edge section bottom 5064, which forms an outermost part of stack bottom 5020. Stack internal portion 5070 includes an internal portion top 5072 (which is complementary to edge section top 5062), and an internal portion bottom 5074 (which is complementary to edge section bottom 5064).

Figure 15C:
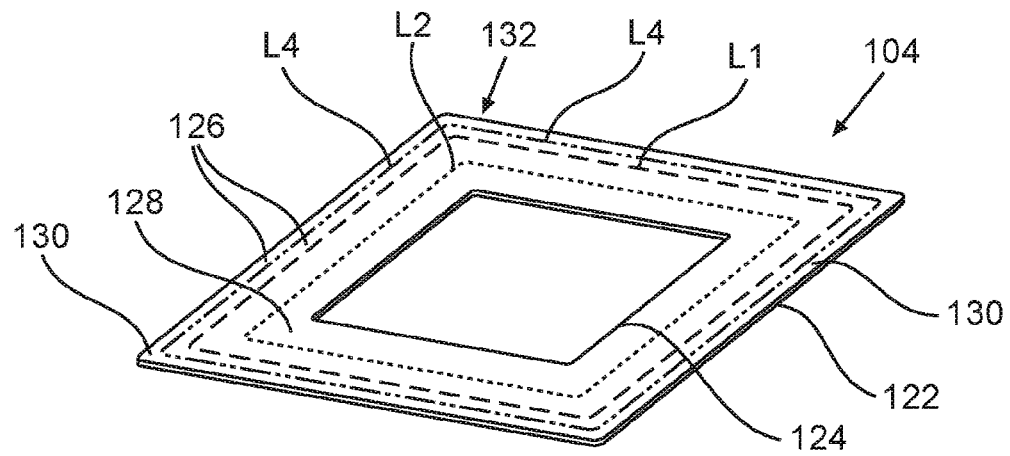
FIG. 15C schematically depicts the framing structure of FIG. 1C, with a rim portion indicated, according to some embodiments.
Figure 15D:
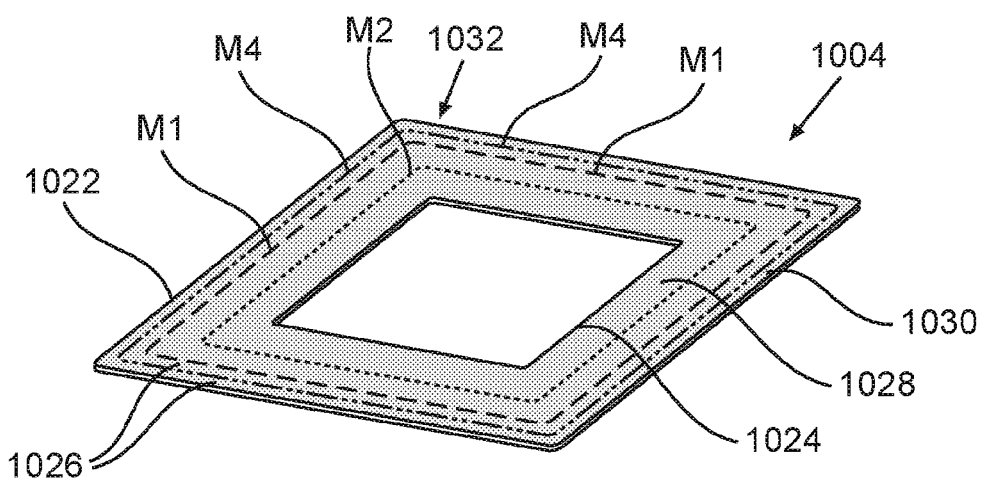
FIG. 15D schematically depicts the framing structure of FIG. 10C with a rim portion indicated, according to some embodiments.

Stack edge section 5060 is made up of rim portions of the framing structures of the framed structural strata assembled in pre-sealed stack 5000 (e.g. the rim portions of current collectors 2110 and separators 2120, which are defined below). Making reference to FIG. 15C (which depicts framing structure 104 of current collector 100), a rim portion 130 of outer perimetral portion 126 extends along outer perimeter 122, consisting of the outermost portion of outer perimetral portion 126. More specifically, rim portion 130 extends inwards from outer perimeter 122 and has an inner border indicated by a dashed-double dotted line L4. According to some embodiments, dashed-double dotted line L4 coincides with dashed-dotted line L3 (not shown in FIG. 15C). According to some embodiments, dashed-double dotted line L4 surrounds dashed-dotted line L3. According to some embodiments, dashed-double dotted line L4 is surrounded by dashed-dotted line L3. Making reference to FIG. 15D (which depicts framing structure 1004 of separator 1000), a rim portion 1030 of outer perimetral portion 1026 extends along outer perimeter 1022, consisting of the outermost portion of outer perimetral portion 1026. More specifically, rim portion 1030 extends inwards from outer perimeter 1022 and has an inner border indicated by a dashed-double dotted line M4. According to some embodiments, dashed-double dotted line M4 coincides with dashed-dotted line M3 (not shown in FIG. 15D). According to some embodiments, dashed-double dotted line L4 surrounds dashed-dotted line L3. According to some embodiments, dashed-double dotted line L4 is surrounded by dashed-dotted line L3. Making reference to FIG. 15B again, it is noted that dashed-double dotted line L4 defines the perimeter of stack internal portion 5070.

According to some embodiments, wherein the width of the framing structures is about 11.5 mm, the width of stack edge section 5060, is between about 1 mm to about 2.5 mm, or between about 1.5 mm to about 2 mm. According to some embodiments, the width of stack edge section 5060 equals, or is slightly larger than, the (engineering) tolerance of stack sides 5030, as elaborated on below in the subsection "Supercapacitor stack fabrication methods". It is noted that the width of stack edge section 5060 is defined by the width of the rim portions of the framing structures. The width of rim portion 130 of the framing structure of current collector 100 is defined by the distance between dashed-double dotted line L4 and outer perimeter 122. The width of rim portion 1030 (which substantially equals the width of rim portion 130) of the framing structure of separator 1000 is defined by the distance between dashed-double dotted line M4 and outer perimeter 1022.

According to some embodiments, supercapacitor stack 2600 is obtained from pre-sealed supercapacitor stack 5000 by removing stack edge section 5060, thereby exposing internal portion side surfaces 5078 (the side surfaces of stack internal portion 5070), and sealing internal portion side surfaces 5078. In particular, according to some embodiments, current collectors 2110 and separators 2120 have their respective rim portions trimmed off as part of the heat-fusing of adjacent structural strata onto one another, as elaborated on below in the subsections "Supercapacitor stack fabrication methods" and "Systems for supercapacitor stack fabrication".

Figure 16A:
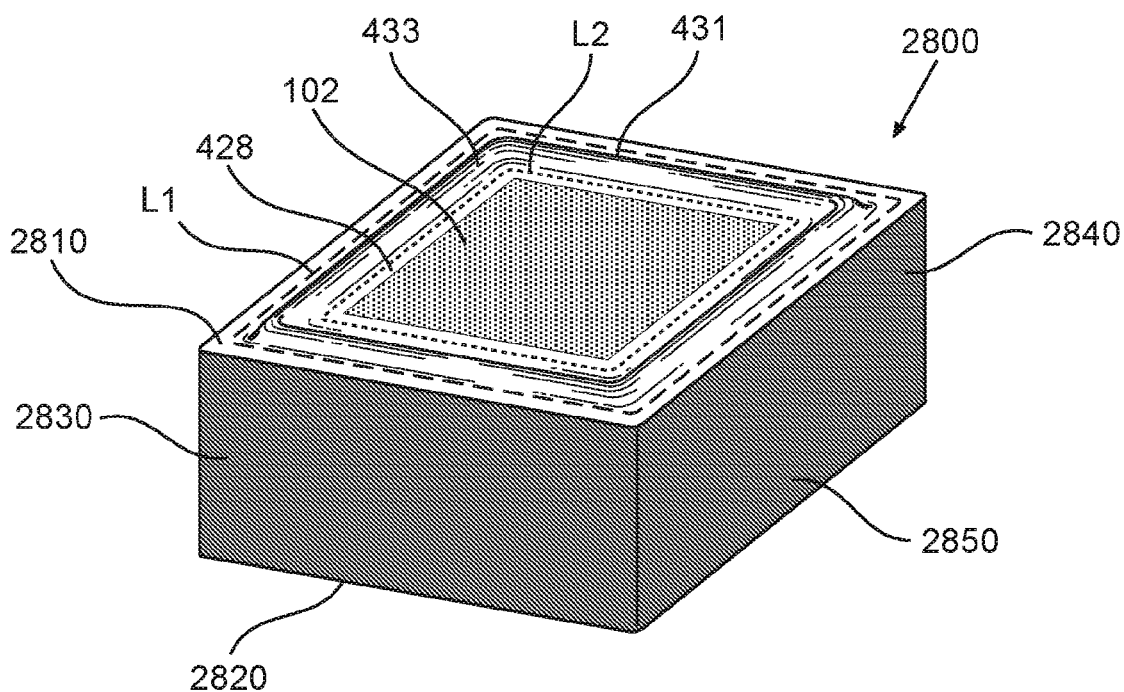
FIG. 16A schematically depicts a sealed supercapacitor stack, according to some embodiments.

FIG. 16A schematically depicts an embodiment of a supercapacitor stack 2800. Supercapacitor stack 2800 may be obtained from a pre-sealed supercapacitor stack 5400 (shown in FIG. 16B) by subjecting pre-sealed supercapacitor stack 5400 to a sealing procedure, as elaborated on below and particularly in the subsections "Supercapacitor stack fabrication methods" and "Systems for supercapacitor stack fabrication". Supercapacitor stack 2800 is similar to supercapacitor stack 2400, but differs therefrom as elaborated on below. Supercapacitor stack 2800 includes a stack top 2810, a stack bottom 2820, stack sides 2680, a stack top portion 2840, and a stack base portion 2850.

Figure 16B:
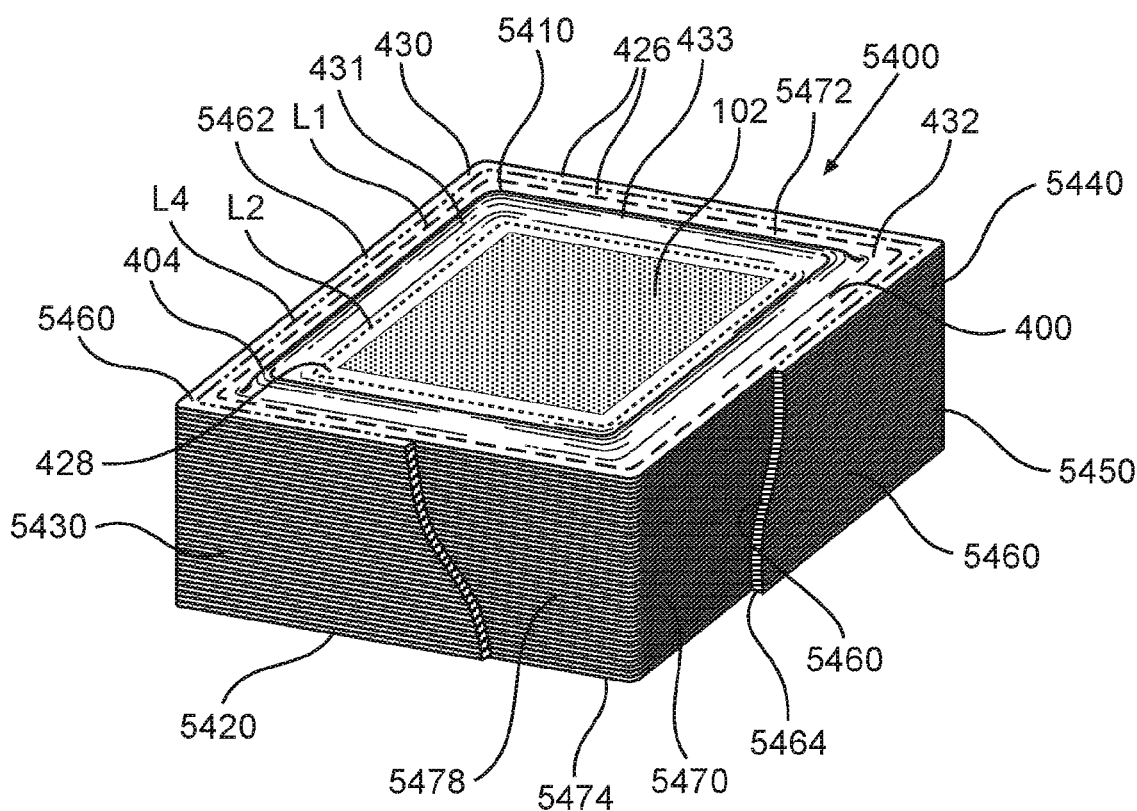
FIG. 16B presents a cutaway view of a pre-sealed supercapacitor stack, with a stack edge section shown partially cut away, according to some embodiments.

FIG. 16B presents a cutaway view of pre-sealed supercapacitor stack 5400. Pre-sealed stack 5400 includes a stack top 5410, a stack bottom 5420, stack sides 5430, a stack top portion 5440, and a stack base portion 5450. Pre-sealed stack 5400 is similar to stack 2400 but, according to some embodiments, differs therefrom in that the framing structures of adjacent structural strata are not attached onto one another. That is to say, pre-sealed stack 5400 is assembled, but has not gone any procedure to attach adjacent framing structures. According to some embodiments, pre-sealed stack 5400 differs from stack 2400 in that adjacent structural strata are only physically bonded onto one another (such as to provide an initial attachment, but not sealing) and are yet to be chemically bonded (e.g. heat-fused) onto one another.

The cutaway view "partitions" pre-sealed stack 5400 into two complementary parts: a stack internal portion 5470 and a stack edge section 5460, which surrounds stack internal portion 5470. Stack edge section 5460 includes an edge section top 5462, which forms an outermost part of stack top 5410, and an edge section bottom 5464, which forms an outermost part of stack bottom 5420. Stack internal portion 5470 includes an internal portion top 5472 (which is complementary to edge section top 5462), and an internal portion bottom 5474 (which is complementary to edge section bottom 5464).

Figure 16C:
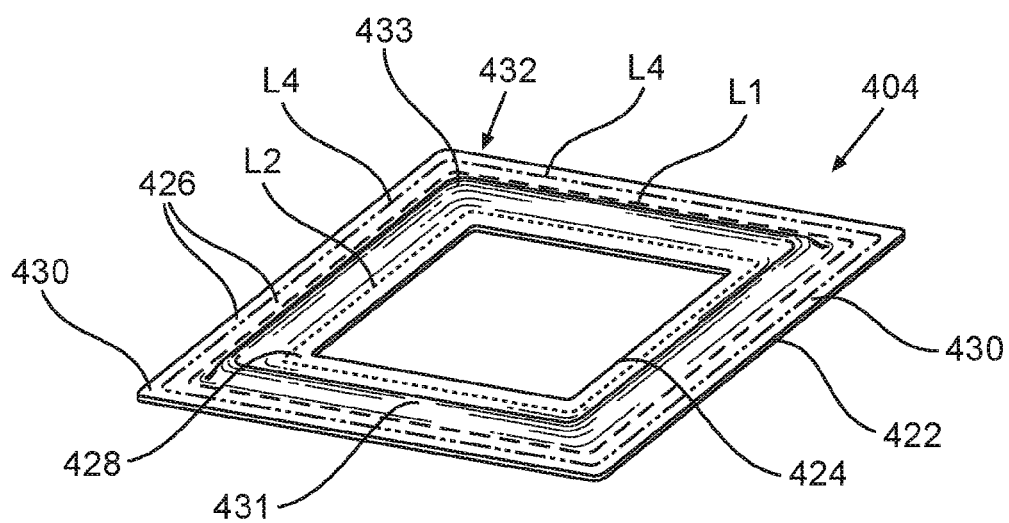
FIG. 16C schematically depicts the framing structure of the current collector of FIG. 4A, with a rim portion thereof indicated, according to some embodiments.
Figure 16D:
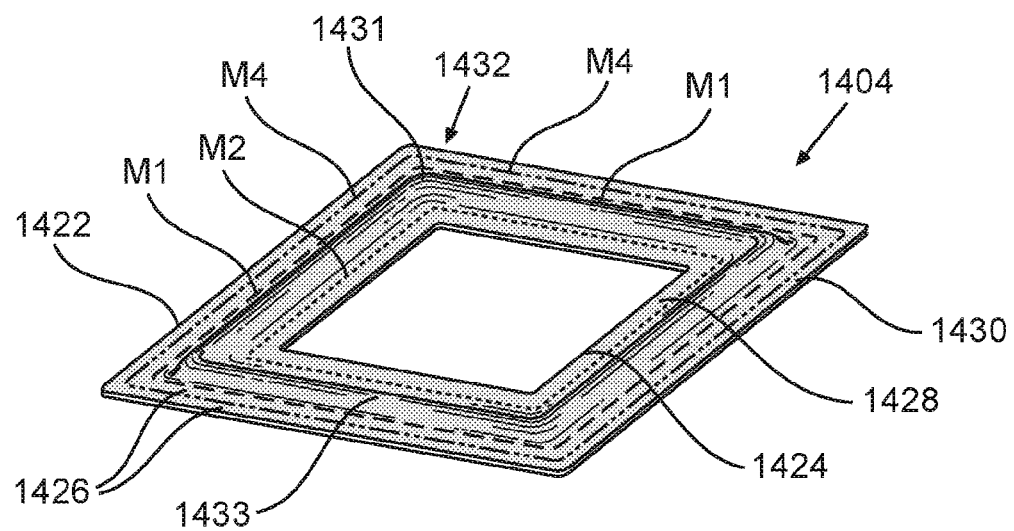
FIG. 16D schematically depicts the framing structure of the separator of FIG. 12A, with a rim portion thereof indicated, according to some embodiments.

Stack edge section 5460 is made up of rim portions of the framing structures of the framed structural strata assembled in pre-sealed stack 5400 (e.g. the rim portions of current collectors 2510 and separators 2520, which are defined below). Making reference to FIG. 16C (which depicts framing structure 404 of current collector 400), a rim portion 430 of outer perimetral portion 426 extends along outer perimeter 422, consisting of the outermost portion of outer perimetral portion 426. More specifically, rim portion 430 extends inwards from outer perimeter 422 and has an inner border indicated by a dashed-double dotted line L4. According to some embodiments, dashed-double dotted line L4 coincides with dashed-dotted line L3 (not shown in FIG. 16C). According to some embodiments, dashed-double dotted line L4 surrounds dashed-dotted line L3. According to some embodiments, dashed-double dotted line L4 is surrounded by dashed-dotted line L3. Making reference to FIG. 16D (which depicts framing structure 1404 of separator 1400), a rim portion 1430 of outer perimetral portion 1426 extends along outer perimeter 1422, consisting of the outermost portion of outer perimetral portion 1426. More specifically, rim portion 1430 extends inwards from outer perimeter 1422 and has an inner border indicated by a dashed-double dotted line M4. According to some embodiments, dashed-double dotted line M4 coincides with dashed-dotted line M3 (not shown in FIG. 16D). According to some embodiments, dashed-double dotted line M4 surrounds dashed-dotted line M3. According to some embodiments, dashed-double dotted line M4 is surrounded by dashed-dotted line M3. Making reference to FIG. 16B again, it is noted dashed-double dotted line L4 defines the perimeter of stack internal portion 5470.

According to some embodiments, wherein the width of the framing structures is about 11.5 mm, the width of stack edge section 5460, is between about 1 mm to about 2.5 mm, or between about 1.5 mm to about 2 mm. According to some embodiments, the width of stack edge section 5460 equals, or is slightly larger than, the tolerance of stack sides 5430, as elaborated on below in the subsection "Supercapacitor stack fabrication methods". It is noted that the width of stack edge section 5460 is defined by the width of the rim portions of the framing structures. The width of rim portion 430 of the framing structure of current collector 400 is defined by the distance between dashed-dotted double line L4 and outer perimeter 422. The width of rim portion 1430 (which substantially equals the width of rim portion 430) of the framing structure of separator 1400 is defined by the distance between dashed-double dotted line M4 and outer perimeter 1422.

According to some embodiments, supercapacitor stack 2800 is obtained from pre-sealed supercapacitor stack 5400 by removing stack edge section 5460, thereby exposing internal portion side surfaces 5478 (the side surfaces of stack internal portion 5470), and sealing internal portion side surfaces 5478. In particular, according to some embodiments, current collectors 2510 and separators 2520 have their respective rim portions trimmed off as part of the heat-fusing of adjacent structural strata onto one another, as elaborated on below in the subsections "Supercapacitor stack fabrication methods" and "Systems for supercapacitor stack fabrication".

It is noted that pre-sealed supercapacitor stacks 5000 and 5400 can also be sealed without removing the respective stack edge sections thereof. In particular, supercapacitor stacks 2000 and 2400 can be obtained from pre-sealed supercapacitor stacks 5000 and 5400, as elaborated on below.

As used herein, according to some embodiments, "externally extending" with reference to a framing structure of a current collector in a supercapacitor stack (or a current collector used in the fabrication of the supercapacitor stack), refers to a current collector whose framing structure has an external portion, which extends beyond the edge of the conductive sheet of the current collector. For example, current collector 100 has an externally extending framing structure (framing structure 104), with an external portion consisting of the portion of framing structure 104 surrounding inner perimetral portion 128. Outer perimetral portion 126 is included in the external portion. According to some embodiments, the external portion consists of outer perimetral portion 126 (i.e. when dashed line L1 and dotted line L2 coincide). Current collector 400 also has an externally extending framing structure (framing structure 404). Similarly, according to some embodiments, "externally extending" with reference to a framing structure of a separator in a supercapacitor stack (or a separator used in the fabrication of the supercapacitor stack), refers to a separator whose framing structure has an external portion, which extends beyond the edge of the insulating sheet of the separator. For example, separators 1000 and 1400 have externally extending framing structures (framing structures 1004 and 1404, respectively). According to some embodiments, a framing structure, which has had the rim portion thereof cut off (e.g. as part of a sealing process of a pre-sealed stack that includes the framing structure), also has an externally extending framing structure. For example, supercapacitor stack 2600 includes framed current collectors and framed separators, which have had the rim portions of the respective framing structures thereof cut off. Similarly, supercapacitor stack 2800 includes framed current collectors and framed separators, which have had the rim portions of the respective framing structures thereof cut off.

Additional Supercapacitor Stack Embodiments

According to some embodiments, there is provided a sealed n-cell supercapacitor stack in a common current collector configuration (e.g. supercapacitor stacks 2000, 2400, 2600, 2800). The supercapacitor stack includes 2n+1 framed structural strata consisting of n+1 framed current collectors (e.g. current collectors 2110, 2510, or current collectors 2110 or 2510 with the rim portions thereof removed), and n framed separators (e.g. separators 2120, 2520, or separators 2120 or 2520 with the rim portions thereof removed). The stack further includes n first electrodes (e.g. first electrodes 2530) and n second electrodes (e.g. second electrodes 2540). The structural strata are sequentially arranged, one on top of the other, with each of the electrodes being disposed between a respective pair of adjacent structural strata (e.g. mth first electrode 1110$m$ between mth current collector 100$m$ and mth separator 1000$m$ and mth second electrode 1120$m$ between mth separator 1000$m$ and (m+1)th current collector 100$(m+1)$ in FIG. 13C; mth first electrode 1110$m$ between mth current collector 400$m$ and mth separator 1400$m$ and mth second electrode 1120$m$ between mth separator 1400$m$ and (m+1)th current collector 400$(m+1)$ in FIG. 14C).

Each of the current collectors is a framed current collector with an externally extending framing structure. The current collectors are matching. Each of the separators respectively is a framed separator with an externally extending framing structure. The separators are matching and match the current collectors. Each separator is disposed between a respective pair of the current collectors, such as to be aligned therewith, with a respective first electrode and a respective second electrode sandwiched between the separator and the lower current collector and the separator and the upper current collector, respectively (as depicted, for example, in FIGS. 13B-13C or in FIGS. 14B-14C).

An outer portion (e.g. the outer perimetral portion or the outer perimetral portion with the rim portion thereof removed) of the framing structure of each separator is directly attached to an outer portion of the framing structure of a current collector adjacent thereto from below and to a framing structure of an outer portion of a current collector adjacent thereto from above.

According to some embodiments, n=1, the supercapacitor stack thereby consisting of a single supercapacitor cell.

According to some embodiments, there is provided a sealed m-cell supercapacitor stack in a distinct-cell configuration. The supercapacitor stack includes m of the supercapacitor cells described in this subsection above. The supercapacitor cells are arranged one on top of the other, such as to be mutually aligned, and are attached onto one another. Filling material, such as a sealant, may be applied on the top conductive sheet of each of the supercapacitor cells except for the top cell.

According to some embodiments, there is provided a sealed (k+l)-cell supercapacitor stack. The supercapacitor stack includes a k-cell supercapacitor stack in a common current collector configuration, as described in this subsection above, and an l-cell supercapacitor stack in a common current collector configuration, as described in this subsection above. The l-cell supercapacitor stack is placed on top of the k-cell supercapacitor stack, such as to be aligned therewith, and is attached thereto. Filling material, such as a sealant, may be applied on the top conductive sheet of each of the supercapacitor cells except for the top cell.

According to some embodiments, there is provided supercapacitor stack similar to the sealed n-cell supercapacitor stack in the common current collector configuration, described in this subsection above, but differing therefrom in that at least some of the separators included therein are frameless. In such embodiments, a pair of current collectors—adjacent to a frameless separator—are attached at the respective outer portions thereof.

According to some embodiments, there is provided supercapacitor stack similar to the sealed m-cell supercapacitor stack in the distinct-cell collector configuration, described in this subsection above, but differing therefrom in that at least some of the separators included therein are frameless. In such embodiments, a pair of current collectors—adjacent to a frameless separator—are attached at the respective outer portions thereof.

Supercapacitor Stack Fabrication Methods

As used herein, according to some embodiments, "externally extending" with reference to a framing structure of a current collector in a supercapacitor stack (or a current collector used in the fabrication of the supercapacitor stack), refers to a current collector whose framing structure has an external portion, which extends beyond the edge of the conductive sheet of the current collector. For example, current collector 100 has an externally extending framing structure (framing structure 104), with an external portion consisting of the portion of framing structure 104 surrounding inner perimetral portion 128. Outer perimetral portion 126 is included in the external portion. According to some embodiments, the external portion consists of outer perimetral portion 126 (i.e. when dashed line L1 and dotted line L2 coincide). Current collector 400 also has an externally extending framing structure (framing structure 404). Similarly, according to some embodiments, "externally extending" with reference to a framing structure of a separator in a supercapacitor stack (or a separator used in the fabrication of the supercapacitor stack), refers to a separator whose framing structure has an external portion, which extends beyond the edge of the insulating sheet of the separator.

For example, separators 1000 and 1400 have externally extending framing structures (framing structures 1004 and 1404, respectively).

As used herein, according to some embodiments, a pair of surfaces, which are in contact, or nearly in contact, may be referred to as being "fully contiguous" or "substantially fully contiguous". More specifically, according to some embodiments, a pair of surfaces which are in contact, or nearly in contact, with one another, such that substantially every location on each surface is contiguous, or substantially contiguous, to a corresponding location on the other surface, may be referred to as being "fully contiguous" or "substantially fully contiguous". For example, in FIG. 1D, contact portion bottom side 154 (of framing structure 104) and contact portion top side 152$b$ (of second framing structure 104$b$) are fully contiguous. Similarly, in FIG. 4B, bottom side 434 (of framing structure 404) and top side 432*b* (of framing structure 404*b*) are fully contiguous.

According to some embodiments, two elements (e.g. parts), each exhibiting a continuous or discrete rotational symmetry (e.g. a round disc and a rectangular plate), which are positioned one above the other (e.g. one is placed on top of the other), such that the respective symmetry axes thereof coincide are "laterally centered". In some embodiments, the term "laterally centered", with reference to two elements, refers to two concentric elements (e.g. parts).

As used herein, two elements (e.g. parts), which may vary in size but are otherwise identically shaped or similarly shaped (e.g. a disc of radius r and a disc of radius 2r, or a square of area S and a near-square of area 3S) are "identically proportioned" or "similarly proportioned", respectively.

According to some embodiments, two elements of similar lateral proportions, which are positioned one above the other such as to be substantially laterally centered and such that respective edges thereof are substantially parallel, are aligned. For example, two squares plates of area S and area 2S, the smaller plate being placed on the larger plate, such that the plates are laterally centered and such that adjacent edges (sides) of the plates are parallel, are aligned. Similarly, in FIG. 2A conductive sheet 102 and dielectric frame 211 are aligned.

Figure 22A:
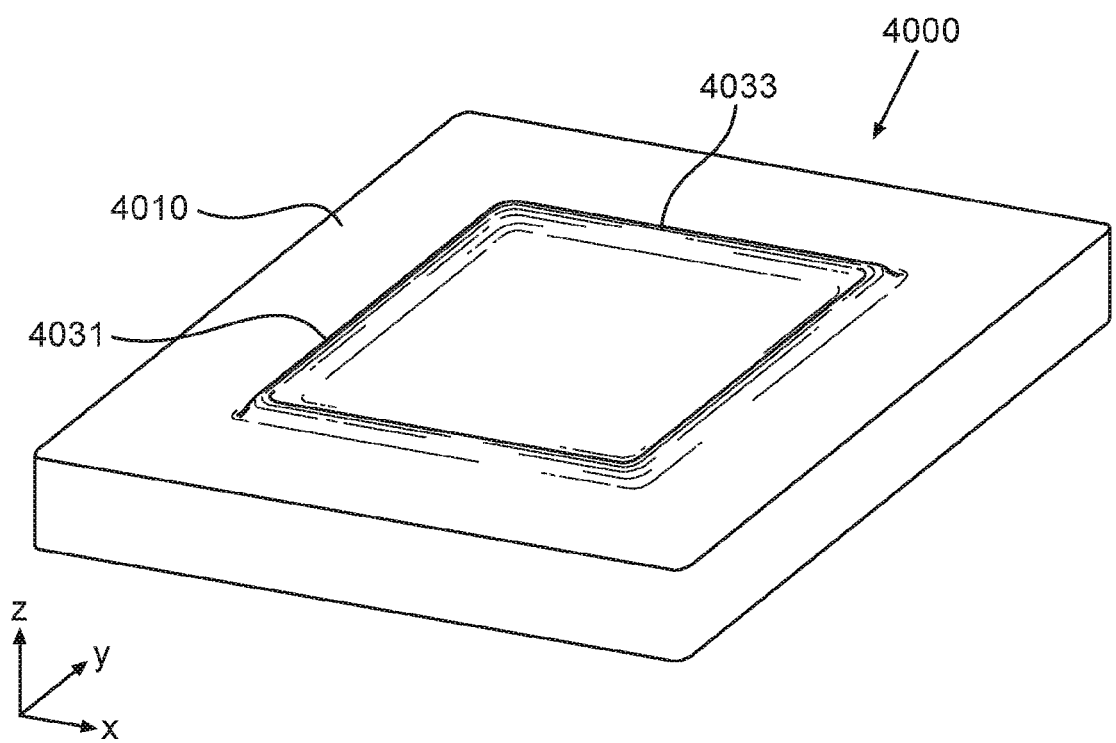
FIG. 22A-22H schematically depict successive stages in an implementation of a specific embodiment of the method of FIG. 17, wherein a self-aligning supercapacitor stack is assembled, and adjacent framing structures are attached onto one another, according to some embodiments.
Figure 22B:
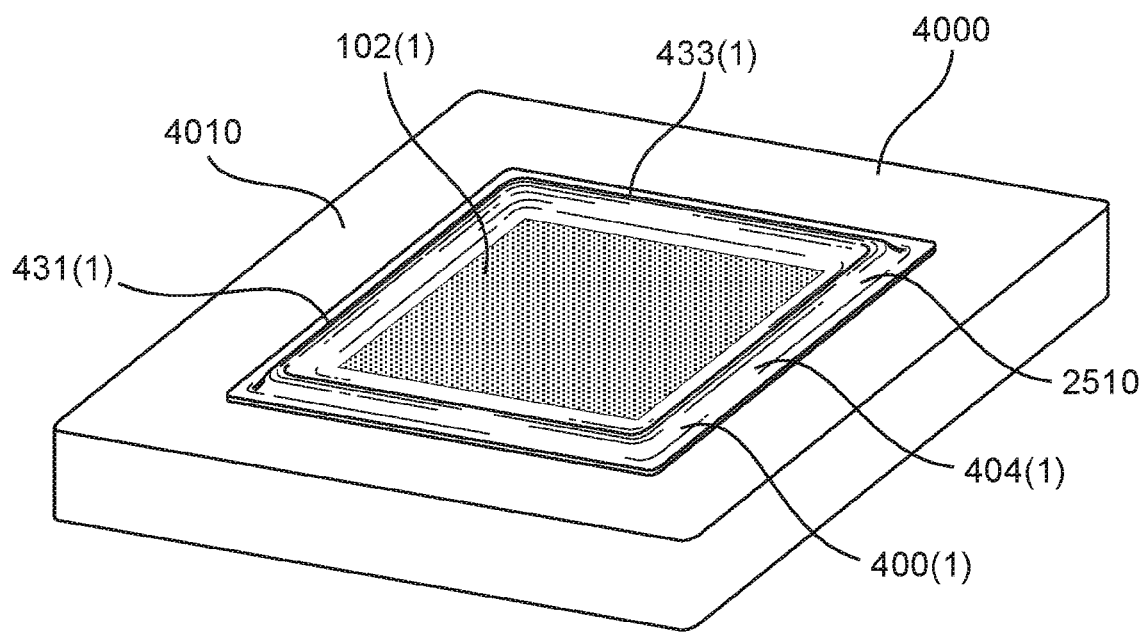
Figure 22C:
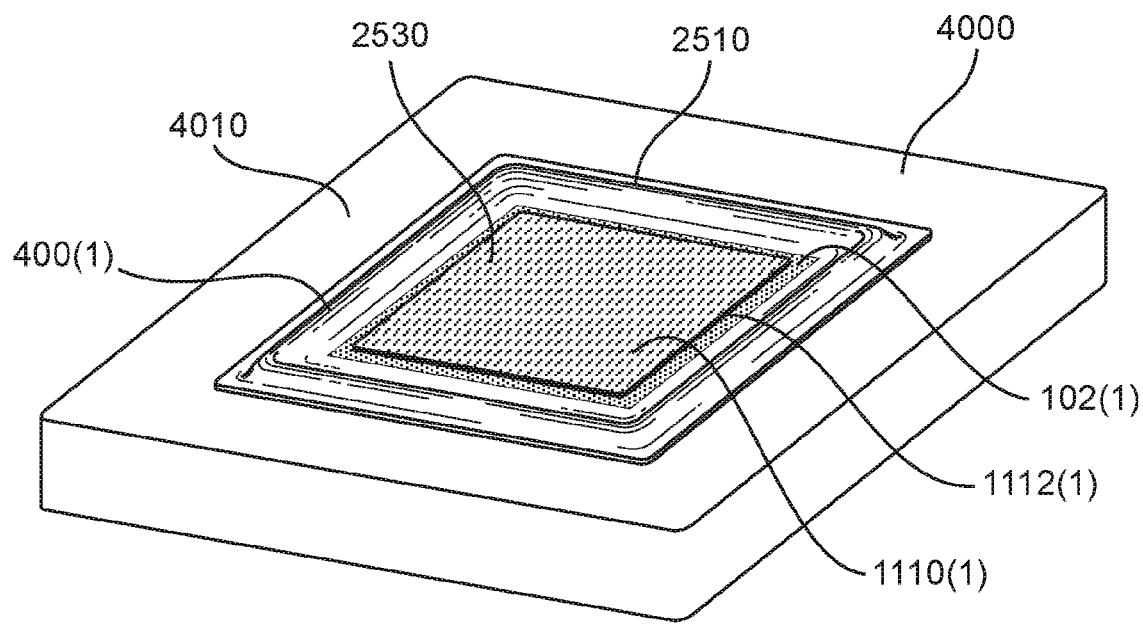

Additional examples are provided in FIG. 14B, wherein current collectors 2510, separators 2520, first electrodes 2530, and second electrodes 2540 are aligned, and in FIG. 22C, wherein a current collector 400(1) and a first electrode 1110(1) are aligned. It is noted that the uses of the term "aligned", demonstrated in this paragraph, extend/complement the uses of the term in the subsections "Supercapacitor current collectors and separators" and "Supercapacitor stacks" (e.g. with respect to matching frames).

Figure 17:
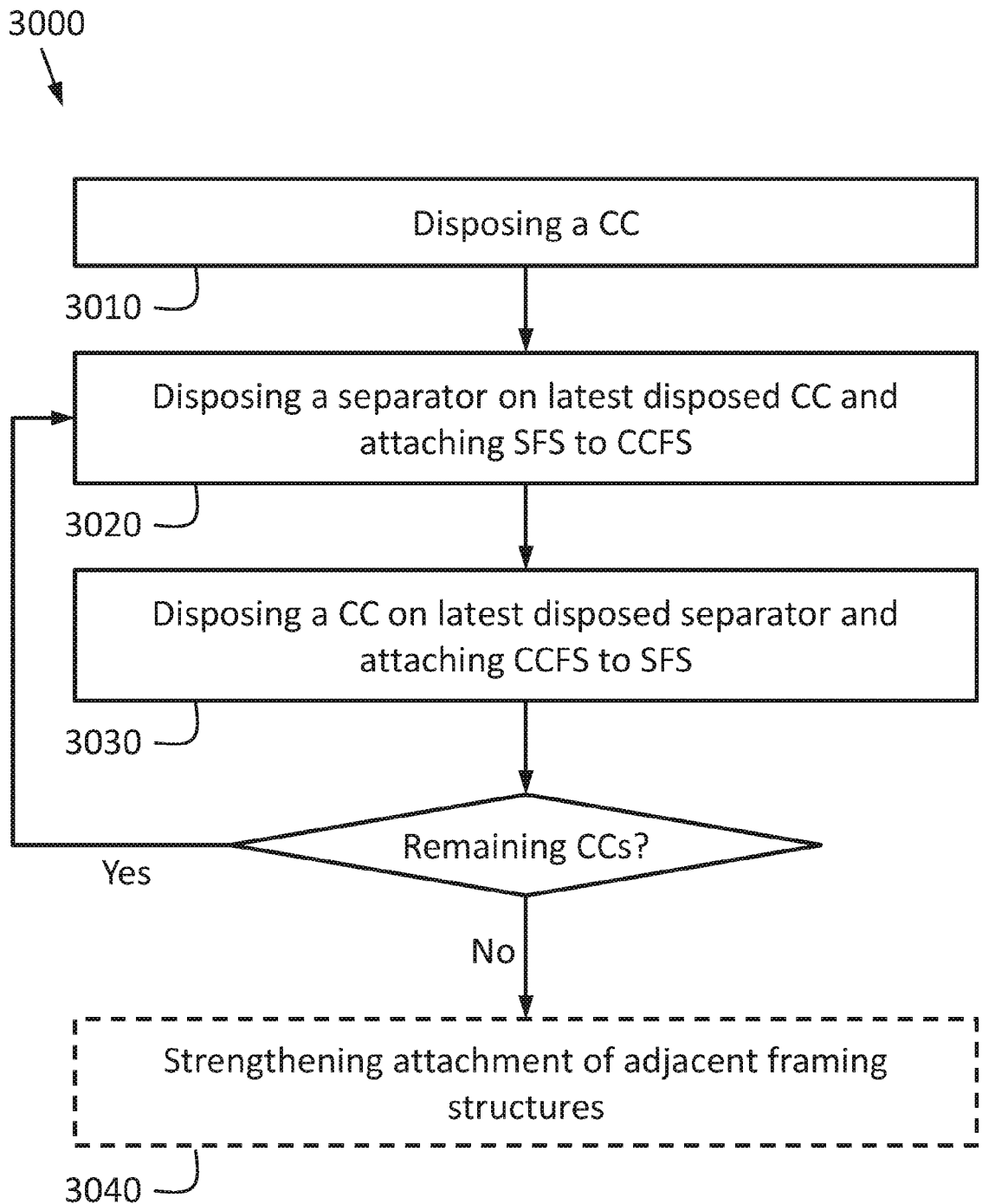
FIG. 17 presents a flowchart for fabricating a supercapacitor stack, in a common current collector configuration, according to some embodiments.
Figure 18:
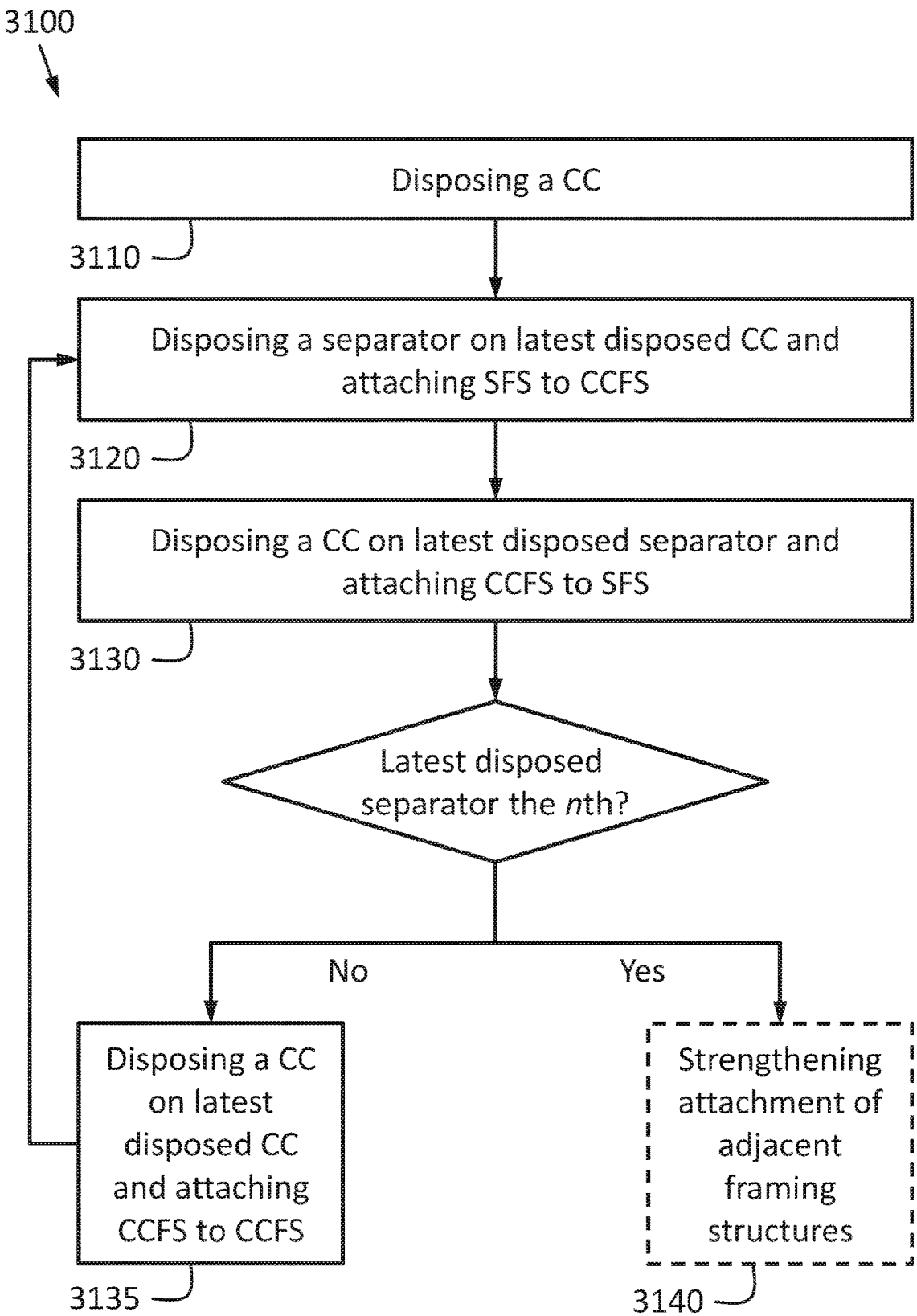
FIG. 18 presents a flowchart for fabricating a supercapacitor stack, in a distinct-cell configuration, according to some embodiments.
Figure 19:
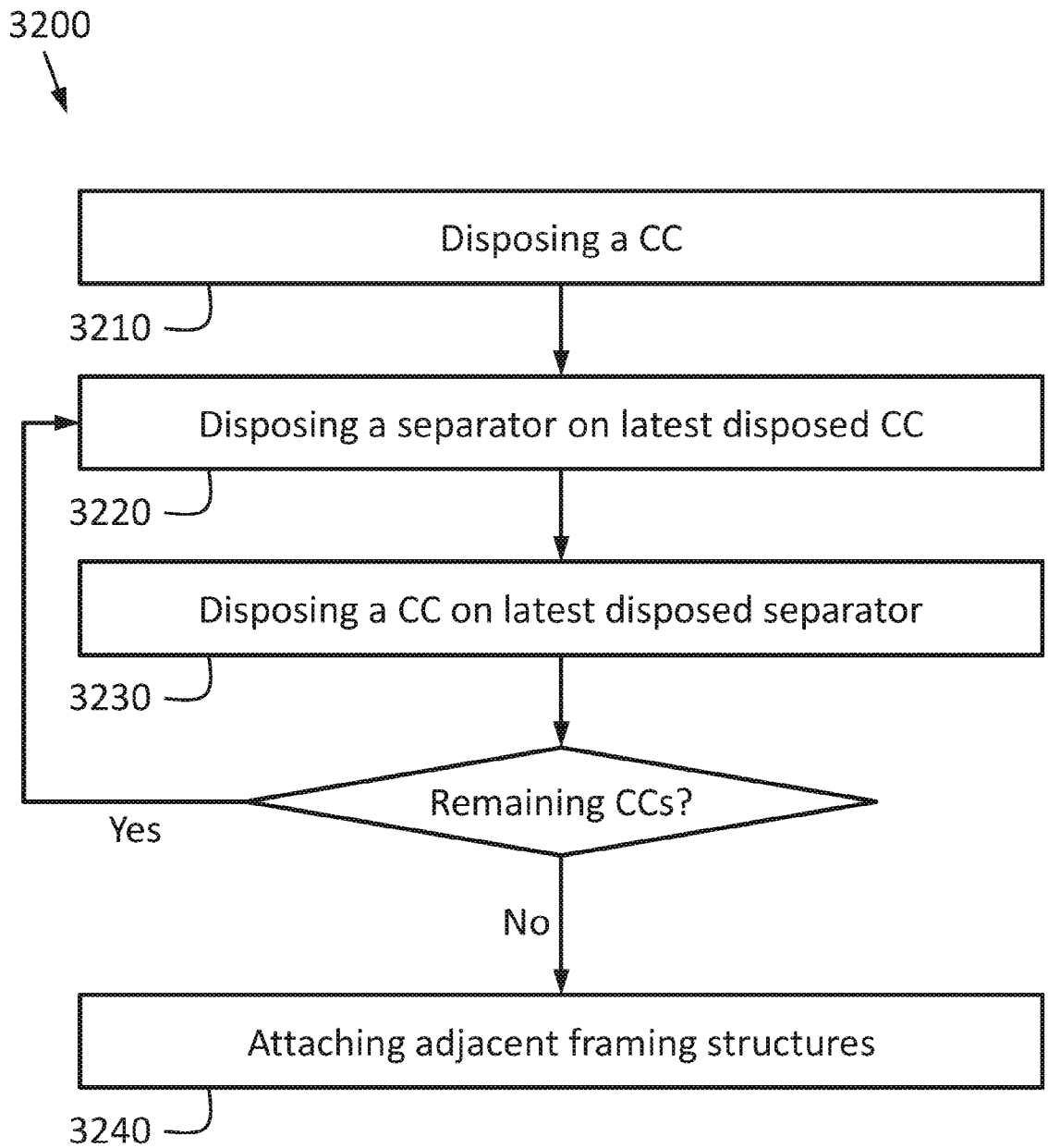
FIG. 19 presents a flowchart for fabricating a supercapacitor stack, in a common current collector configuration, according to some embodiments.

According to an aspect of some embodiments, there is provided a method for fabricating supercapacitor stacks, such as supercapacitor stacks 2000, 2400, 2600, and 2800. According to some embodiments, the supercapacitor stacks are fabricated from matching framed current collectors and framed separators (e.g. current collectors 2110 and separators 2120), having externally extending framing structures, and from electrode pairs, such as first electrode 1110 and second electrode 1120. The method includes a step of assembling the supercapacitor stack and a step of attaching the framing structures of adjacent structural strata in the supercapacitor stack. According to some embodiments, e.g. as depicted in FIGS. 17-18, the step of assembling is implemented simultaneously with the step of attaching or with a first part thereof. According to some embodiments, e.g. as depicted in FIG. 19, the step of assembling precedes the step of attaching.

FIG. 17 depicts a flowchart of a method 3000 for fabricating an n-cell supercapacitor stack, in a common current collector configuration, using n+1 current collectors, n separators, n first electrodes, and n second electrodes. The current collectors and the separators match one another (i.e. can be mutually aligned one on top of the other), each one having an externally extending framing structure. In FIG. 17, as well as in all other figures herein depicting flowcharts, the convention is adopted whereby boxes corresponding to optional steps are delineated by dashed lines (as opposed to boxes corresponding to non-optional steps, which are delineated by solid lines). Method 3000 includes:

- A step 3010 of disposing a first framed current collector (CC), such as a first of current collectors 2110, e.g. on a work platform, such as the work platform depicted in FIG. 22A.
- A step 3020 of disposing a framed separator (e.g. one of separators 2120) on the latest (i.e. most recently) disposed current collector, such as to be aligned therewith, and attaching the separator framing structure (SFS), onto the current collector framing structure (CCFS) of the latest disposed current collector.
- A step 3030 of disposing a framed current collector on the latest disposed separator, such as to be aligned therewith, and attaching the CCFS of the current collector onto the SFS of the latest disposed separator.

Following step 3010, steps 3020 and 3030 are serially repeated, i.e. one after the other, starting with step 3020, a total of n times. That is to say, following the disposing of the first current collector in 3010, a first separator is disposed thereon, and attached thereto, in step 3020. A second current collector is then disposed on the first separator, and attached thereto, in step 3030. A second separator is then disposed on the second current collector, and attached thereto, as step 3020 is repeated, and a third current collector is then disposed on the second separator, and attached thereto, as step 3030 is repeated, and so on, until the (n+1)th current collector is disposed on the nth separator, and attached thereto, in the nth (and last) repetition of step 3030.

Each of the separators is disposed between two respective current collectors (adjacent to the separator), such that one of the first electrodes (e.g. one of first electrodes 2130) is disposed between the lower of the two current collectors and the separator, and one of the second electrodes (e.g. one of second electrodes 2140) is disposed between the upper current collector and the separator. In embodiments wherein the current collectors and/or the separators do not have the electrodes already applied thereon (e.g. printed thereon), step 3020 further includes disposing one of the first electrodes on the conductive sheet of the latest disposed current collector, prior to the disposing of the next separator. Similarly, step 3030 further includes disposing one of the second electrodes on the insulating sheet of the latest disposed separator, prior to the disposing of the next current collector. The resultant layered structure is similar to that depicted in FIGS. 13B-13C and in FIGS. 14B-14C.

According to some alternative embodiments of method 3000, step 3020 does not include attaching the SFS of the separator framing structure to the CCFS of the latest disposed current collector. Instead, the attachment is effected in step 3030. For example, in the mth repetition of step 3020, an mth separator is disposed on an mth current collector (which was disposed in the (m−1)th repetition of step 3030), but is not attached thereto. Next, in the mth repetition of step 3030, the (m+1)th current collector is disposed on the mth separator, and an attachment procedure is effected, wherein the SFS of the mth separator is attached to both the CCFS of the mth current collector (adjacent thereto from below) and the CCFS of the (m+1)th current collector (adjacent thereto from above), as further elaborated on below.

According to some embodiments, the attachment of the framing structures of adjacent structural strata in steps 3020 and 3030 may be effected using a suitable adhesion technique and/or adhesive material (e.g. heating, pressing, heat-pressing, heat-fusing, laser, laser welding, ultrasonic welding, soldering, and the like, and/or glue), as elaborated on below. According to some embodiments, the attachment of the framing structures of adjacent structural strata in steps 3020 and 3030 seals the supercapacitor stack.

According to some embodiments, the disposing of structural strata in steps 3020 and 3030 may be followed by applying force on the latest disposed structural stratum, such as to press the hitherto assembled elements (i.e. the structural strata and the electrodes), thereby expelling air and excess electrolyte from between hitherto assembled elements, as elaborated on below.

According to some embodiments, method 3000 further includes a step 3040, wherein the attachment of adjacent framing structures onto one another is strengthened. According to some embodiments, the strengthening of the attachment of adjacent framing structures seals the supercapacitor stack. According to some embodiments, the strengthening of the attachment is effected by heat-fusion. According to some embodiments, the strengthening of the attachment is effected by chemical gluing. According to some embodiments, the contact portion bottom side of the framing structure of each separator is heat-fused onto the contact portion top side of the framing structure of the current collector adjacent thereto from below, and the contact portion top side of the framing structure of each separator is heat fused onto the contact portion bottom side of framing structure of the current collector adjacent thereto from above. According to some embodiments, the heat-fusion process involves removing the stack edge section of the assembled supercapacitor stack (e.g. pre-sealed supercapacitor stack 5000 or pre-sealed supercapacitor stack 5400), as elaborated on in the description of FIGS. 15A-15D and FIGS. 16A-16D and as further elaborated on below.

According to some embodiments of method 3000, which include step 3040, the attachment in steps 3020 and 3030 establishes a physical connection (e.g. an electrostatic connection) between the framing structures of adjacent structural strata, whereas the attachment in step 3040 establishes a chemical connection between the framing structures of adjacent structural strata. For example, the attachment in steps 3020 and 3030 may be effected by heat-pressing, while the attachment in step 3040 may be effected by heat-fusion.

According to some embodiments, steps 3020 and 3030 are effected in vacuo (e.g. inside a vacuum chamber), e.g. at an ambient pressure of about 0.5 atm, to facilitate the expulsion of air from between adjacent structural strata. According to some embodiments, step 3040 is effected in vacuo, e.g. at an ambient pressure of about 0.5 atm, to facilitate the expulsion of air from within the assembled supercapacitor stack.

According to some embodiments (not depicted in the flowcharts), there is provided a method for fabricating an n-cell supercapacitor stack, in a common current collector configuration, using n+1 current collectors and n separators, n first electrodes, and n second electrodes.

The method is similar to method 3000 but differs therefrom in that the separators are frameless (e.g. consisting essentially of an insulating sheet, such as insulating sheet 1002), so that the (framed) current collectors in each pair of closest current collectors are directly attached onto one another (instead of being indirectly attached via a framed separator there between, as in method 3000).

FIG. 18 depicts a flowchart of a method 3100 for fabricating an n-cell supercapacitor stack in a distinct-cell configuration, using 2n current collectors and n separators, n first electrodes, and n second electrodes. The current collectors and the separators match one another (i.e. can be mutually aligned one on top of the other), each one having an externally extending framing structure. Method 3100 is similar to method 3000, including steps 3110, 3120, and 3130, and optionally a step 3140 similar to steps 3010, 3020, 3030, and 3040, respectively, but differs therefrom in including an extra step: a step 3135. Step 3135 follows step 3130 and is serially repeated n−1 times with steps 3120 and 3130 in the first n−1 repetitions of steps 3020 and 3030. That is to say, following step 3110, steps 3120, 3130, and 3135 are sequentially repeated n−1 times, following which, steps 3120 and 3130 are repeated one last time (optionally followed by step 3140). Step 3135 includes disposing a framed current collector on the latest disposed framed current collector (i.e. the framed current collector disposed in step 3130), such as to be aligned therewith, and attaching the CCFSs of the two framed current collectors. According to some embodiments, step 3135 further includes—prior to the disposing of the current collector on the (latest) current collector disposed in step 3130—applying filling material on the conductive sheet of the current collector disposed in step 3130, such as to fill the gap (e.g. gap G1 in FIG. 2C or gap G2 in FIG. 3C) present between the conductive sheets of current collectors when the current collectors are disposed one on top of the other. According to some embodiments, the filling material is a sealant.

According to some embodiments, the disposing of the structural strata in steps 3110, 3120, 3130, and 3135 is carried out using some of the techniques and means used for the disposing of the structural strata in steps 3010, 3020, and 3030, respectively, of method 3000, as described above. According to some embodiments, step 3140 is implemented similarly to step 3040 in method 3000 (i.e. using some of the same techniques and means).

According to some alternative embodiments of method 3100, step 3120 does not include attaching the SFS of the separator framing structure to the CCFS of the latest disposed current collector. Instead, the attachment is effected in step 3130. For example, in the (m+1)th repetition of step 3120, an (m+1)th separator is disposed on an (2m+1)th current collector (which was disposed in the mth repetition of step 3135), but is not attached thereto. Next, in the (m+1)th repetition of step 3130, the (2m+2)th current collector is disposed on the (m+1)th separator, and an attachment procedure is effected, wherein the SFS of the (m+1)th separator is attached to both the CCFS of the (2m+1)th current collector (adjacent thereto from below) and the CCFS of the (2m+2)th current collector (adjacent thereto from above), as further elaborated on below.

According to some embodiments (not depicted in the flowcharts), there is provided a method for fabricating an n-cell supercapacitor stack, in a distinct-cell configuration, using n+1 current collectors and n separators, n first electrodes, and n second electrodes. The method is similar to method 3100 but differs therefrom in that the separators are frameless, so that the current collectors in each pair of closest current collectors are directly attached onto one another (instead of being indirectly attached via a framed separator there between, as in method 3100).

FIG. 19 depicts a flowchart of a method 3200 for fabricating an n-cell supercapacitor stack, in a common current collector configuration, using n+1 framed current collectors, n framed separators, n first electrodes, and n second electrodes. The current collectors and the separators match one another (i.e. can be mutually aligned one on top of the other), each one having an externally extending framing structure. Method 3200 includes:

A step 3210 of disposing a first framed current collector, e.g. on a work platform, such as the work platform depicted in FIG. 22A.

A step 3220 of disposing a framed separator on the latest disposed current collector, such as to be aligned therewith.

A step 3230 of disposing a framed current collector on the latest disposed separator, such as to be aligned therewith.

A step 3240 of attaching onto one another the framing structures of adjacent structural strata.

Similarly to steps 3020 and 3030 in method 3000, following step 3210, steps 3220 and 3230 are serially repeated, i.e. one after the other starting with step 3220, a total of n times. Step 3240 follows the last repetition (the nth repetition) of the step 3230. Steps 3220 and 3230 are similar to steps 3020 and 3030, respectively, in method 3000, but differ therefrom in not that the framing structures of adjacent structural strata are not attached onto one another during the assembly of the supercapacitor stack (i.e. during steps 3220 and 3230), but are only attached once the assembly is over (i.e. in step 3240). Method 3200 further differs from method 3000 in that, unlike step 3040, which is optional, step 3240 is non-optional (that is to say, step 3240 is integral to method 3200). According to some embodiments, the disposing of the structural strata in steps 3210, 3230, and 3230 is carried out using some of the techniques and means used for the disposing of the structural strata in steps 3010, 3020, and 3030, respectively, of method 3000, as described above. According to some embodiments, step 3240 is implemented similarly to step 3040 in method 3000 (i.e. using some of the same techniques and means).

According to some embodiments (not depicted in the flowcharts), there is provided a method for fabricating an n-cell supercapacitor stack, in a common current collector configuration, using n+1 framed current collectors, n separators, n first electrodes, and n second electrodes. The method is similar to method 3200 but differs therefrom in that the separators are frameless, so that the current collectors in each pair of closest current collectors are directly attached onto one another (instead of being indirectly attached via a framed separator there between, as in method 3200).

According to some embodiments (not depicted in the flowcharts), there is provided a method for fabricating an n-cell supercapacitor stack in a distinct-cell configuration, using 2n current collectors, n separators, n first electrodes, and n second electrodes. The current collectors and the separators are framed and match one another, each having an externally extending framing structure. The method is similar to method 3200, and can be obtained from method 3200 in a similar manner to that by which method 3100 is obtained from method 3000.

According to some embodiments (not depicted in the flowcharts), there is provided a method for fabricating an n-cell supercapacitor stack in a distinct-cell configuration, using 2n current collectors, n separators, n first electrodes, and n second electrodes. The current collectors are framed and match one another, each having an externally extending framing structure. The separators are frameless. The method is similar to method 3200, and can be obtained therefrom in a similar manner to that by which method 3100 is obtained from method 3000, except that, the separators being frameless, current collectors in each pair of closest current collectors are directly attached onto one another (instead of being indirectly attached via a framed separator there between, as in method 3200).

Figure 20A:
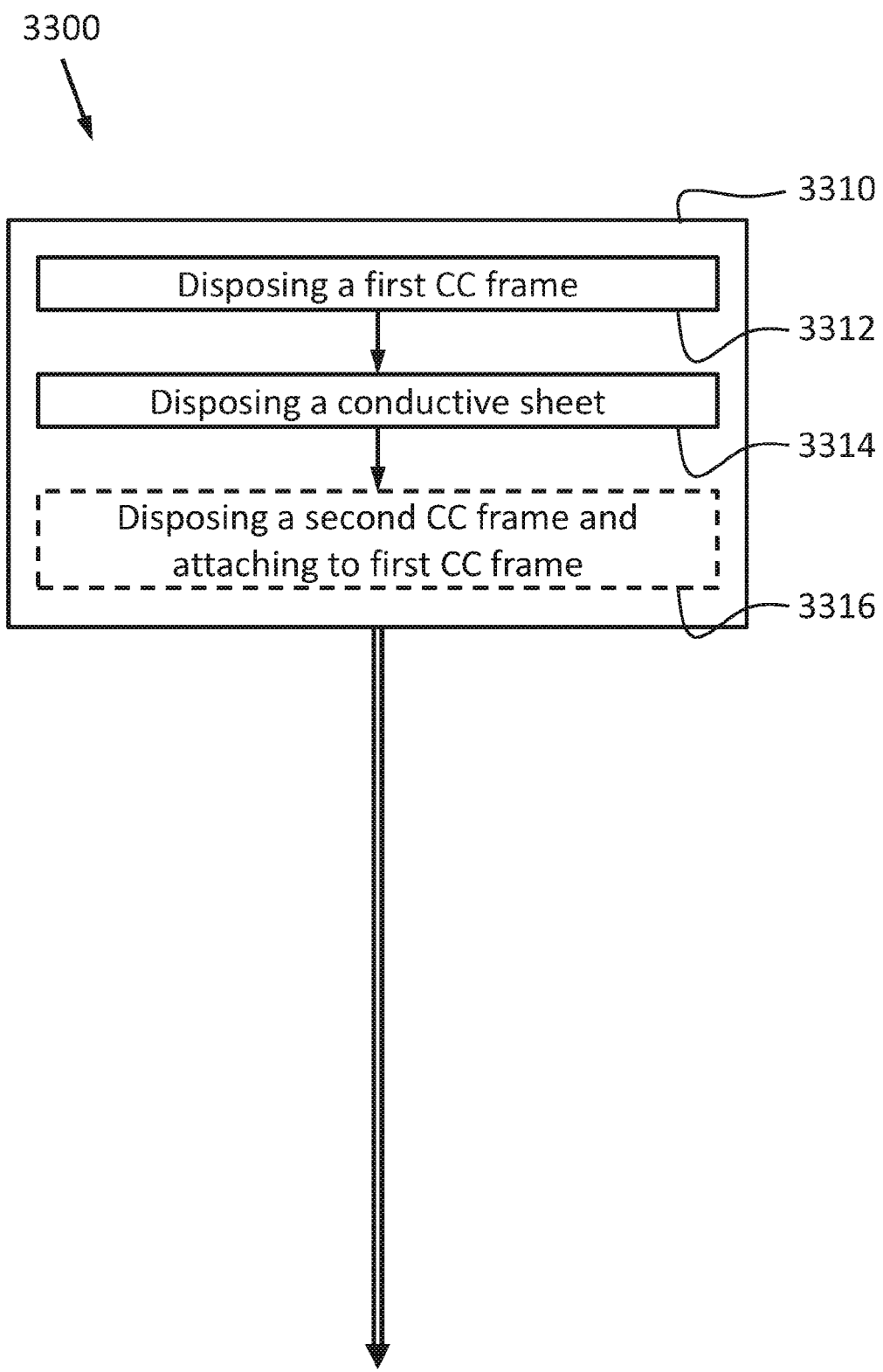
FIGS. 20A-20B presents a flowchart for fabricating a supercapacitor stack, in a common current collector configuration, according to some embodiments.
Figure 20B:
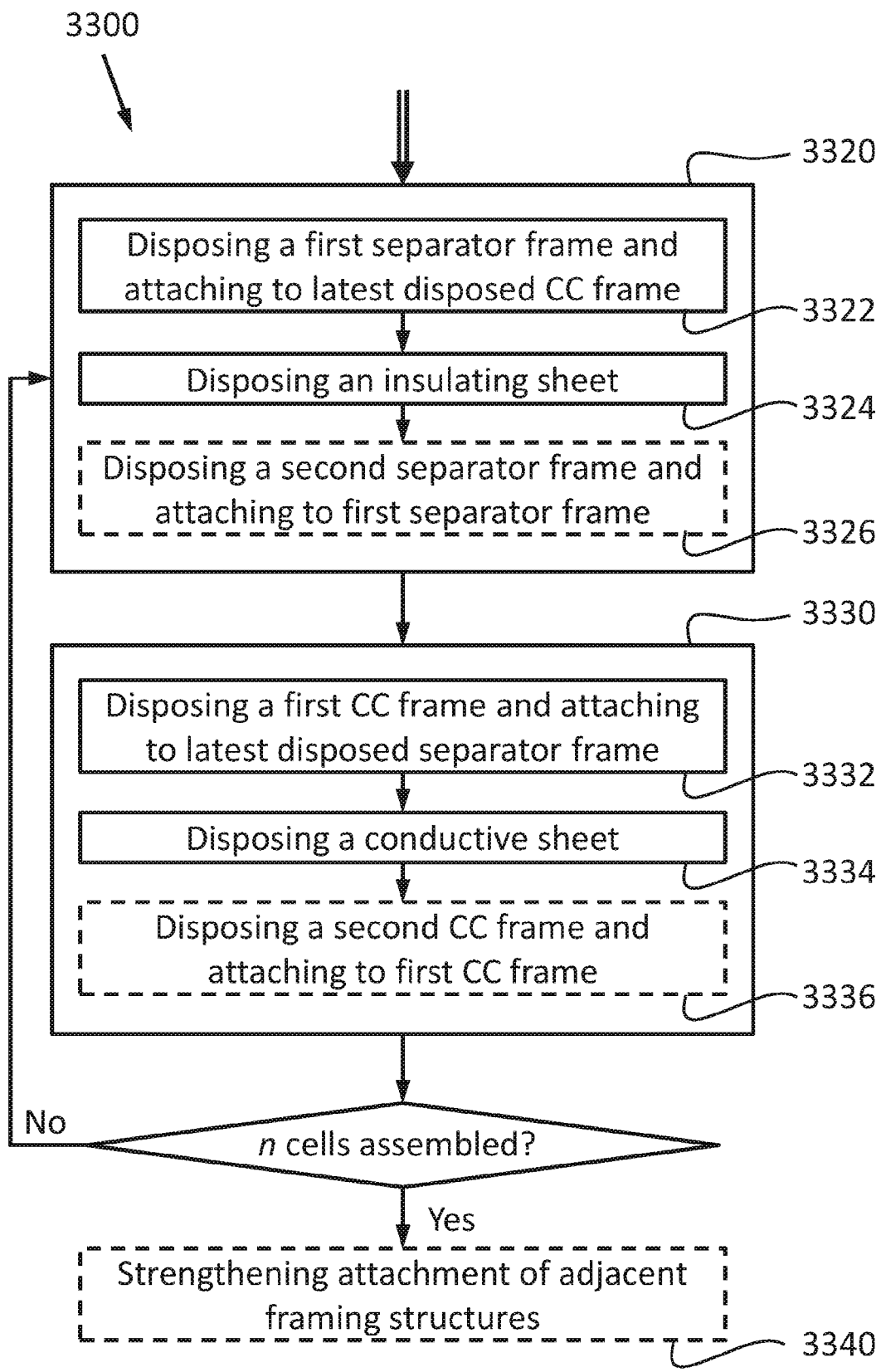
Figure 21A:
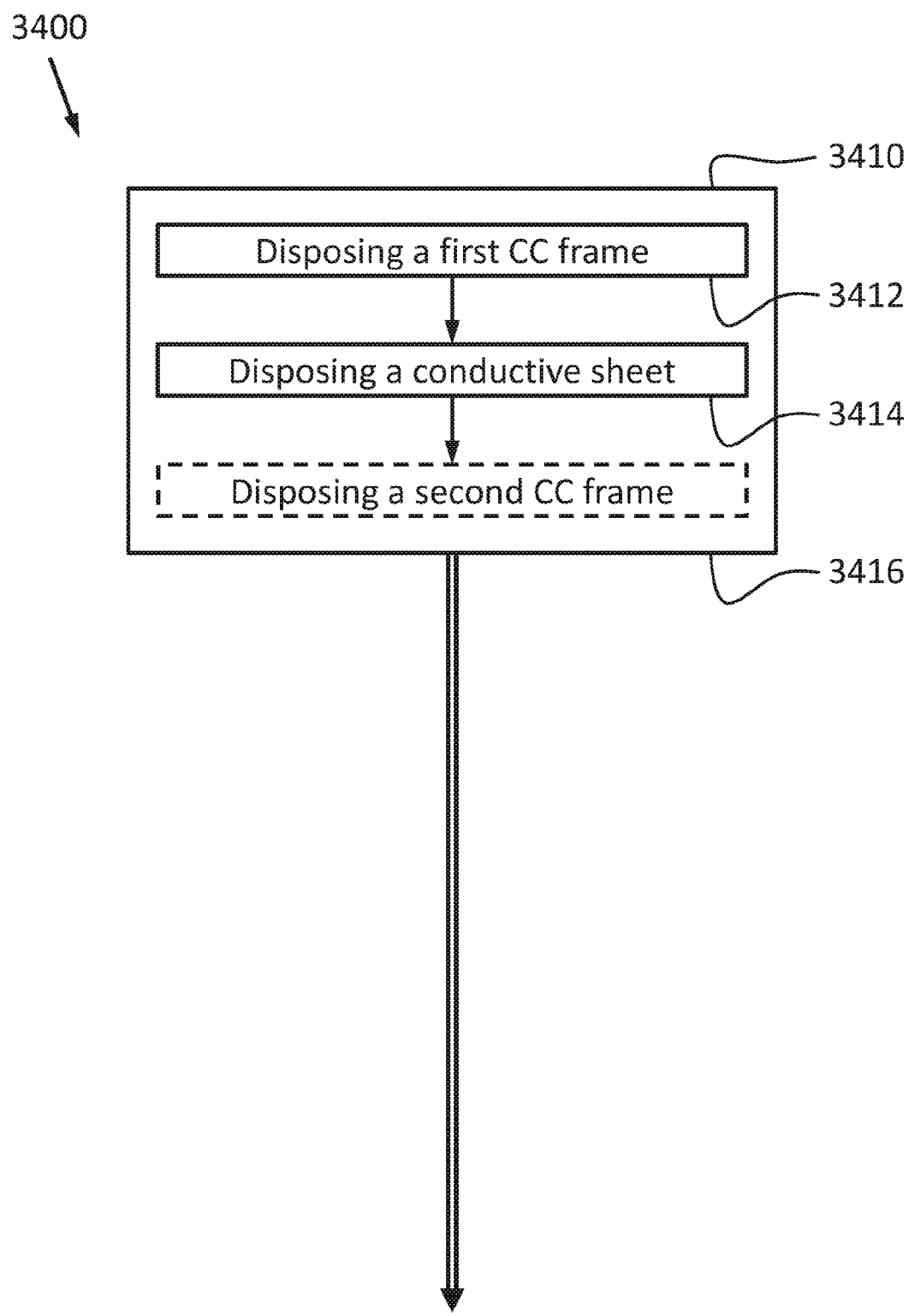
FIG. 21A-21B presents a flowchart for fabricating a supercapacitor stack, in a common current collector configuration, according to some embodiments.
Figure 21B:
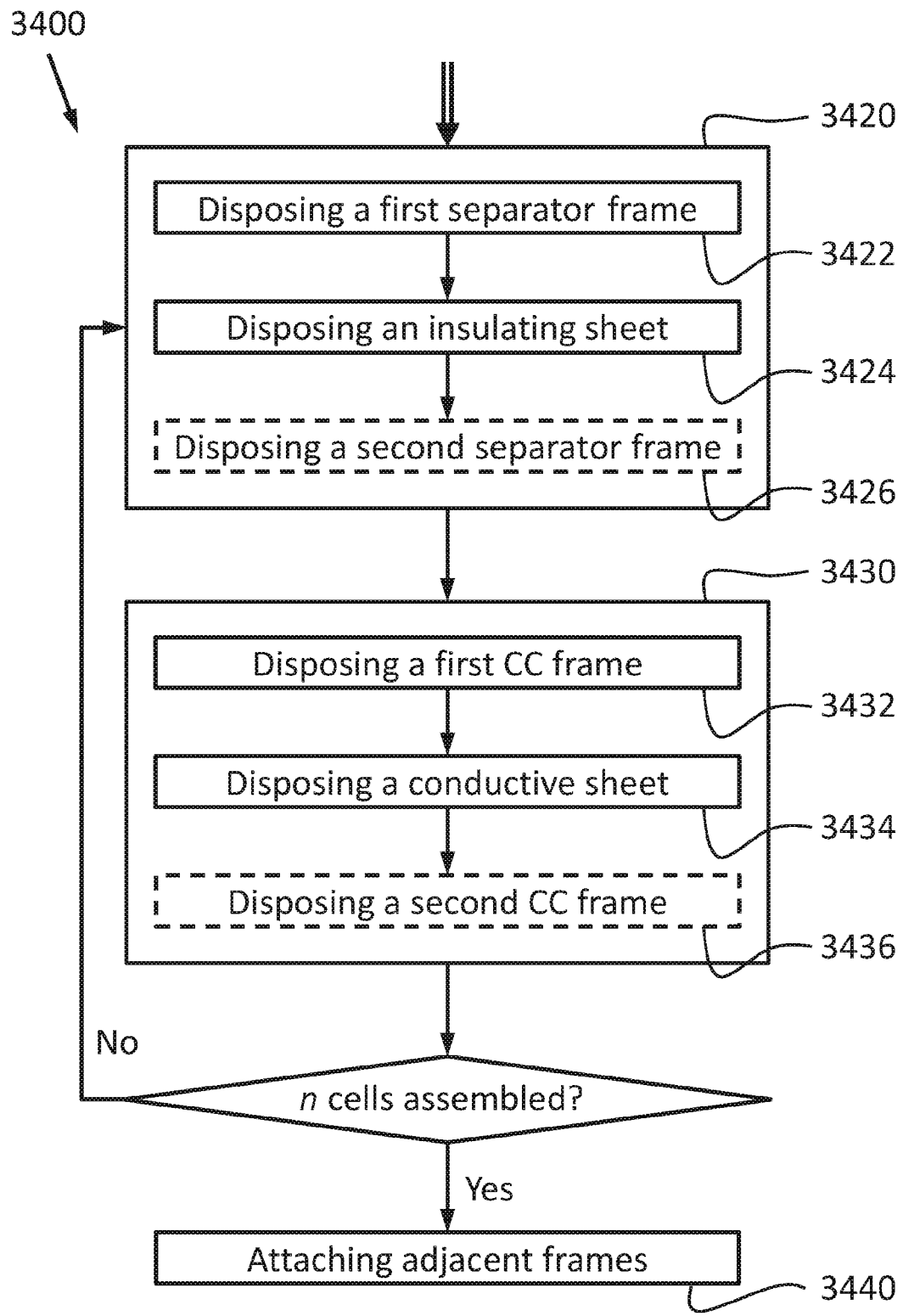

According to an aspect of some embodiments, there is provided a method for fabricating supercapacitor stacks such as supercapacitor stacks 2000, 2400, 2600, and 2800. In the method, the supercapacitor stacks are fabricated directly from the constituents of the framed current collectors and the framed separators (or frameless separators in embodiments wherein frameless separators are used), and from the electrodes. That is to say, framed current collectors and separators are not initially provided, nor are the framed current collectors and separators independently fabricated to be later used in the assembly and sealing of a supercapacitor stack. Instead, the constituents of the framed current collectors and separators—namely dielectric frames, conductive sheets, and insulating sheets—are assembled, pressed, and/or attached (joined) as part of the assembly and sealing of the supercapacitor stack, as elaborated on below. The method includes a step of assembling the supercapacitor stack and a step of attaching adjacent dielectric frames. According to some embodiments, e.g. as depicted in FIGS. 20A-20B, the step of assembling is implemented simultaneously with the step of attaching or with a first part thereof. According to some embodiments, e.g. as depicted in FIGS. 21A-21B, the step of assembling precedes the step of attaching.

FIGS. 20A-20B depict a flowchart of a method 3300 for fabricating an n-cell supercapacitor stack, in a common current collector configuration, using at least n+1 current collector (CC) dielectric frames, n+1 conductive sheets, at least n separator dielectric frames, n insulating sheets, n first electrodes, and n second electrodes. The CC dielectric frames and the separator dielectric frames match one another (i.e. can be mutually aligned one on top of the other), each one having an externally extending framing structure. According to some embodiments, the CC dielectric frames and the separator dielectric frames are identical. Method 3000 includes:

A step 3310, including:
  I. A substep 3312 of disposing a first CC dielectric frame, such as dielectric frame 211 or dielectric frame 311, e.g. on a work platform, such as the work platform depicted in FIG. 22A.
  II. A substep 3314 of disposing a conductive sheet, such as conductive sheet 102, on the CC dielectric frame and optionally attaching the conductive sheet onto the CC dielectric frame.

A step 3320, including:
  I. A substep 3322 of disposing a separator dielectric frame, such as dielectric frame 1311, e.g. on the latest disposed (CC) dielectric frame, and attaching the separator dielectric frame thereto.
  II. A substep 3324 of disposing an insulating sheet, such as insulating sheet 1002, on the separator dielectric frame and optionally attaching the insulating sheet onto the separator dielectric frame.

A step 3330, including:
  I. A substep 3332 of disposing a CC dielectric frame on the latest disposed separator dielectric frame, and attaching the CC dielectric frame thereto.
  II. A substep 3334 of disposing a conductive sheet on the CC dielectric frame and optionally attaching the conductive sheet onto the CC dielectric frame.

Following step 3310, steps 3320 and 3330 are serially repeated, i.e. one after the other, starting with step 3320, a total of n times.

Each insulating sheet has disposed there below, between the insulating sheet and the conductive sheet adjacent thereto from below, one of the first electrodes (e.g. one of first electrodes 2130). Each insulating sheet has disposed there above, between the insulating sheet and the conductive sheet adjacent thereto from above, one of the second electrodes (e.g. one of second electrodes 2140). In embodiments wherein the current collectors and/or the separators do not have the electrodes already applied thereon (e.g. printed thereon), step 3310 further includes disposing one of the first electrodes on the conductive sheet following the disposing of the conductive sheet on the CC dielectric frame. Similarly, step 3320 further includes disposing one of the second electrodes on the insulating sheet following the disposing of the insulating sheet on the separator dielectric frame, and step 3330 further includes disposing one of the first electrodes on the conductive sheet following the disposing of the conductive sheet on the CC dielectric frame.

According to some alternative embodiments of method 3300 (not including substeps 3316, 3326, and 3336), substep 3322 does not include attaching the separator dielectric frame to the latest disposed CC dielectric frame. Instead, the attachment is effected in substep 3332. For example, in the mth repetition of substep 3322, an mth separator dielectric frame is disposed on an mth CC dielectric frame (which was disposed in the (m−1)th repetition of substep 3332), but is not attached thereto. Next, in the mth repetition of substep 3332, the (m+1)th CC dielectric frame is disposed on the mth separator dielectric frame, and an attachment procedure is effected, wherein the mth separator dielectric frame is attached to both the mth CC dielectric frame (adjacent thereto from below) and the (m+1)th CC dielectric frame (adjacent thereto from above), as further elaborated on below.

According to some embodiments, step 3320 further includes a substep 3326 following substep 3324. Substep 3326 includes disposing a second separator dielectric frame, such as second dielectric frame 1313 (in embodiments wherein the first separator dielectric frame is first dielectric frame 1311, both shown in FIG. 11A), or second dielectric frame 1413 (in embodiments wherein the first separator dielectric frame is first dielectric frame 1411, both shown in FIG. 12B). The second separator dielectric frame is disposed on the first separator dielectric frame such as to be aligned therewith, and is attached thereto with the insulating sheet sandwiched there between (e.g. as depicted in FIG. 11B with respect to either of separators 1300 and 1300*b*, or in FIG. 12B with respect to either of separators 1400 and 1400*b*). It is noted that in such embodiments, in substep 3332, the first CC dielectric frame is attached to the second separator dielectric frame (which is latest disposed separator dielectric frame).

According to some embodiments, step 3310 further includes a substep 3316 following substep 3314. Substep 3316 includes disposing a second CC dielectric frame, such as second dielectric frame 313 (in embodiments wherein the first CC dielectric frame is first dielectric frame 311, both shown in FIG. 3A), or second dielectric frame 413 (in embodiments wherein the first CC dielectric frame is first dielectric frame 411, both shown in FIG. 4B). The second CC dielectric frame is disposed on the first CC dielectric frame such as to be aligned therewith, and is attached thereto with the conductive sheet sandwiched there between (e.g. as depicted in FIG. 3A with respect to either of current collectors 300 and 300*b*, and in FIG. 4B with respect to either of current collectors 400 and 400*b*). Step 3330 further includes a substep 3336 following substep 3334. Substep 3336 is essentially similar to substep 3316. It is noted that in such embodiments, in substep 3322, the first separator dielectric frame is attached to the second CC dielectric frame (which is the latest disposed CC dielectric frame). The resultant layered structure is similar to that depicted in FIGS. 13B-13C and in FIGS. 14B-14C.

According to some embodiments, the attachment of adjacent dielectric frames in steps 3310, 3320, and 3330 may be effected using a suitable adhesion technique and/or adhesive material (e.g. heating, pressing, heat-pressing, heat-fusing, laser, laser welding, ultrasonic welding, soldering, and the like, and/or glue), as elaborated on below. According to some embodiments, the attachment of adjacent dielectric frames in steps 3310, 3320, and 3330 seals the supercapacitor stack.

According to some embodiments, the disposing of dielectric frames in steps 3320 and 3330 (and in step 3310 in embodiments including substep 3316) may be followed by applying force on the latest disposed dielectric frame, such as to press the hitherto assembled elements (i.e. the CC dielectric frames, the conductive sheets, the separator dielectric frames, the insulating sheets, and the electrodes), thereby expelling air and excess electrolyte from between hitherto assembled elements, as elaborated on below.

According to some embodiments, method 3300 further includes a step 3340, wherein the attachment of adjacent dielectric frames onto one another may be strengthened. According to some embodiments, the strengthening of the attachment seals the supercapacitor stack. According to some embodiments, the strengthening of the attachment is effected by heat-fusion. According to some embodiments, the contact portion bottom side of each dielectric frame, except for the bottommost dielectric frame, is heat-fused onto the contact portion top side of the dielectric frame adjacent thereto from below, and the contact portion top side of each dielectric frame, except for the topmost dielectric frame, is heat-fused onto the contact portion bottom side of the dielectric frame adjacent thereto from above. According to some embodiments, the heat-fusion process involves removing the rim portions of the dielectric frames, as elaborated on in the description of FIGS. 15A-15D and FIGS. 16A-16D and as further elaborated on below.

According to some embodiments, which include step 3340, the attachment in steps 3310, 3320, and 3330 establishes a physical connection (e.g. an electrostatic connection) between the adjacent dielectric frames, whereas the attachment in step 3340 establishes a chemical connection between adjacent dielectric frames. For example, the attachment in steps 3310, 3320, and 3330 may be effected by heat-pressing, while the attachment in step 3340 may be effected by heat-fusion.

According to some embodiments, steps 3310, 3320, and 3330 are effected in vacuo (e.g. inside a vacuum), e.g. at an ambient pressure of about 0.5 atm, to facilitate the expulsion of air from between adjacent structural strata. According to some embodiments, step 3340 is effected in vacuo, e.g. at an ambient pressure of about 0.5 atm, to facilitate the expulsion of air from within the assembled supercapacitor stack.

According to some embodiments (not depicted in the flowcharts), there is provided a method for fabricating an n-cell supercapacitor stack, in a distinct-cell configuration. The method is similar to method 3300 but differs therefrom in that following each of the first n−1 repetitions of steps 3320 and 3330: (i) an additional CC dielectric frame is disposed on the latest disposed CC dielectric frame, such as to be aligned therewith, and is attached thereto; (ii) an additional conductive sheet is disposed on the first additional CC dielectric frame and is optionally attached thereto; and optionally (iii) a second additional CC dielectric frame is disposed on the additional CC dielectric frame, such as to be aligned therewith, and is attached thereto with the additional conductive sheet sandwiched there between. According to some embodiments, prior to the placing of the (first) additional CC dielectric frame, a filling material, such as a sealant, is applied on the top surface of the top one of the hitherto assembled conductive sheets.

According to some embodiments (not depicted in the flowcharts), there is provided a method for fabricating an n-cell supercapacitor stack in a common current collector configuration. The method is similar to method 3300 but differs therefrom in that no separator dielectric frames are disposed, so that adjacent CC dielectric frames are directly attached onto one another (instead of being indirectly attached via one or two separator dielectric frames there between, as in method 3300). The skilled person will appreciate that the method may be adapted to the fabrication of an n-cell supercapacitor stack in a distinct-cell configuration, using frameless separators in place of framed separators, by additionally incorporating the teachings described in the preceding paragraph for adapting method 3300 to the fabrication of an n-cell supercapacitor stack in a distinct-cell configuration (using framed separators).

FIGS. 21A-21B depict a flowchart of a method 3400 for fabricating an n-cell supercapacitor stack, in a common current collector configuration, using at least n+1 CC dielectric frames, n+1 conductive sheets, at least n separator dielectric frames, n insulating sheets, n first electrodes, and n second electrodes. The CC dielectric frames and the separator dielectric frames match one another (i.e. can be mutually aligned one on top of the other), each one having an externally extending framing structure. Method 3400 includes:

A step 3410, including:
  I. A substep 3412 of disposing a first CC dielectric frame, such as dielectric frame 211 or first dielectric frame 311, e.g. on a work platform, such as the work platform depicted in FIG. 22A.
  II. A substep 3414 of disposing a conductive sheet, such as conductive sheet 102, on the CC dielectric frame and optionally attaching the conductive sheet onto the CC dielectric frame.

A step 3420, including:
  I. A substep 3422 of disposing a separator dielectric frame, such as dielectric frame 1311, e.g. on the latest disposed (CC) dielectric frame.
  II. A substep 3424 of disposing an insulating sheet, such as insulating sheet 1002, on the separator dielectric frame and optionally attaching the insulating sheet onto the separator dielectric frame.

A step 3430, including:
  I. A substep 3432 of disposing a CC dielectric frame on the latest disposed separator dielectric frame.
  II. A substep 3434 of disposing a conductive sheet on the CC dielectric frame and optionally attaching the conductive sheet onto the CC dielectric frame.

A step 3440 of attaching onto one another the adjacent dielectric frames.

Similarly to steps 3320 and 3330 in method 3300, following step 3410, steps 3420 and 3430 are serially repeated, i.e. one after the other starting with step 3420, a total of n times. Step 3440 follows the last repetition (the nth repetition) of the step 3430. Steps 3410, 3420, and 3430 are similar to steps 3310, 3320, and 3330, respectively, in method 3300, but differ therefrom in not including a substep of attaching adjacent dielectric frames. Method 3400 further differs from method 3300 in that, unlike step 3340, which is optional, step 3440 is non-optional (that is to say, step 3440 is integral to method 3400). According to some embodiments, the disposing of the dielectric frames in steps 3410, 3430, and 3430 is carried out using some of the techniques and means used for the disposing of the dielectric frames in steps 3310, 3320, and 3330, respectively, of method 3300, as described above. According to some embodiments, step 3440 is implemented similarly to step 3340 in method 3300 (i.e. using some of the same techniques and means).

According to some embodiments (not depicted in the flowcharts), there is provided a method for fabricating an n-cell supercapacitor stack, in a distinct-cell configuration. The method is similar to method 3400 but differs therefrom in that following each of the first n−1 repetitions of steps 3420 and 3430: (i) an additional CC dielectric frame is disposed on the latest disposed CC dielectric frame, such as to be aligned therewith; (ii) an additional conductive sheet is disposed on the first additional CC dielectric frame and is optionally attached thereto; and optionally (iii) a second additional CC dielectric frame is disposed on the additional CC dielectric frame, such as to be aligned therewith with the additional conductive sheet sandwiched there between. According to some embodiments, prior to the placing of the (first) additional CC dielectric frame, a filling material, such as a sealant, is applied on the top surface of the top one of the hitherto assembled conductive sheets.

According to some embodiments (not depicted in the flowcharts), there is provided a method for fabricating an n-cell supercapacitor stack in a common current collector configuration. The method is similar to method 3400 but differs therefrom in that no separator dielectric frames are disposed, so that adjacent CC dielectric frames are directly attached onto one another (instead of being indirectly attached via one or two separator dielectric frames there between, as in method 3400). The skilled person will appreciate that the method may be adapted to the fabrication of an n-cell supercapacitor stack in a distinct-cell configuration, using frameless separators in place of framed separators, by additionally incorporating the teachings described in the preceding paragraph for adapting method 3400 to the fabrication of an n-cell supercapacitor stack in a distinct-cell configuration (using framed separators).

According to some embodiments of the above-described methods (e.g. methods 3000, 3100, 3200, 3300, and 3400, and the unnumbered methods, which are not depicted in the flowcharts), the second electrodes are identical to the first electrodes, the method embodiments being directed at the fabrication of symmetrically-configured supercapacitor stacks. According to some embodiments of the above-described methods, the second electrodes are not identical to the first electrodes, the method embodiments being directed at the fabrication of asymmetrically-configured supercapacitor stacks.

It is noted that the above-described methods (e.g. methods 3000, 3100, 3200, 3300, and 3400, and the unnumbered methods, which are not depicted in the flowcharts), or steps thereof, can also be employed in the fabrication of pre-sealed supercapacitor stacks, such as pre-sealed supercapacitor stacks 5000 and 5400. In particular, steps 3010, 3020, and 3030 of method 3000, according to some embodiments thereof, can be used to assemble a pre-sealed supercapacitor stack, in a common current collector configuration, wherein adjacent structural strata are physically bonded. Steps 3110, 3120, 3130, and 3135 of method 3100, according to some embodiments thereof, can be used to assemble a pre-sealed supercapacitor stack, in a distinct-cell current collector configuration, wherein adjacent structural strata are physically bonded. Steps 3210, 3220, and 3230 of method 3200, according to some embodiments thereof, can be used to assemble a pre-sealed supercapacitor stack, in a common current collector configuration, wherein adjacent structural strata are not attached. Steps 3310, 3320, and 3330 of method 3300, according to some embodiments thereof, can be used to assemble a pre-sealed supercapacitor stack, in a common current collector configuration, wherein adjacent dielectric frames are physically bonded. Steps 3410, 3420, and 3430 of method 3400, according to some embodiments thereof, can be used to assemble a pre-sealed supercapacitor stack, in a common current collector configuration, wherein adjacent dielectric frames are not attached.

In each of the above-described methods (e.g. methods 3000, 3100, 3200, 3300, and 3400, and the unnumbered methods), according to some embodiments thereof, the electrodes and optionally the insulating sheets are impregnated with the aqueous electrolyte prior to being assembled. According to some embodiments, the insulating sheets' impregnation with the electrolyte results from pressing thereof between prior-impregnated electrodes during the assembly of the supercapacitor stack. According to some embodiments, the electrodes and the insulating sheets are impregnated/further impregnated with the electrolyte during the assembly (e.g. following the placement of an electrode, drops of the electrolyte are dripped thereon to bring the electrode to a desired level of impregnation).

FIGS. 22A-22H schematically depict different stages in an implementation of a specific embodiment of method 3000. Shown are different stages in the implementation of a specific embodiment of step 3010 and in the implementation of the first repetition of a specific embodiment of steps 3020 and 3030. It will be appreciated, however, that some of the means and techniques depicted in FIGS. 22A-22H, and described in the accompanying description, may also be used in the implementation of other methods, such as method 3100 (particularly, steps 3110, 3120, 3130, and 3135), method 3200 (particularly, steps 3210, 3220, and 3230), method 3300 (particularly, steps 3310, 3320, and 3330), and method 3400 (particularly, steps 3410, 3420, and 3430).

FIG. 22A schematically depicts a work platform 4000 (prior to the beginning of step 3010). Work platform 4000 includes a platform top surface 4010. Platform top surface 4010 is configured for assembling thereon a supercapacitor stack. According to some embodiments, as depicted in FIG. 22A, platform top surface 4010 includes a platform geometrical feature 4031, being thereby configured for use in the fabrication of a supercapacitor stack employing self-aligning framed structural strata, such as current collectors 2510 and separators 2520. It is noted that platform top surface 4010 is thereby also configured for use in implementations of methods 3300 and 3400 (wherein framed structural strata are not provided—the constituents thereof being provided instead) employing self-aligning dielectric frames. According to some such embodiments, as depicted in FIGS. 22A-22H, platform geometrical feature 4031 matches geometrical feature 431 of framing structure 404 (of current collector 400). That is to say, platform top surface 4010 includes a wave-like projection 4033, which matches indentation 435 of framing structure 404.

According to some embodiments, not depicted in FIGS. 22A-22H, platform top surface 4010 is flat, being thereby configured for use in the fabrication of a supercapacitor stack employing "flat" (framed) structural strata. It is noted that platform top surface 4010 is thereby also configured for use in implementations of methods 3300 and 3400—wherein framed structural strata are not provided (the constituents thereof being provided instead)—employing flat dielectric frames.

FIG. 22B depicts a stage in the implementation of method 3000 corresponding to the end of step 3010. A first current collector 400(1) (i.e. one of current collectors 2510) is disposed on platform top surface 4010, such as to be aligned therewith, e.g. wave-like projection 4033 is positioned directly below the indentation (identical to indentation 435; hidden from in FIG. 22B), which forms the bottom part of the geometrical feature (a geometrical feature 431(1)) in the framing structure (a framing structure 404(1)) of first current collector 400(1), such that the respective surfaces of wave-like projection 4033 and the indentation are in contact, partial contact, or nearly in contact.

FIG. 22C depicts a stage in the implementation of method 3000 during step 3020. A first electrode 1110(1) (i.e. one of first electrodes 2530) is disposed on a conductive sheet 102(1) of first current collector 400(1), such as to be aligned therewith.

Figure 22D:
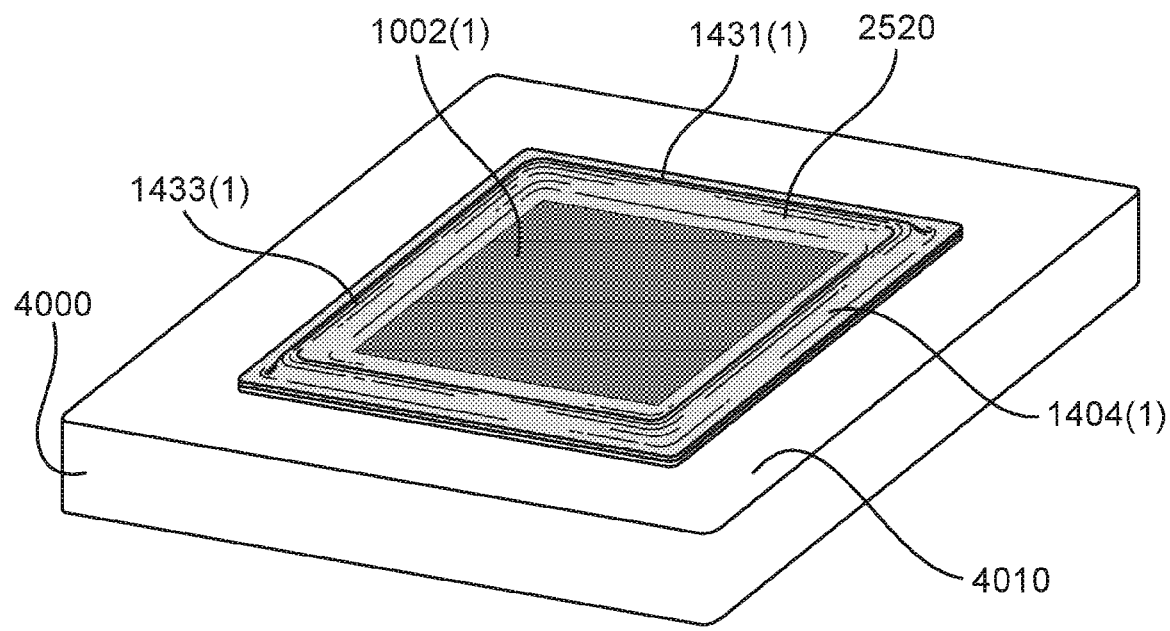

FIG. 22D depicts a stage in the implementation of method 3000 during step 3020 (subsequent to the stage depicted in FIG. 20C). A first separator 1400(1) (i.e. one of separators 2520) is disposed on first current collector 400(1), such as to be aligned therewith (first electrode 1110(1), which is disposed there between, is hidden from view).

Figure 22E:
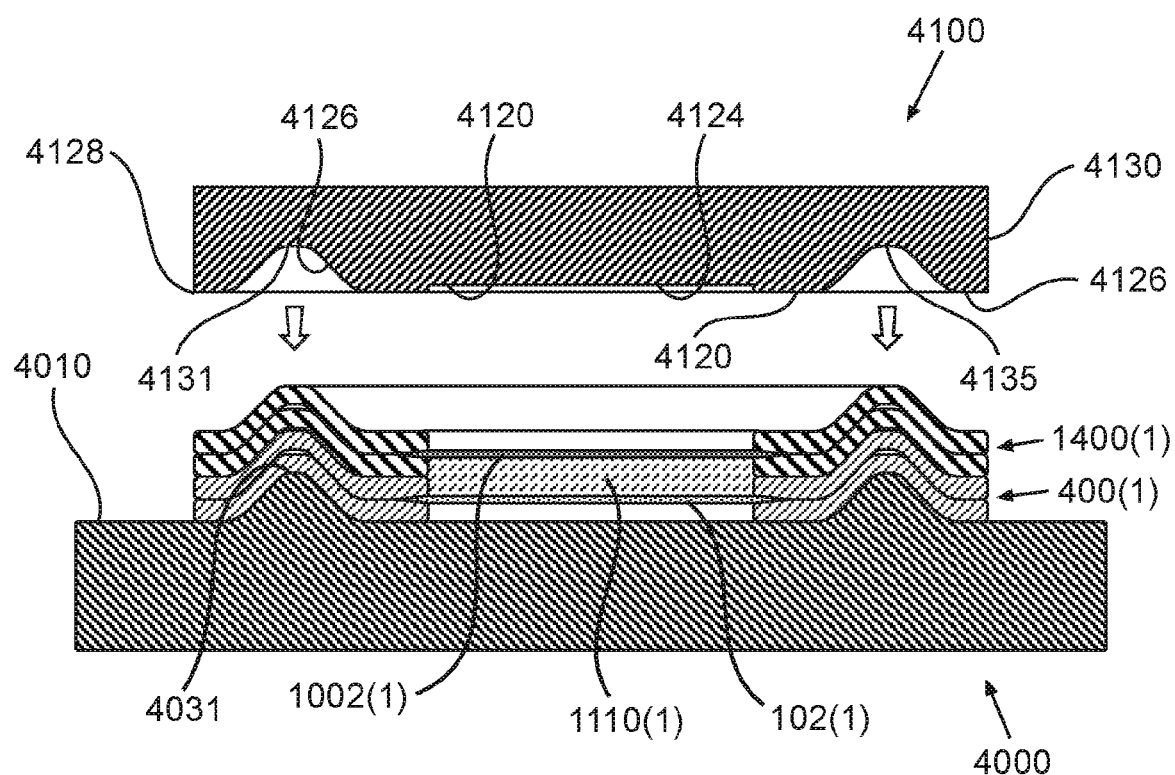

FIG. 22E schematically depicts a cross-sectional view of work platform 4000 and elements disposed thereon (i.e. first current collector 400(1), first electrode 1110(1), and first separator 1400(1)), and of a press 4100. The cross-sectional view is taken along a plane parallel to the zx-plane, which bisects work platform 4000 and the elements disposed thereon, as well as bisecting press 4100. Press 4100 is shown descending towards platform top surface 4010, as elaborated on below.

The cross-sectional view (not depicted in the figures) along a plane parallel to the yz-plane, which similarly bisects the setup (e.g. work platform 4000 and the elements disposed thereon, and press 4100) is essentially similar.

Press 4100 may be generally shaped as a slab or a plate, and includes a press bottom surface 4120 and a press rim 4130. Press bottom surface 4120 includes a central surface 4124 and a peripheral surface 4126. According to some embodiments, central surface 4124 and peripheral surface 4126 are complementary. According to some embodiments, central surface 4124 is slightly depressed, e.g. relative to an outer edge 4128 of press bottom surface 4120.

Press 4100 is configured to be lowered against, and to be pressed against (as well as be raised from), a latest disposed structural stratum (a framed current collector or a framed separator e.g. in methods 3000, 3100, and 3200) or a latest disposed dielectric frame (e.g. in methods 3300 and 3400) in a partially (e.g. prior to the last repetition of steps 3020 and 3030 in method 3000, or prior to the last repetition of steps 3320 and 3330 in method 3300) or fully assembled supercapacitor stack. According to some embodiments, the pressing acts to expel air from between elements in the supercapacitor stack. Alternatively and/or additionally, the pressing may act to attach the latest disposed structural stratum onto the structural stratum adjacent thereto from below (e.g. in methods 3000, 3100, and 3200) or to attach the latest disposed dielectric frame onto the dielectric frame adjacent thereto from below (e.g. in methods 3300 and 3400).

According to some embodiments (not depicted in FIGS. 22A-22H), platform top surface 4010 and peripheral surface 4126 are flat, work platform 4000 and press 4100 being thereby configured to be jointly used in the assembly of flat supercapacitor stacks. According to some embodiments, peripheral surface 4126 includes a press geometrical feature 4131, which matches platform geometrical feature 4031, work platform 4000 and press 4100 being thereby configured to be jointly used in the assembly of self-aligning supercapacitor stacks. In embodiments wherein platform geometrical feature 4031 is in the form of wave-like projection 4033, press geometrical feature is in the form of a matching indentation 4135 (which also matches wave-like projection 433 of the framing structure of current collector 400).

According to some such embodiments, wherein press 4100 is configured for use in the fabrication of a supercapacitor stack, such as supercapacitor stacks 2400 and 2800, central surface 4124 may have substantially the same lateral dimensions as inner perimeter 424 of the framing structure of current collector 400 or as the outer border (indicated by dotted line L2 in FIGS. 16A-16C) of inner perimetral portion 428. Press bottom surface 4120 is thereby configured for applying pressure on the framing structures of the current collectors and the separators of a supercapacitor stack without applying (direct) pressure on the conductive sheets and insulating sheets thereof. In such embodiments, when press bottom surface 4120 is lowered against a partially assembled supercapacitor stack, including current collectors and separators identical to current collector 400 and separator 1400, respectively, indentation 4135 presses against the wave-like projection of the top structural stratum (e.g. wave-like projection 433 or wave-like projection 1433 dependent on whether the top structural stratum is current collector 400 or separator 1400, respectively).

According to some such embodiments (not depicted in the figures), wherein press 4100 is configured for use in the fabrication of a flat supercapacitor stack, such as supercapacitor stacks 2000 and 2600, central surface 4124 may have substantially the same lateral dimensions as inner perimeter 124 of the framing structure of current collector 100 or as the outer border (indicated by dotted line L2 in FIGS. 1A and 1*n* FIGS. 15A-15C) of inner perimetral portion 128. Press bottom surface 4120 is thereby configured for applying pressure on the framing structures of the current collectors and the separators in a supercapacitor stack without applying (direct) pressure on the conductive sheets and insulating sheets thereof. According to some embodiments, press 4100 is configured to controllably apply a pressure between about 2 bar to about 7 bar (e.g. press 4100 may be functionally associated with a pneumatic motor, or a servo motor, enabling the application of a controllable force by press bottom surface 4120)

According to some embodiments, peripheral surface 4126 may be heated—the heating facilitating the attachment of a top (latest disposed) structural stratum onto a structural stratum adjacent thereto from below (e.g. in a step such as 3020 or 3030). More specifically, as peripheral surface 4126 presses against the framing structure of the top structural stratum, peripheral surface 4126 heats the framing structure, and thereby the framing structure of the structural stratum adjacent from below to the top structural stratum, such as to physically bond the two framing structures. According to some embodiments, wherein the framing structures of the current collectors and separators are made of PVC, peripheral surface 4126 is heated to a temperature between approximately 130° and approximately 170°. According to some such embodiments, peripheral surface 4126 is heated to a temperature of approximately 140°.

According to some embodiments, not depicted in the figures, press 4100 is shaped as a thick frame (that is to say, press 4100 includes an inner press rim, or, in other words, does not include a central portion), having a bottom surface substantially identical to peripheral surface 4126.

Figure 22F:
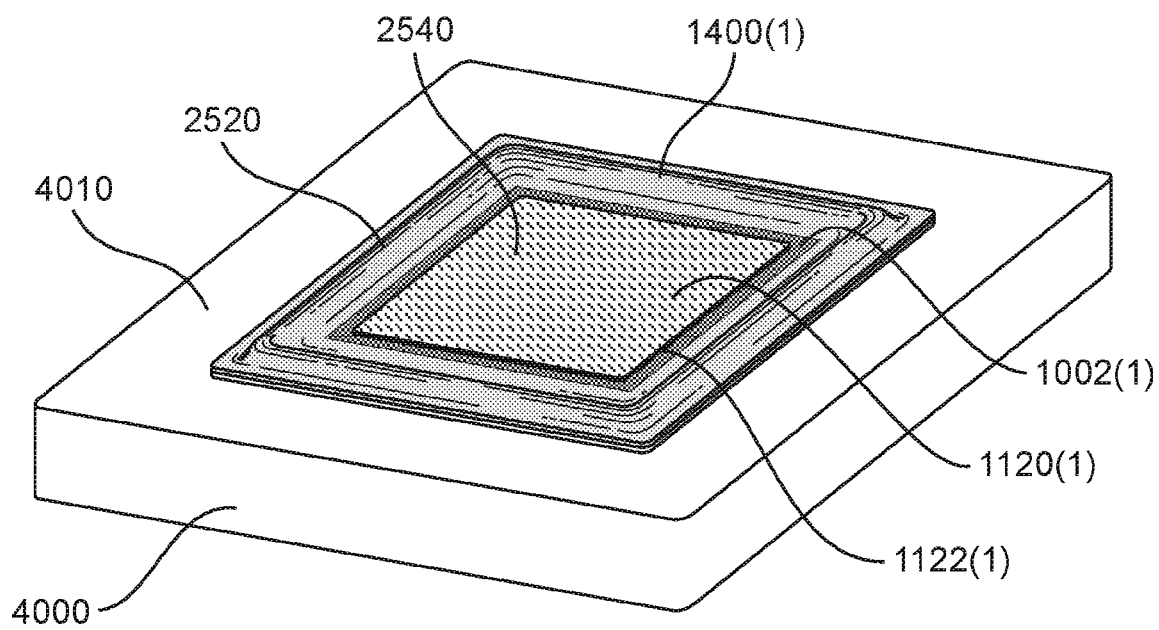

FIG. 22F depicts a stage of in the implementation of method 3000 during step 3030. A second electrode 1120(1) (i.e. one of second electrodes 2540) is disposed on an insulating sheet 1002(1) of separator 1400(1), such as to be aligned therewith.

Figure 22G:
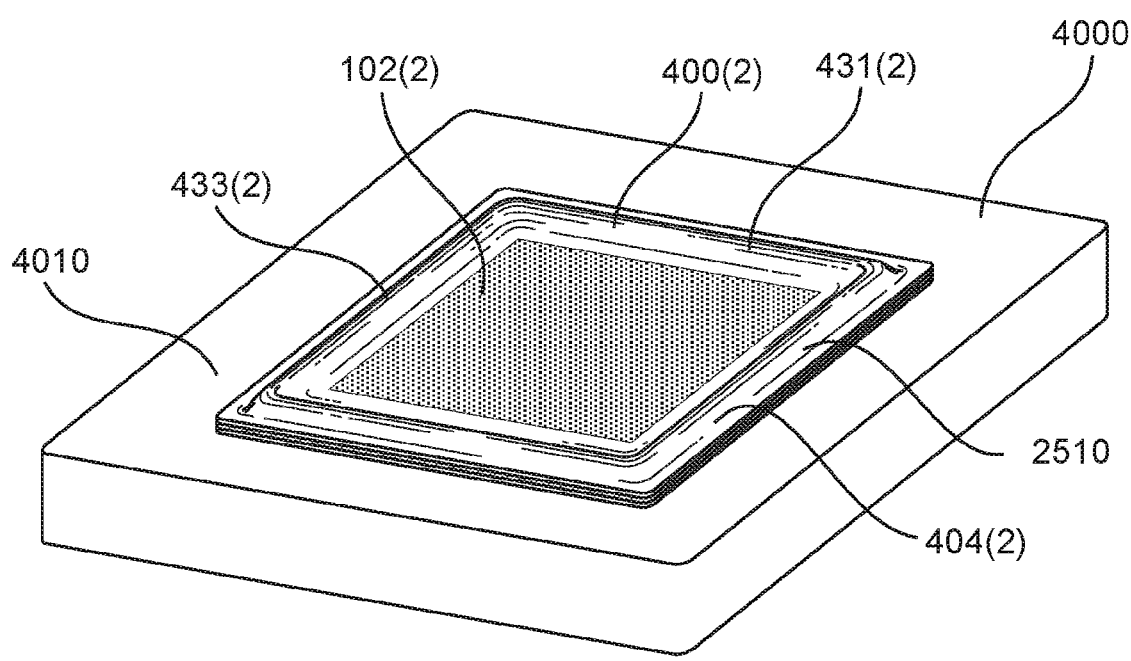

FIG. 22G depicts a stage in the implementation of method 3000 during step 3030 (subsequent to the stage depicted in FIG. 22F). A second current collector 400(2) (i.e. one of current collectors 2510) is disposed on separator 1400(1), such as to be aligned therewith (second electrode 1120(1), which is disposed there between, is hidden from view).

Figure 22H:
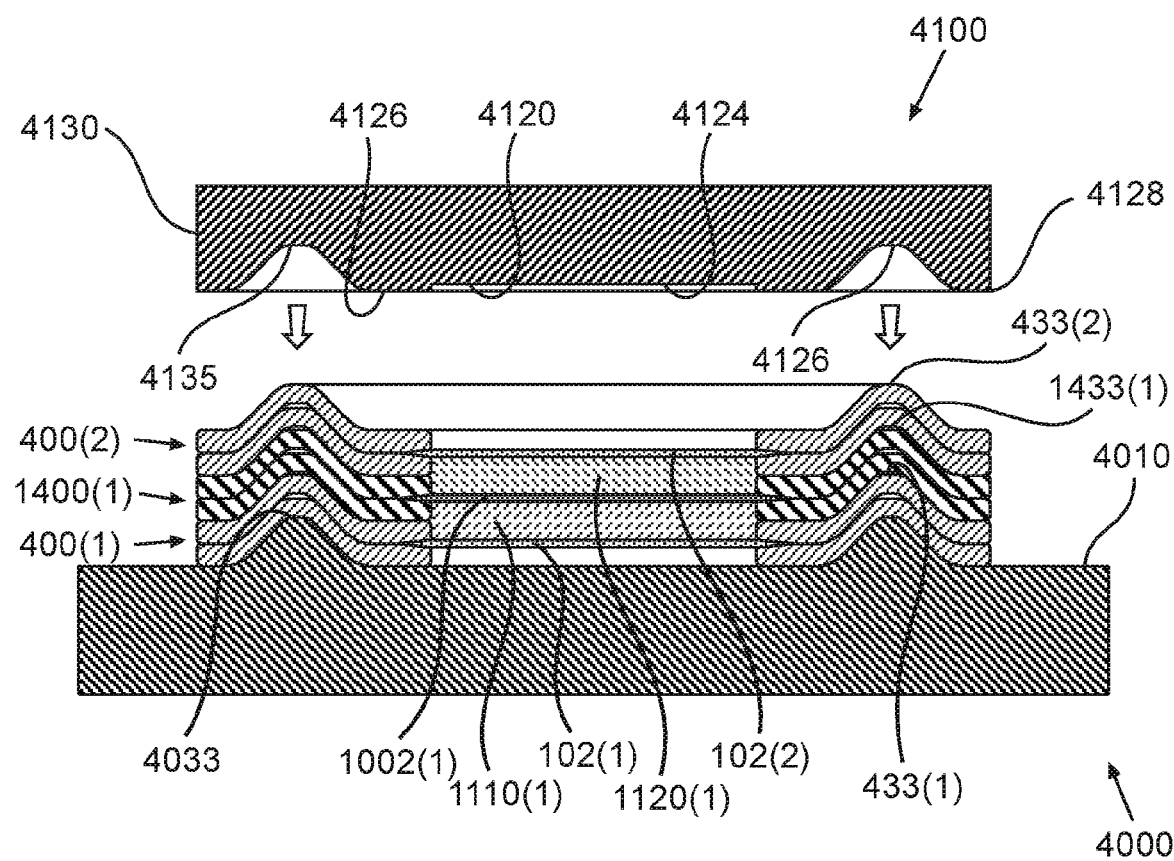

FIG. 22H schematically depicts a cross-sectional view of work platform 4000 and elements disposed thereon (i.e. first current collector 400(1), first electrode 1110(1), first separator 1400(1), second electrode 1120(1), and second current collector 400(2)), and of press 4100.

The cross-sectional view is taken along the same plane as in FIG. 22E. Press 4100 is shown while descending towards platform top surface 4010.

It is noted that FIGS. 22A-22H may equally well serve to schematically depict stages in a specific implementation of method 3100 during step 3110, and the first repetition of steps 3120 and 3130.

It is noted that work platform 4000 and press 4100 are also configured for implementing the assembly steps of methods 3200, 3300, and 3400, according to some embodiments thereof.

The skilled person will appreciate that work platform 4000 and press 4100 may be adapted for use in the assembly of supercapacitor stacks from other types of self-aligning current collectors and matching separators, incorporating different geometrical features from geometrical features 431 and 1431, respectively, such as current collectors identical to current collector 600 and separators matching thereto, current collectors identical to current collector 700 and separators matching thereto, current collectors identical to current collector 800 and separators matching thereto, and current collectors identical to current collector 900 and separators matching thereto.

FIGS. 23A-23D schematically depict different stages in the fabrication of supercapacitor stack 2800 according to a specific embodiment of method 3000, which includes step 3040. In particular, different stages in the implementation of a specific embodiment of step 3040 are shown. It will be appreciated, however, that the means and techniques depicted in FIGS. 23A-23D, and described in the accompanying description, may also be used in the implementation of other methods, such as method 3100 (particularly, step 3140), method 3200 (particularly, step 3240), method 3300 (particularly, step 3340), and method 3400 (particularly, step 3440), and in the fabrication of other supercapacitor stacks, such as supercapacitor stacks 2000, 2400, and 2600.

Figure 23A:
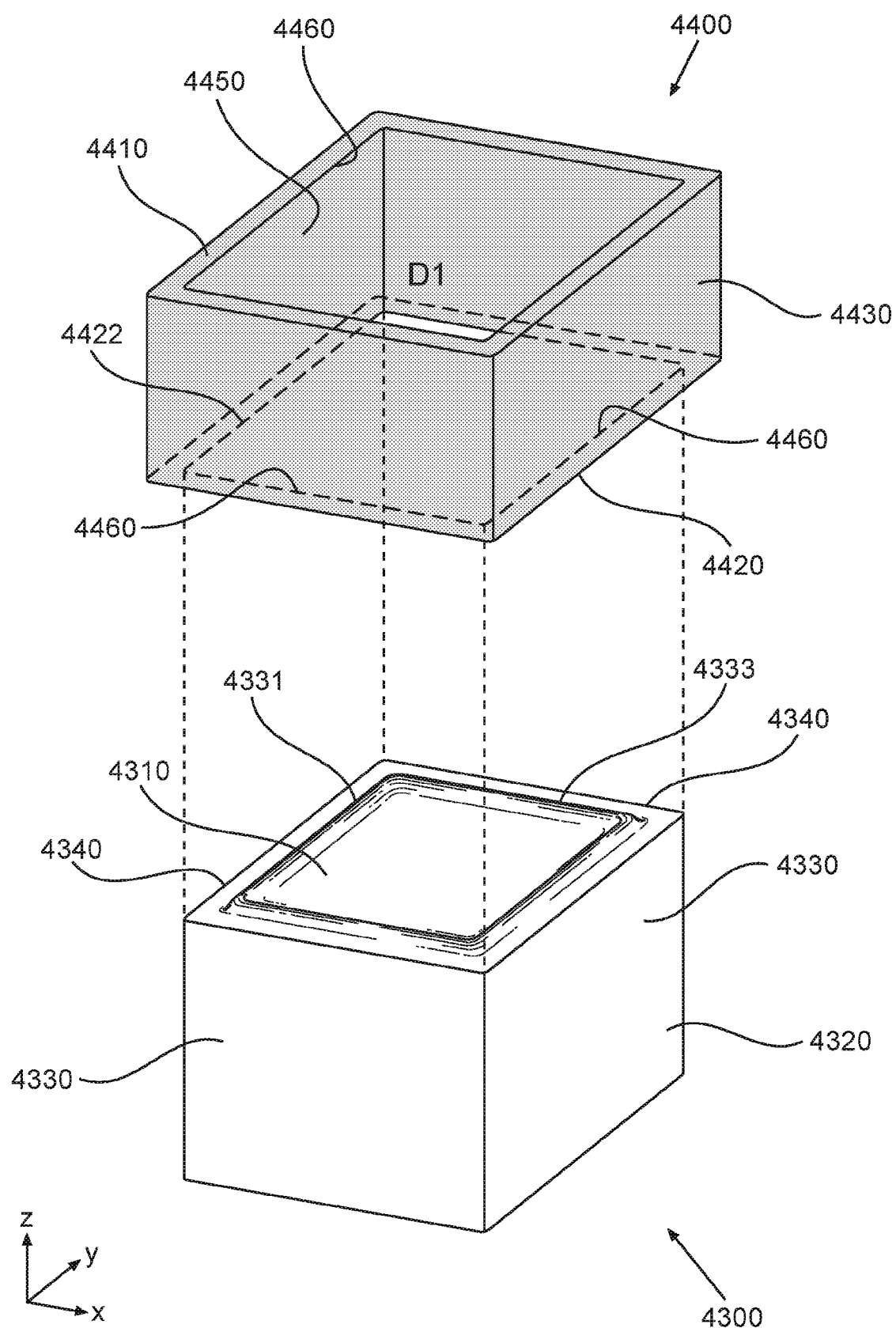
FIG. 23A-23D schematically depict successive stages in an implementation of a specific embodiment of the method of FIG. 17, wherein a pre-sealed self-aligning supercapacitor stack is sealed, the process involving the removal of a stack edge section thereof, according to some embodiments.

FIG. 23A schematically depicts a placement base 4300 and a heating mold 4400 (prior to the beginning of step 3040). Placement base 4300 includes a base top surface 4310, a base bottom portion 4320, and base sidewalls 4330. Base top surface 4310 defines there around a base top surface perimeter 4340. According to some embodiments, base top surface 4310 includes a base geometrical feature 4331, being thereby configured for use in the fabrication of a supercapacitor stack employing self-aligning framed structural strata, such as current collectors 2510 and separators 2520. It is noted that base top surface 4310 is thereby also configured for use in implementations of methods 3300 and 3400—wherein framed structural strata are not provided (the constituents thereof being provided instead)—employing self-aligning dielectric frames. According to embodiments, as depicted in FIG. 23A, geometrical feature 4331 matches geometrical feature 431 of framing structure 404 (of current collector 400). That is to say, base top surface 4310 includes a wave-like projection 4333, which matches indentation 435 of framing structure 404.

According to some embodiments, not depicted in FIGS. 23A-23D, base top surface 4310 is flat, being thereby configured for use in the fabrication of a supercapacitor stack employing flat framed structural strata. It is noted that base top surface 4310 is thereby also configured for use in implementations of methods 3300 and 3400—wherein framed structural strata are not provided (the constituents thereof being provided instead)—employing flat dielectric frames.

According to some embodiments, base sidewalls 4330 are vertical. According to some embodiments, base sidewalls 4330 include four sidewalls (not individually numbered), and base top surface perimeter 4340 is rectangular. According to some embodiments, not depicted in FIGS. 23A-23D, base sidewalls 4330 are centrally inclined (in the downwards direction) from base top surface perimeter 4340. According to some embodiments, not depicted in FIGS. 23A-23D, base sidewalls 4330 constitute a single sidewall (in the sense of not including any corners), e.g. in embodiments wherein base top surface perimeter 4340 is circular.

Heating mold 4400 is generally shaped as a thick frame and includes a mold top 4410, a mold bottom 4420, mold sidewalls 4430, and mold inner walls 4450, which define a mold inner space D1 open from above and from below. Mold inner walls 4450 are vertical, defining a mold inner perimeter 4460 of substantially identical dimensions to base top surface perimeter 4340 (e.g. when base top surface perimeter 4340 defines a circle, mold inner perimeter 4460 also defines a circle having substantially the same radius as that of base top surface perimeter 4340). Heating mold 4400 and placement base 4300 are configured to allow lowering heating mold 4400 over placement base 4300 such that mold inner walls 4450 nearly contact, or slide against, base top surface perimeter 4340 (and base sidewalls 4330 in embodiments wherein base sidewalls are vertical). In particular, heating mold 4400 is controllably switchable between at least two configurations: a first configuration wherein heating mold 4400 is positioned above placement base 4300 (i.e. mold bottom 4420 is above base top surface 4310) and a second configuration wherein mold bottom 4420 is level with, or slightly below, base top surface perimeter 4340. According to some embodiments, heating mold 4400 admits a third configuration, wherein mold top 4410 is positioned below base top surface perimeter 4340.

Heating mold 4400 is configured to allow heating mold inner walls 4450 (i.e. increasing the temperature thereof), e.g. by means of one or more heating elements (not shown) disposed within heating mold 4400. According to some embodiments, the one or more heating elements are positioned such as to allow uniformly heating mold inner walls 4450. According to some embodiments, the one more heating elements are positioned such as to allow heating only a part of heating mold inner walls 4450, for example, from mold bottom 4420 half-way up to mold top 4410.

Figure 23B:
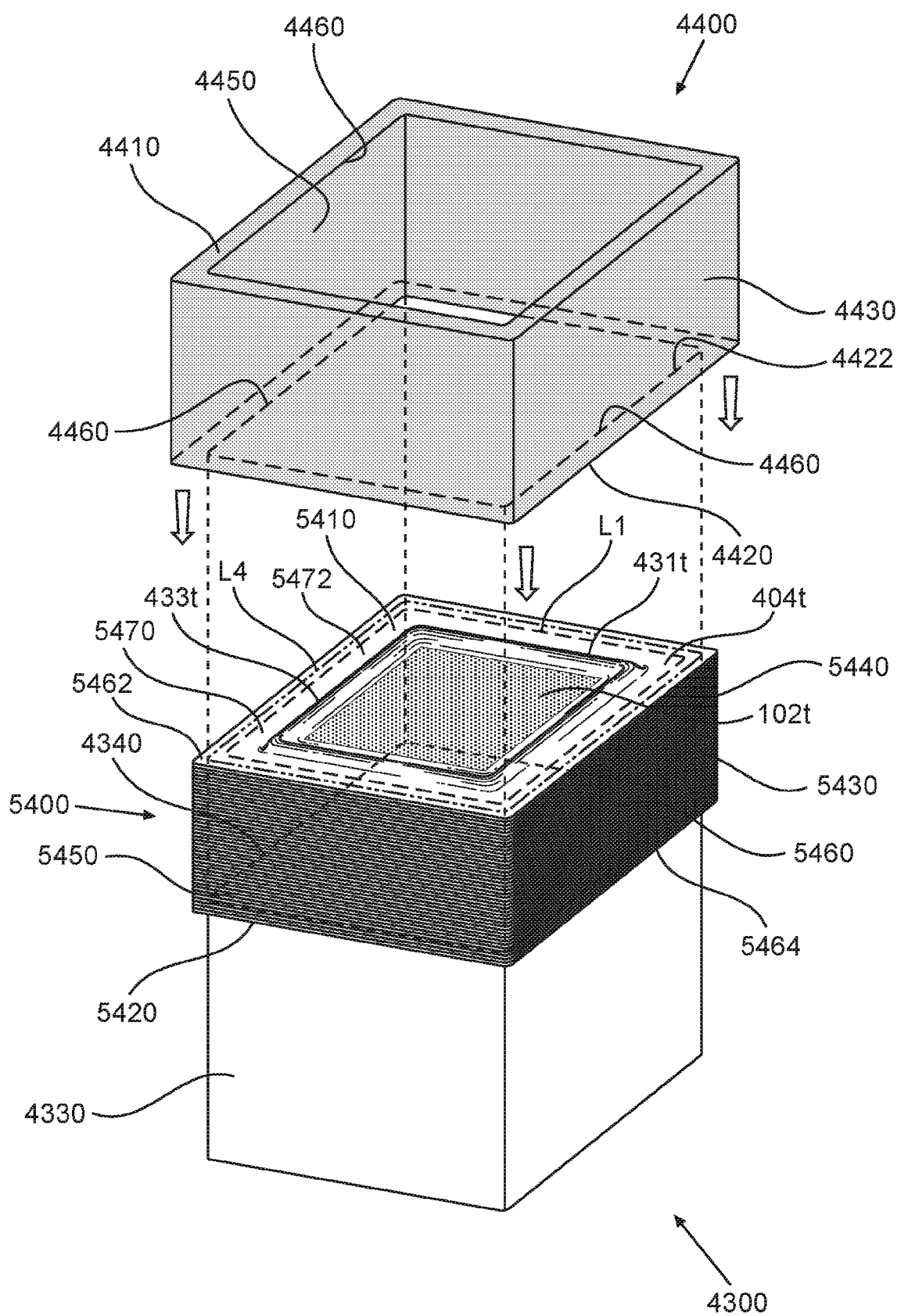

FIG. 23B depicts a stage in the fabrication of supercapacitor stack 2800 corresponding to the beginning of step 3040. Pre-sealed supercapacitor stack 5400 is placed on base top surface 4310, such as to be aligned therewith (and laterally centered relative thereto), and is therefore also aligned with (and laterally centered relative to) heating mold 4400. Pre-sealed supercapacitor stack 5400 has slightly larger lateral dimensions than base top surface perimeter 4340. The perimeter (indicated by dashed-double dotted line L4) of stack internal portion 5470 and base top surface perimeter 4340 are of substantially equal dimensions. As pre-sealed supercapacitor stack 5400 is aligned with (and centered relative to) base top surface 4310, substantially the whole of stack edge section 5460 laterally protrudes from base top surface 4310 (that is to say, substantially all of stack edge section 5460 is (laterally) located beyond base top surface perimeter 4340). Heating mold 4400 is shown in transition from the first configuration to the second configuration, that is to say, descending towards pre-sealed stack 5400.

Also indicated is a top current collector 400t, which is the topmost current collector in pre-sealed stack 5400. (Current collector 400t is identical to current collector 400). Further indicated are a conductive sheet 102t of current collector 400t, a framing structure 404t of current collector 400t, and a geometrical feature 431t in the shape of a wave-like projection 433t on the top side of framing structure 404t.

Figure 23C:
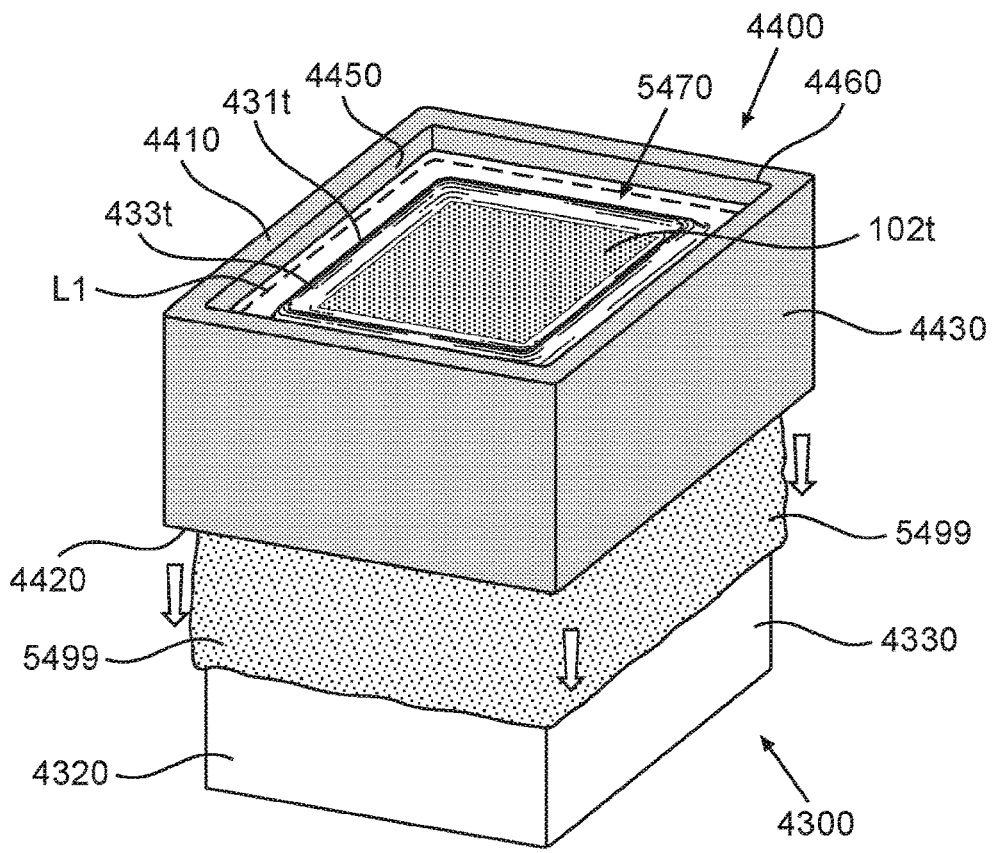

FIG. 23C depicts a stage in the fabrication of supercapacitor stack 2800 corresponding to the middle of step 3040. Heating mold 4400 is in the second configuration, having been lowered on pre-sealed supercapacitor stack 5400, and having thereby cut off stack edge section 5460, which in the process has been transformed into waste 5499, as elaborated on below.

According to some embodiments, mold bottom 4420 is configured for cutting (e.g. cutting off stack edge section 5460), as elaborated on below. According to some embodiments, a mold bottom inner edge 4422 (i.e. the bottom of mold inner walls 4450, shown in FIGS. 23A-23B), being thereby configured for cutting. According to some embodiments, not depicted in FIGS. 23A-23D, a bottom portion of mold sidewalls 4430 is centrally inclined in the downwards direction towards mold inner walls 4450 (which are vertical), such that mold bottom 4420 is narrow or even sharp. According to some embodiments (not depicted in the figures), mold bottom inner edge 4422 is convex (rounded). That is to say, a cross-section of mold bottom inner edge 4422 defines a (convex) arc, mold bottom inner edge 4422 being thereby configured for peeling off stack edge section 5460 by applying a force thereon whose magnitude varies along the length of the arc. According to some embodiments, mold bottom inner edge 4422 may be shaped as a quarter of a circle. According to some embodiments, mold bottom 4420 may also be heated, thereby facilitating the cutting. As used herein, according to some embodiments, "cutting" is used in a broad sense of removal of a layer by application of force and optionally heat, and is not limited to cutting by sharp instruments.

The lowering of heating mold 4400 towards stack top 5410 brings mold bottom 4420 into contact with edge section top 5462. As heating mold 4400 is further lowered, mold bottom 4420 presses edge section top 5462 (i.e. mold bottom 4420 applies a force in the downwards direction on edge section top 5462). The combination of the force exerted and the heat from inner mold walls 4450 (particularly, near/at mold bottom 4420) results in stack edge section 5460 being progressively peeled off (cut off) of stack internal portion 5470 as mold bottom 4420 increasingly descends further below internal portion top 5472. When heating mold 4400 reaches the second configuration, stack edge section 5460 is fully peeled off. The peeling off of stack edge section 5460 externalizes internal portion side surfaces 5478 (in the sense of constituting outer surfaces; in FIG. 23C internal portion side surfaces 5478 are hidden from view by heating mold 4400).

The heat emanating from mold inner walls 4450 (which in the second configuration envelope internal portion side surfaces 5478) seals stack internal portion 5470. More specifically, the remaining parts (i.e. the none-trimmed off parts) of the framing structures of pre-sealed supercapacitor stack 5400 are heat-fused onto one another, thereby completing the final step in the fabrication of supercapacitor stack 2800 (i.e. the conversion of pre-sealed supercapacitor stack 5400 into supercapacitor stack 2800).

Waste 5499 is made up of the peeled off portions of stack edge section 5460, which is deformed and transformed (e.g. melted, warped, contorted, and/or compressed) during the peeling off thereof.

According to some embodiments, the width of stack edge section 5460 (i.e. the width of the portion of stack 5400, which is cut off) is selected such as to be substantially equal to, or slightly greater than, the tolerance of stack sides 5430. Consequently, as heating mold 4400 is lowered over pre-sealed stack 5400, substantially every location on internal portion side surfaces 5478 comes into contact with mold inner walls 4450, so that substantially all of the heat transferred to stack internal portion 5470 from mold inner walls 4450 is transferred by way of heat conduction, with substantially no heat being transferred by way of convection. The resultant heating is thereby effected uniformly on internal portion side surfaces 5478.

According to some embodiments, to effect the heat-fusion, mold inner walls 4450 are heated to a temperature slightly below the (first) thermal decomposition temperature of the thermoplastic from which the framing structures are made (or slightly below the lower of the two (first) thermal decomposition temperatures when the collector framing structures and the separator framing structures are made of different thermoplastics). According to some embodiments, wherein the framing structures of the current collectors and the separators are made of PVC, mold inner walls 4450 are heated to a temperature between 190° and 240° (the first thermal decomposition temperature of some commercially available PVC being 247°). According to some such embodiments, mold inner walls 4450 are heated to a temperature of approximately 225°.

The time spent in the second configuration should be such as to allow for complete sealing of stack 2800, without inflicting any damage thereon, particularly, to stack sidewalls 2830. Generally, the temperature of mold inner walls 4450, the rate at which heating mold 4400 descends over pre-sealed stack 5400, and the time spent in the second configuration are selected such that:

(i) the depth of the heat-fusion is between is (a) sufficiently deep to guarantee a robust sealing of the supercapacitor, and (b) not too deep, in order to avoid heat-fusion at regions wherein the insulating sheets are present and potential leakage of electrolyte from the (impregnated) insulating sheets; and (ii) the temperature in vicinity of the inner perimeter of the dielectric frames does not rise above about 70° to avoid potential tears in the conductive sheets in the exposed parts thereof, which could lead to short circuits.

According to some embodiments, the term "depth of the heat-fusion" with reference to a sealed supercapacitor stack (e.g. stack 2000 or 2800), refers to the maximum distance from the stacks sides (e.g. stack sides 2030 or stack sides 2830) into the stack along which adjacent framing structures are heat-fused onto one another.

According to some embodiments, the dielectric frames are made of PVC, the conductive sheets are made of PVC embedded with carbon particles, the dielectric frames have a width of about 12 mm, pre-sealed stack 5400 height is approximately 23 mm, heating mold 4400 height is approximately 25 mm, and mold inner walls 4450 are heated to a temperature of approximately 225°. From a position wherein mold bottom 4420 is level with stack top 5410, about 5 minutes are taken for heating mold 4400 to reach the second configuration. That is to say, heating mold 4400 descends over pre-sealed stack at a rate of about 5 mm per minute. Heating mold 4400 remains in the second configuration for about 90 seconds before being switched to the third configuration. The switching from the second configuration to the third configuration takes about 15 seconds. The depth of the heat-fusion is between about 1 mm to about 4 mm. According to some embodiments, the depth of the heat-fusion is between approximately 3 mm to approximately 4 mm.

According to some embodiments (not depicted in the figures), wherein pre-sealed stack 5400 height is greater than heating mold 4400, heating mold 4400 is configured to be controllably switchable to an intermediate configuration between the first configuration and the second configuration. For example, in embodiments wherein pre-sealed stack height 5400 is twice that of heating mold 4400, the cutting off of stack edge section 5460 is effected in two steps. In the first step, heating mold 4400 is lowered to the intermediate configuration, wherein mold inner walls 4450 contact the top half of internal portion side surfaces 5478. In the second step, heating mold 4400 is switched from the intermediate configuration to the second configuration, wherein mold bottom 4420 is level with the bottom of stack internal portion 5470 and mold inner walls 4450 contact the bottom half of internal portion side surfaces 5478.

According to some embodiments, mold inner walls 4450 are heated to a temperature such that when placed in contact with internal portion side surfaces 5478 a sufficient amount of time, the viscosity of the solid thermoplastics constituting a (trimmed) framing structure, and the (trimmed) framing structures adjacent thereto, may be temporarily reduced in the region of contact with mold inner walls 4450. The reduced-viscosity thermoplastic material in the region of contact may at least partially intermingle, such that when heating mold 4400 is switched to the third configuration (or back to the first configuration), and mold inner walls 4450 no longer contact internal portion side surfaces 5478, the thermoplastic material cools and re-solidifies to form a weld or fuse seam, binding adjacent (trimmed) framing structures. It is noted that that both the heating of internal portion side surfaces 5478, and the subsequent cooling thereof, may be accompanied by applying force on the framing structure of the top current collector such as to press together adjacent framing structures in the stack, thereby improving the sealing.

Figure 23D:
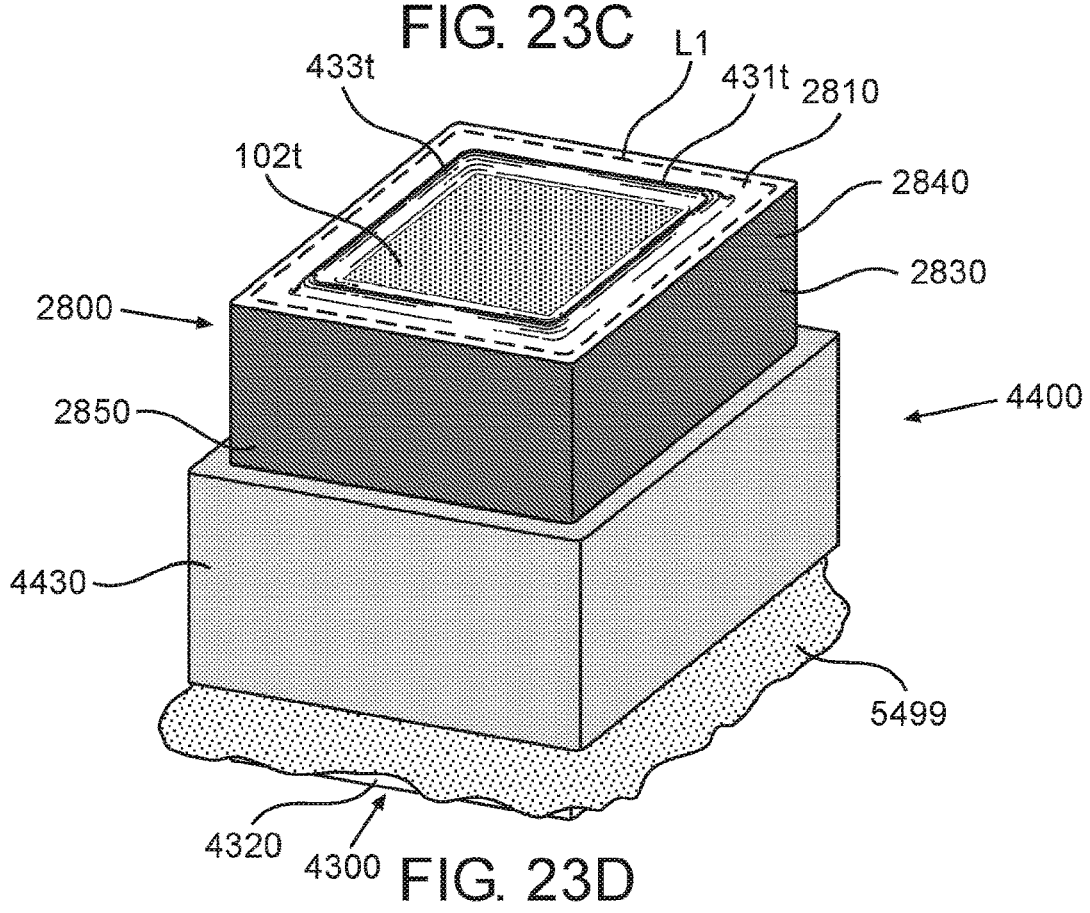

FIG. 23D depicts a stage in the fabrication of supercapacitor stack 2800 corresponding to the end of step 3040. Heating mold 4400 is in the third configuration, leaving supercapacitor stack 2800 to cool on base top surface 4310.

It is noted that, according to some embodiments, placement base 4300 and heating mold 4400 can also be used in the fabrication of supercapacitor stacks such as supercapacitor stacks 2000 and 2400, wherein the sealing is effected without cutting, e.g. only by heating.

According to some embodiments, not depicted in FIGS. 23A-23D, the sealing is achieved without cutting. In such embodiments, the pre-sealed supercapacitor stack has a perimeter substantially equal to, or smaller than, base top surface perimeter 4340 and substantially equal to mold inner perimeter 4460, such as to allow heating mold 4400 to be lowered on the pre-sealed stack with mold inner walls 4450 sliding against the sides of the pre-sealed stack. The sealing is effected via heat-fusion resulting from heat transferred to the pre-sealed stack from the heated mold inner walls.

The skilled person will appreciate that placement base 4300 and optionally heating mold 4400 may be adapted for use in the assembly of supercapacitor stacks from other types of self-aligning current collectors and matching separators, incorporating different geometrical features from geometrical features 431 and 1431, respectively, such as current collectors identical to current collector 600 and separators matching thereto, current collectors identical to current collector 700 and separators matching thereto, current collectors identical to current collector 800 and separators matching thereto, and current collectors identical to current collector 900 and separators matching thereto.

Figure 24A:
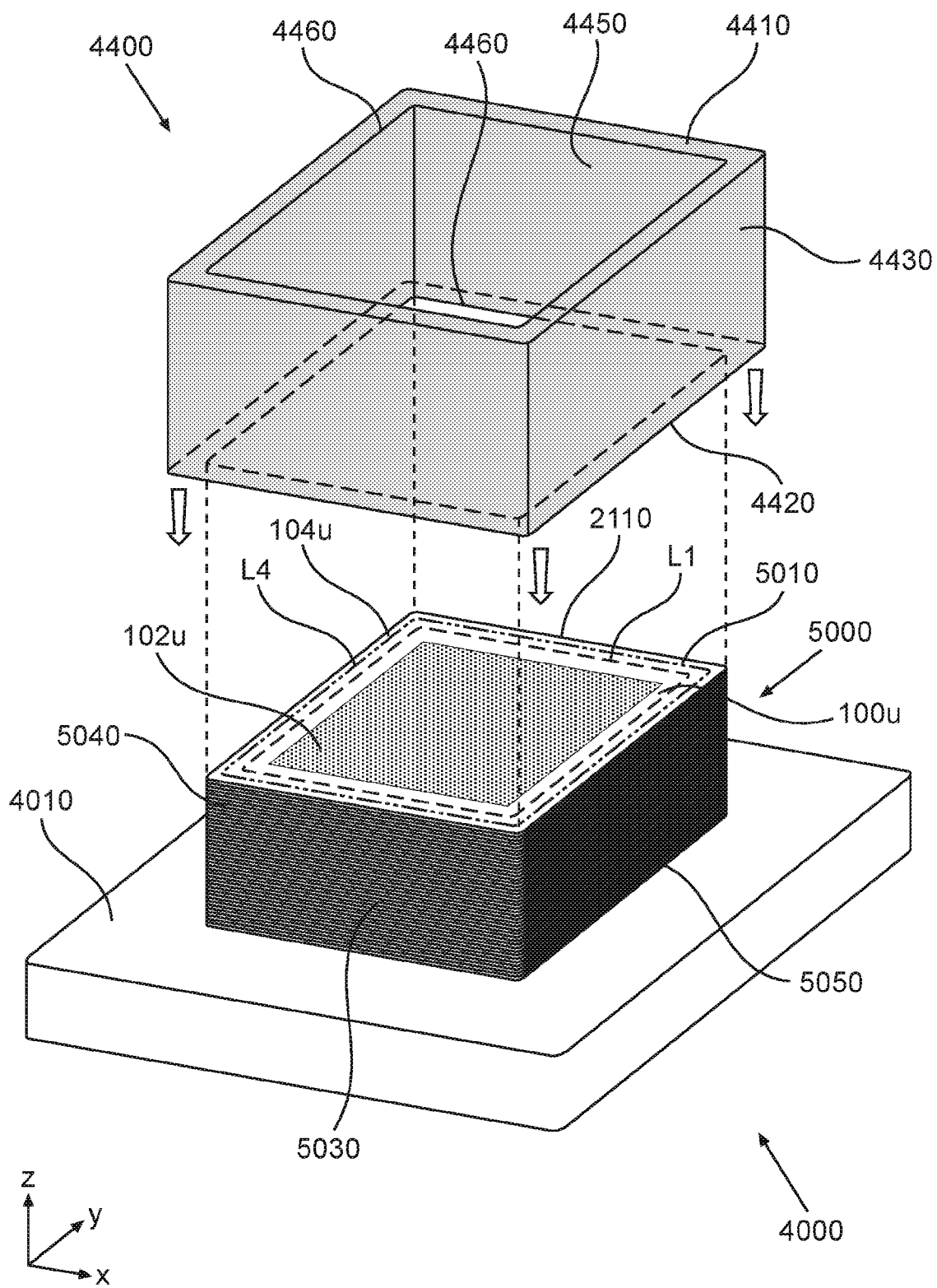
FIG. 24A-24B schematically depict successive stages in an implementation of a specific embodiment of the method of FIG. 17, wherein a pre-sealed flat supercapacitor stack is sealed, according to some embodiments.
Figure 24B:
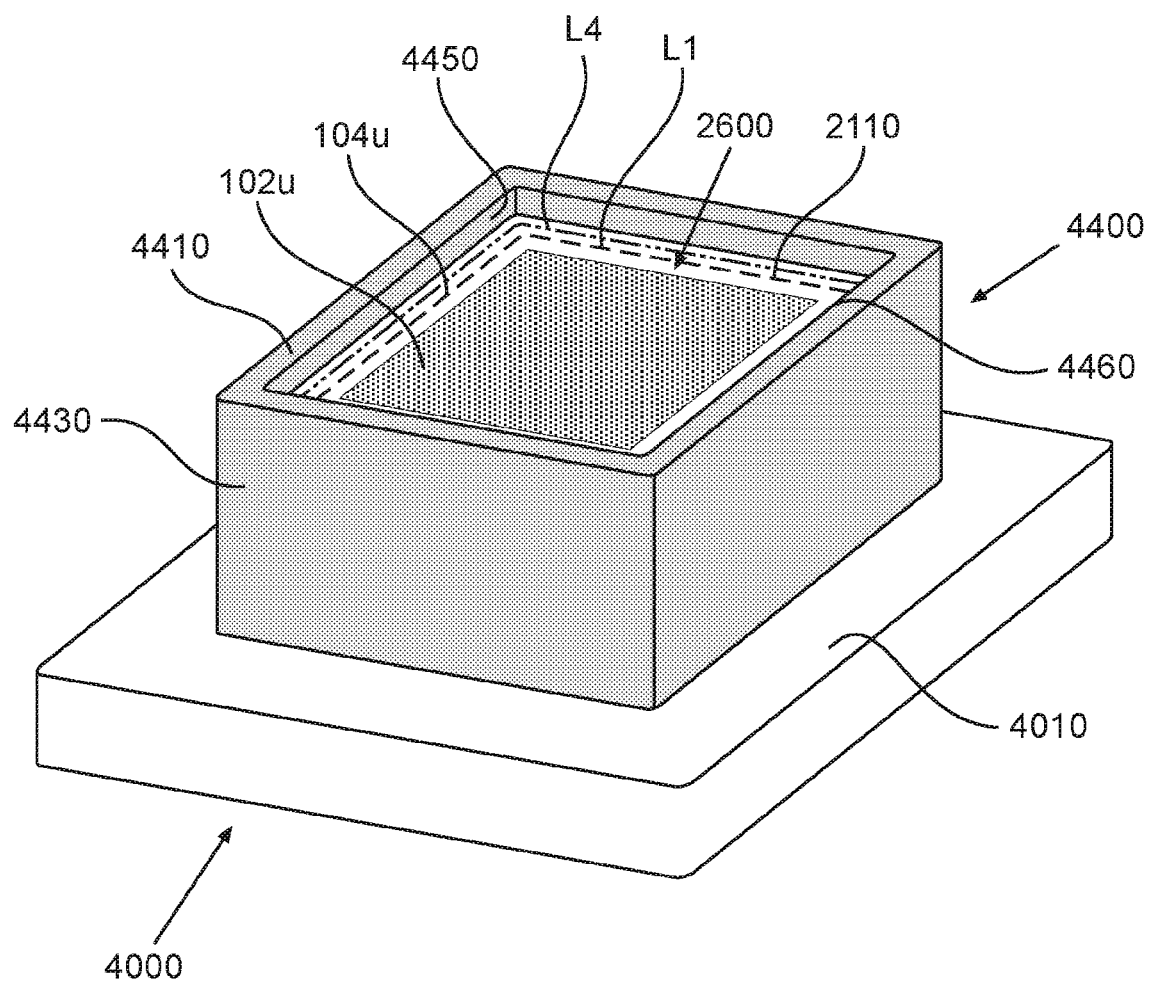

FIGS. 24A-24B schematically depict different stages in the fabrication of supercapacitor stack 2000 according to a specific embodiment of method 3000, which includes step 3040. In particular, different stages in the implementation of a specific embodiment of step 3040 are shown. It will be appreciated, however, that the means and techniques depicted in FIGS. 24A-24B, and described in the accompanying description, may also be used in the implementation of other methods, such as method 3100 (particularly, step 3140), method 3200 (particularly, step 3240), method 3300 (particularly, step 3340), and method 3400 (particularly, step 3440), and in the fabrication of other supercapacitor stacks, such as supercapacitor stack 2400.

FIG. 24A schematically depicts work platform 4000, pre-sealed supercapacitor stack 5000, and heating mold 4400 (prior to the beginning of step 3040), according to some embodiments. In the depicted embodiments, work platform 4000 is flat—and further configured for implementing step 3040—and mold bottom 4420 is not sharp. Pre-sealed stack 5000 is placed on platform top surface 4010, such as to be aligned with (and centered relative to) heating mold 4400. Heating mold 4400 is shown descending towards pre-sealed stack 5000.

The perimeter of pre-sealed stack 5000 (not indicated in FIG. 15B, but defined by outer perimeter 122 of the framing structure of current collector 100) and mold inner perimeter 4460 are of substantially equal dimensions, such as to allow heating mold 4400 to be lowered on pre-sealed stack 5000 with mold inner walls 4450 sliding along stack sides 5030.

Also indicated are a current collector 100u, which is the topmost current collector in pre-sealed stack 5000. (Current collector 100u is identical to current collector 100). Further indicated are a conductive sheet 102u of current collector 100u, and a framing structure 104u of current collector 100u.

FIG. 24B depicts a stage in the fabrication of supercapacitor stack 2000 corresponding to the middle of step 3040. Heating mold 4400 has been lowered on pre-sealed stack 5000, with mold bottom 4420 resting on platform top surface 4010. Stack sides 5030 are heated by mold inner walls 4450, and the sealing of stack sides 5030 is effected to obtain stack 2000.

Systems for Supercapacitor Stack Fabrication

Figure 25A:
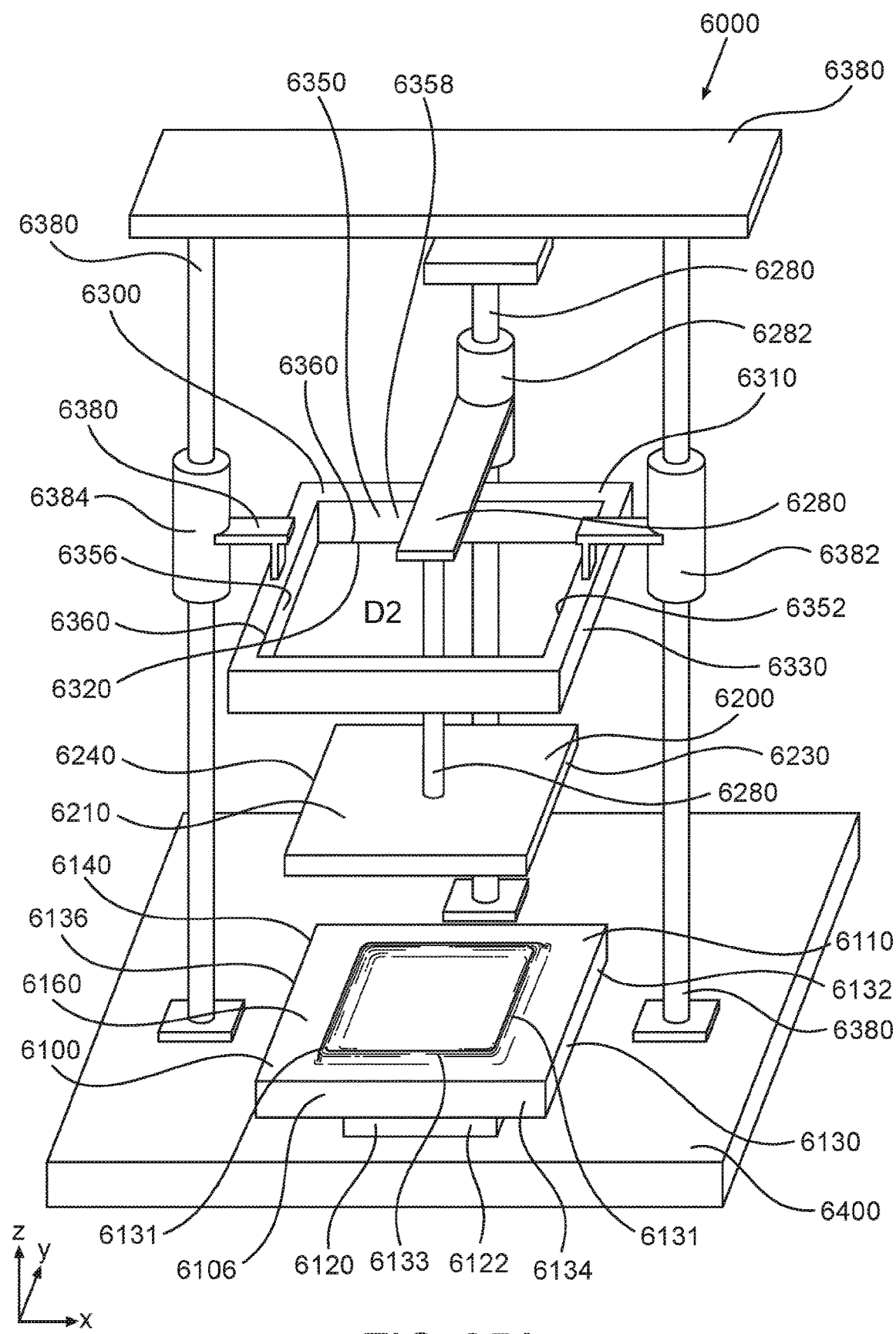
FIG. 25A schematically depicts a supercapacitor stack sealing system, according to some embodiments.
Figure 25B:
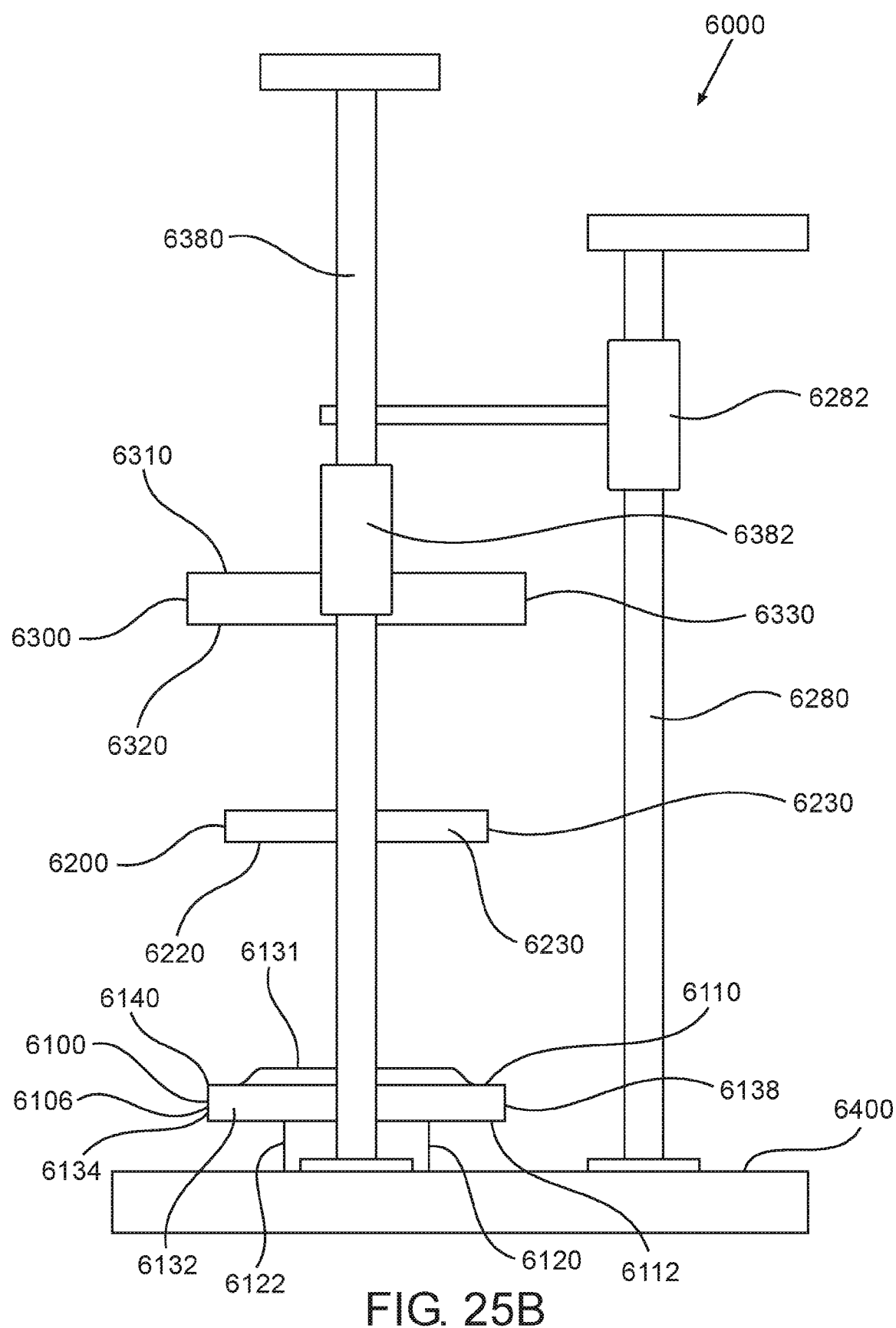
FIG. 25B presents a side-view of the sealing system of FIG. 25A, according to some embodiments.

FIGS. 25A-25B present a schematic isometric view and a schematic side view, respectively, of a supercapacitor stack sealing system 6000, according to some embodiments. In particular, sealing system 6000 is configured to implement a step such as step 3040 in method 3000, step 3140 in method 3100, step 3240 in in method 3200, step 3340 in method 3300, and step 3440 in method 3400. Sealing system 6000 includes a placement base 6100, a securing fixture 6200, and a heating mold 6300.

Placement base 6100 is configured to allow placing thereon a corresponding supercapacitor stack (e.g. pre-sealed supercapacitor stack 5000 or pre-sealed supercapacitor stack 5400), as elaborated on below. Placement base 6100 is a specific embodiment of placement base 4300 and includes a base top portion 6106, a base top surface 6110, a base bottom portion 6120, and base sidewalls 6130. According to some embodiments, base sidewalls 6130 include four sidewalls: a base first sidewall 6132, a base second sidewall 6134, a base third sidewall 6136, and a base fourth sidewall 6138 (indicated in FIG. 25B). Base third sidewall 6136 is located opposite base first sidewall 6132, and base fourth sidewall 6138 is located opposite base second sidewall 6134.

Base top surface 6110 defines there around a base top surface perimeter 6140. According to some embodiments, base top surface 6110 includes a base geometrical feature 6131, but otherwise defines a flat plane, which to facilitate the description is assumed to be parallel to the xy-plane. As elaborated on below, base geometrical feature 6131 may function as a jig or fixture for the placement thereon of a supercapacitor stack having a corresponding geometrical feature on the bottom thereof (e.g. an indentation, such as an indentation 435(1) in FIG. 26B, on the bottommost current collector in the stack). According to some embodiments, base geometrical feature 6131 forms a wave-like projection 6133 on base top surface 6110. Wave-like projection 6133 extends fully around base top surface 6110 near base top surface perimeter 6140, running parallel thereto. According to some embodiments, wave-like projection 6133 is surrounded by a base shelf-like segment 6160, which is flat. According to some embodiments (not depicted in FIGS. 25A-25B), base top surface 6110 is flat (e.g. in embodiments wherein sealing system 6000 is configured for sealing a flat (pre-sealed) supercapacitor stack, such as pre-sealed supercapacitor stack 5000).

According to some embodiments, base top surface perimeter 6140 is rectangular. According to some embodiments, base sidewalls 6130 are vertical. According to some embodiments (not depicted in FIGS. 25A-25B), base sidewalls 6130 are centrally inclined from base top surface perimeter 6140 (thereby defining cross-sections of increasingly smaller area). According to some embodiments (not depicted in FIGS. 25A-25B), base sidewalls 6130 constitute a single sidewall, e.g. in embodiments wherein base top surface perimeter 6140 is circular.

According to some embodiments, base bottom portion 6120 is in the form of a staging member 6122. Base top portion 6106 is mounted on staging member 6122. Staging member 6122 has smaller lateral dimensions than base top portion 6106. In particular, staging member 6122 lateral dimensions are smaller than base top surface perimeter 6140. In embodiments wherein a stack edge section is removed from a pre-sealed supercapacitor stack as part of the sealing process, staging member 6122 smaller lateral dimensions may provide space below a bottom surface 6112 (indicated in FIG. 25B) of base top portion 6106 for the accumulation of waste (e.g. waste 5499) resulting from the removal of the stack edge section (e.g. stack edge section 5460).

Securing fixture 6200 is configured to allow securing a corresponding supercapacitor stack onto placement base 6100, as elaborated on below. Securing fixture 6200 includes a fixture top 6210, a fixture bottom surface 6220 (indicated in FIG. 25B), and a fixture rim 6230.

Figure 26A:
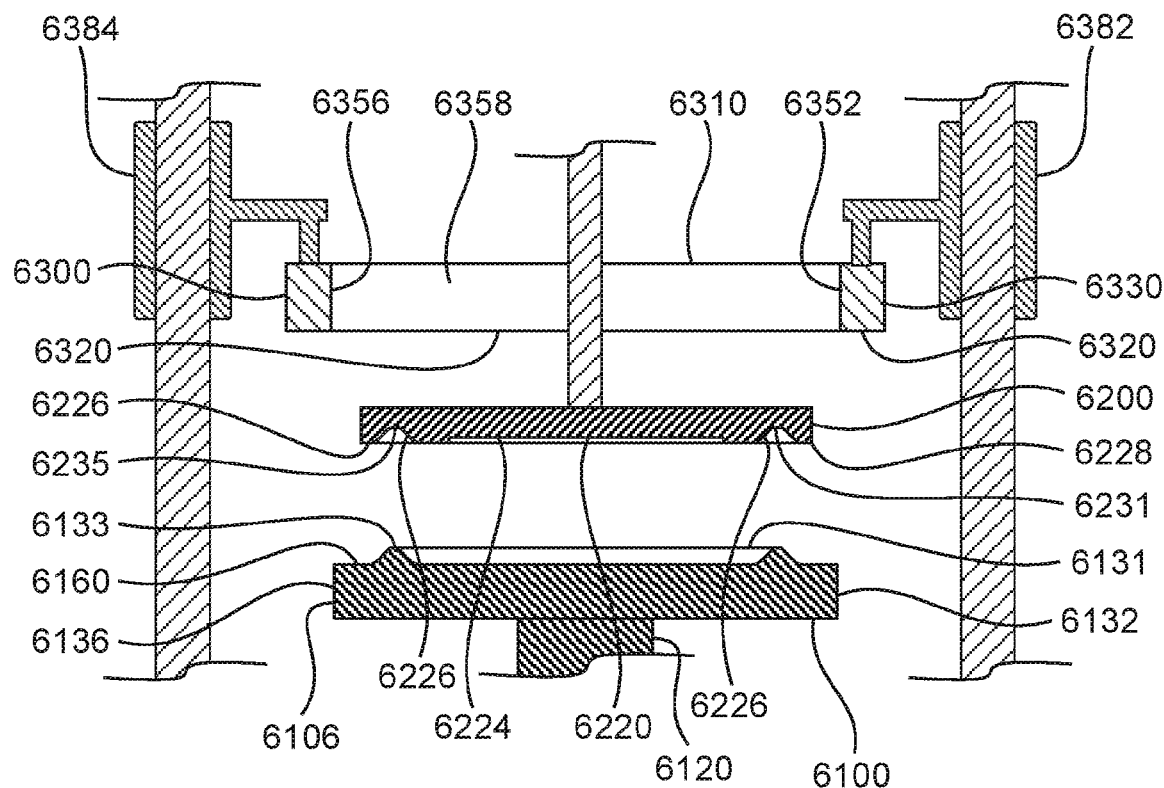
FIG. 26A-26E schematically depict successive stages in an implementation of a specific embodiment of the method of FIG. 17, wherein the supercapacitor stack of FIG. 16A is obtained from the pre-sealed supercapacitor stack of FIG. 16B, using the sealing system of FIGS. 25A-25B, according to some embodiments.

Fixture bottom surface 6220 includes a fixture central bottom surface 6224 and a fixture peripheral bottom surface 6226 (indicated in FIG. 26A). According to some embodiments, fixture central bottom surface 6224 and fixture peripheral bottom surface 6226 are complementary. According to some embodiments, as depicted in FIGS. 26A-26E, fixture central bottom surface 6224 is slightly depressed, e.g. relative to an outer edge 6228 (indicated in FIG. 26A) of fixture bottom surface 6220 (similarly to central surface 4124 in press bottom surface 4120). In such embodiments, similarly to press bottom surface 4120, fixture bottom surface 6220 is thereby configured for applying pressure on the framing structures of the current collectors and the separators of a supercapacitor stack (e.g. a pre-sealed supercapacitor stack) without applying (direct) pressure on the conductive sheets and insulating sheets thereof.

According to some embodiments, fixture bottom surface 6220 includes a fixture geometrical feature 6231 (shown in FIGS. 26A-26E). As elaborated on below, fixture geometrical feature 6231 may function as a jig or fixture for the securing onto base top surface 6110 of a supercapacitor stack having, on the top thereof, a geometrical feature corresponding (e.g. a geometrical feature, such as a wave-like projection 433t in FIG. 26C, on the topmost current collector in the stack) to fixture geometrical feature 6231. According to some embodiments, fixture geometrical feature 6231 forms a depression 6235 (shown in FIGS. 26A-26E) into fixture peripheral bottom surface 6226. Depression 6235 extends fully around fixture bottom surface 6220 near fixture rim 6230, running parallel thereto. Fixture central bottom surface 6224 is flat. According to some embodiments, depression 6235 is surrounded by a fixture shelf-like segment 6260.

According to some embodiments (not depicted in the figures), securing fixture 6200 is shaped as a thick frame. That is to say, securing fixture 6200 also includes a fixture inner rim.

According to some embodiments (not depicted in the figures), fixture peripheral bottom surface 6226 and fixture central bottom surface 6224 are flat (e.g. in embodiments wherein stack sealing system 6000 is configured for use with a flat supercapacitor stack).

A fixture rim perimeter 6240 (i.e. the perimeter defined by fixture rim 6230) may be identically proportioned to base top surface perimeter 6140, or may be smaller than base top surface perimeter 6140. According to some embodiments, as depicted in the figures, fixture rim 6230 is rectangular. According to some embodiments (not depicted in the figures), fixture rim 6230 may be circular.

Wave-like projection 6133 and depression 6235 generally define matching male-female features, being respectively configured for placing on placement base 6100, and securing thereto, a corresponding supercapacitor stack, such as pre-sealed supercapacitor stack 5400, as elaborated on below in the description of FIGS. 26A-26E.

According to some embodiments (not depicted in in the figures), base geometrical feature 6131 forms a depression into base top surface 6110 and fixture geometrical feature 6231 forms a matching projection (projecting in the downwards direction) from fixture peripheral bottom surface 6226. It is noted that such embodiments are also configured for the placement and securing thereon of a pre-sealed supercapacitor stack, such as pre-sealed supercapacitor stack 5400, by placing/assembling the stack thereon in an inverted manner.

Heating mold 6300 is a specific embodiment of heating mold 4400 and includes a mold top 6310, a mold bottom 6320, mold sidewalls 6330, and mold inner walls 6350, which define a mold inner space D2 open from above and from below. Mold inner walls 6350 are vertical and define a mold inner perimeter 6360 of substantially identical dimensions to base top surface perimeter 6140. Mold inner perimeter 6360 and base top surface perimeter 6140 substantially identical dimensions allow lowering heating mold 6300 over placement base 6100 such that mold inner walls 6350 nearly contact, or slide against, base top surface perimeter 6140 (and base sidewalls 6130 in embodiments wherein base sidewalls are vertical), as elaborated on below in the description of FIGS. 26A-26E. According to some embodiments, wherein base top surface perimeter 6140 is rectangular, mold inner walls 6350 include four walls: a first mold inner wall 6352, a second mold inner wall (not numbered, being hidden from view in FIGS. 25A-25B), a third mold inner wall 6356, opposite and parallel to first mold inner wall 6352, and a fourth mold inner wall 6358, opposite and parallel to the second mold inner wall.

According to some embodiments, as depicted in FIGS. 26A-26E, mold bottom 6320 is configured for cutting, essentially similarly to some of the embodiments of mold bottom 4420 of heating mold 4400, described above in the description of FIGS. 23A-23D.

Heating mold 6300 includes therein one or more heating elements (not shown), such as resistance-type heating elements or heating elements based on an inductive heating mechanism. According to some embodiments, the one or more heating elements are positioned within heating mold 6300 such as to allow uniformly heating mold inner walls 6350. According to some embodiments, the one more heating elements are positioned such as to allow heating (in a uniform manner) only a part of mold inner walls 6350, for example, from mold bottom 6320 half-way up to mold top 6310. According to some embodiments, the one or more heating elements may be positioned such as to allow additionally heating mold bottom 6320.

Securing fixture 6200 is mounted on a first driving assembly 6280. First driving assembly is configured to maneuver (e.g. vertically push and pull) securing fixture 6200 into a position above placement base 6100, such that fixture bottom surface 6220 faces base top surface 6110, and is aligned therewith (and centered relative thereto). In particular, as elaborated on below in the description of FIGS. 26A-26E, securing fixture 6200 may be used to secure a supercapacitor stack onto placement base 6100.

According to some embodiments, first driving assembly 6280 includes a first driving unit 6282, which is functionally associated with securing fixture 6200. According to some exemplary embodiments depicted in the figures, first driving assembly 6280 is pneumatically-operated, and first driving unit 6282 may be in the form of a pneumatic cylinder. First driving assembly 6280 may further include a vertical drive rail (not numbered), on which the pneumatic cylinder is mounted, a control valve (not shown), a cylinder extension, and a rod (both not numbered), connecting the cylinder extension to securing fixture 6200. First driving unit 6282 can be controllably provided with air pressure to cause the pneumatic cylinder to travel up and down along the vertical drive rail during use. First driving unit 6282 is fluidly associated with an external pneumatic air pressure source (not shown), with the control valve regulating the air pressure supply to the first driving unit 6282. Alternatively and/or additionally, other means may be used for maneuvering securing fixture 6200, such as a hydraulic driving assembly or an arrangement of electric/electromagnetic motors (e.g. servomotors, stepper motors).

First driving unit 6282 may be (e.g. pneumatically) driven to bring fixture bottom surface 6220 into contact with the top surface of a corresponding supercapacitor stack mounted on base top surface 6110 (such as pre-sealed supercapacitor stack 5400, or pre-sealed supercapacitor stack 5000 in embodiments wherein placement base 6100 and securing fixture 6200 do not include geometrical features 6131 and 6231, respectively), thereby securing the pre-sealed supercapacitor stack on base top surface 6110. First driving assembly 6280 may further be employed to cause securing fixture 6200 to apply pressure on a pre-sealed supercapacitor stack during the sealing thereof. The application of pressure may act to expel air and excesses of the aqueous electrolyte present within the pre-sealed supercapacitor stack.

Heating mold 6300 is mounted on a second driving assembly 6380. Second driving assembly 6380 is configured to vertically maneuver (e.g. vertically push and pull) heating mold 6300. In particular, heating mold 6300 is controllably switchable between three configurations: (i) a first configuration wherein heating mold 6300 is positioned above placement base 6100 (in particular, mold bottom 6320 is positioned above base top surface 6110); (ii) a second configuration wherein mold bottom 6320 is level with, or slightly below, base top surface perimeter 6140; and (iii) a third configuration wherein mold top 6310 is positioned below base top surface perimeter 6140.

According to some embodiments, second driving assembly 6380 includes a second driving unit 6382 and a third driving unit 6384, which are functionally associated with heating mold 6300. According to some exemplary embodiments depicted in the figures, second driving assembly 6380 is pneumatically-operated, and driving units 6382 and 6384 may each be in the form of a pneumatic cylinder. Second driving assembly 6380 may further include a pair of vertical drive rails (not numbered), on which the pneumatic cylinders are respectively moveably mounted, a control valve (not shown), and a pair of cylinder extensions (not numbered) connecting driving units 6382 and 6384 to heating mold 6300. Second driving unit 6382 and third driving unit 6384 can be controllably provided with air pressure to cause the pneumatic cylinders to travel up and down along the respective vertical drive rails during use. Second driving unit 6382 and third driving unit 6384 are fluidly associated with an external pneumatic air pressure source (not shown, e.g. the same air pressure source first driving unit 6282 is fluidly associated with), with the control valve regulating the air pressure supplies to second driving unit 6382 and third driving unit 6384, respectively. Alternatively and/or additionally, other means may be used for maneuvering heating mold 6300, such as a hydraulic driving assembly or an arrangement of electric/electromagnetic motors (e.g. servomotors, stepper motors).

Driving units 6382 and 6384 may be (e.g. pneumatically) driven to bring heating mold 6300 from any one of the above-listed configurations onto any other one.

According to some embodiments, sealing system further includes a platform 6400. Platform 6400 may be generally shaped as a flat slab. According to some embodiments, platform 6400 is made of a metal or is coated by a metal. Placement base 6100 is mounted on platform 6400. First driving assembly 6280 and second driving assembly 6380 are also mounted on platform 6400.

Figure 26B:
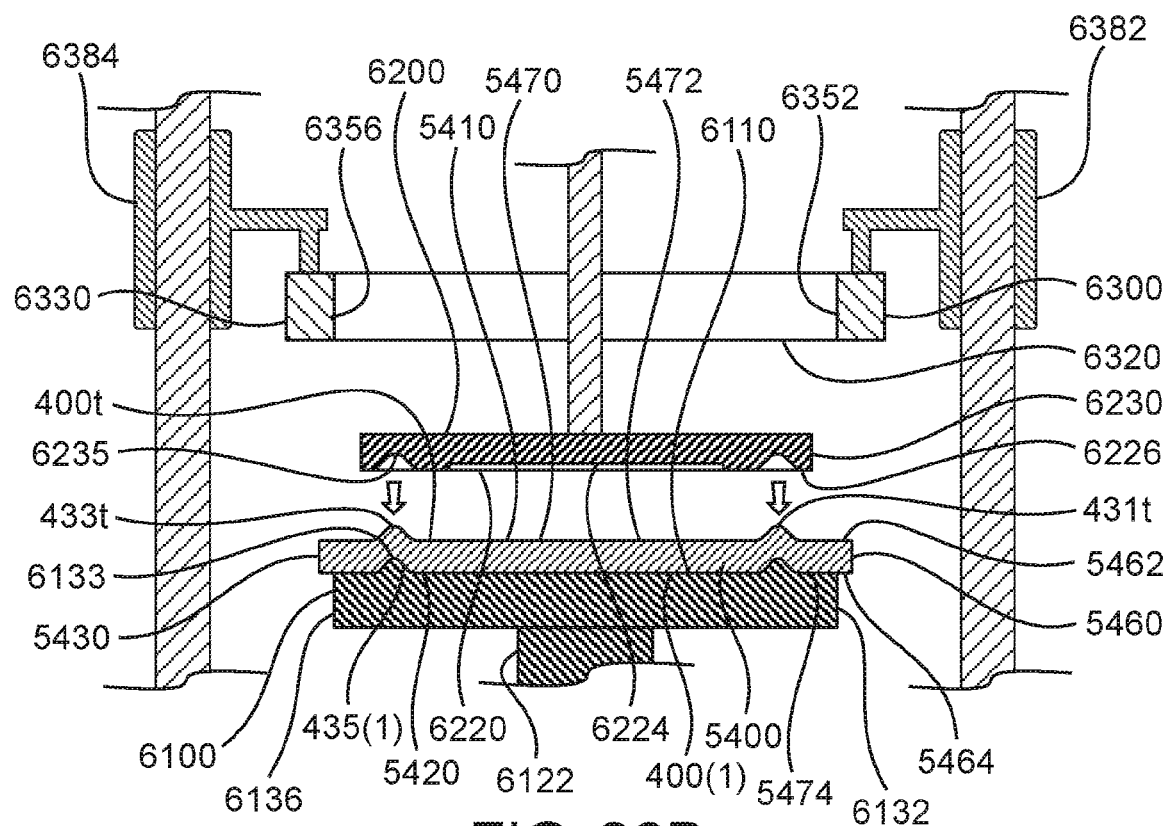
Figure 26C:
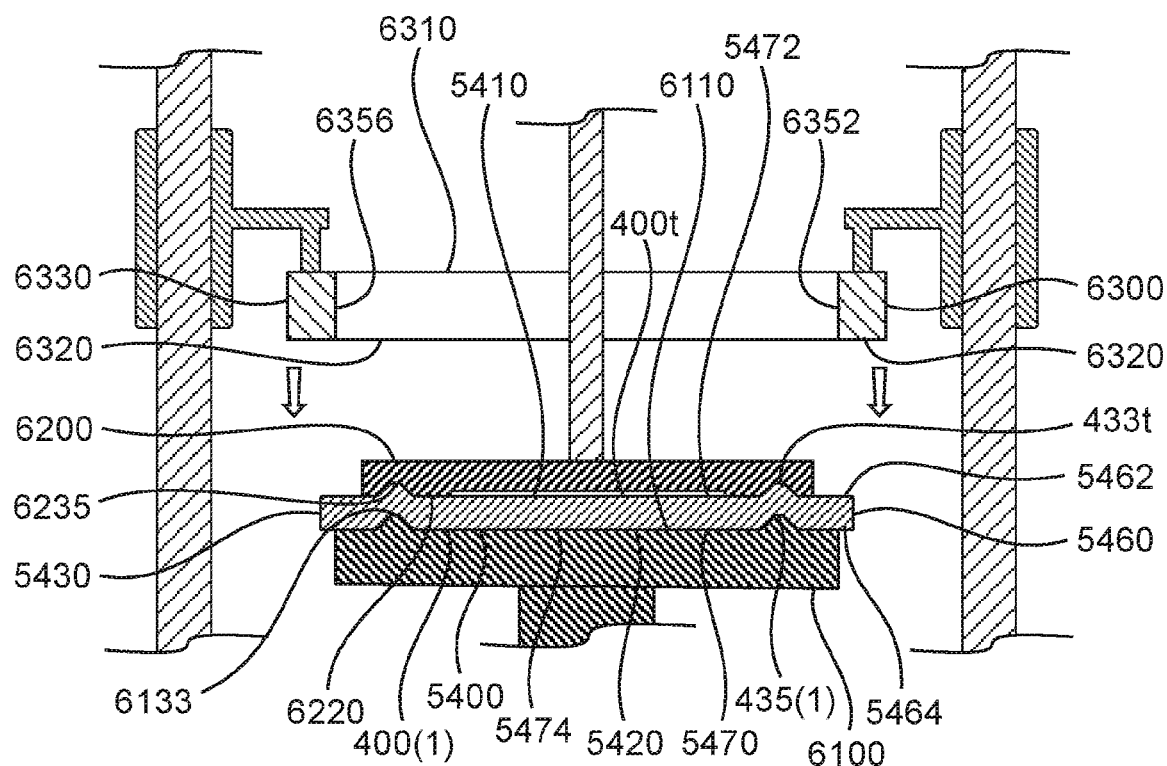
Figure 26D:
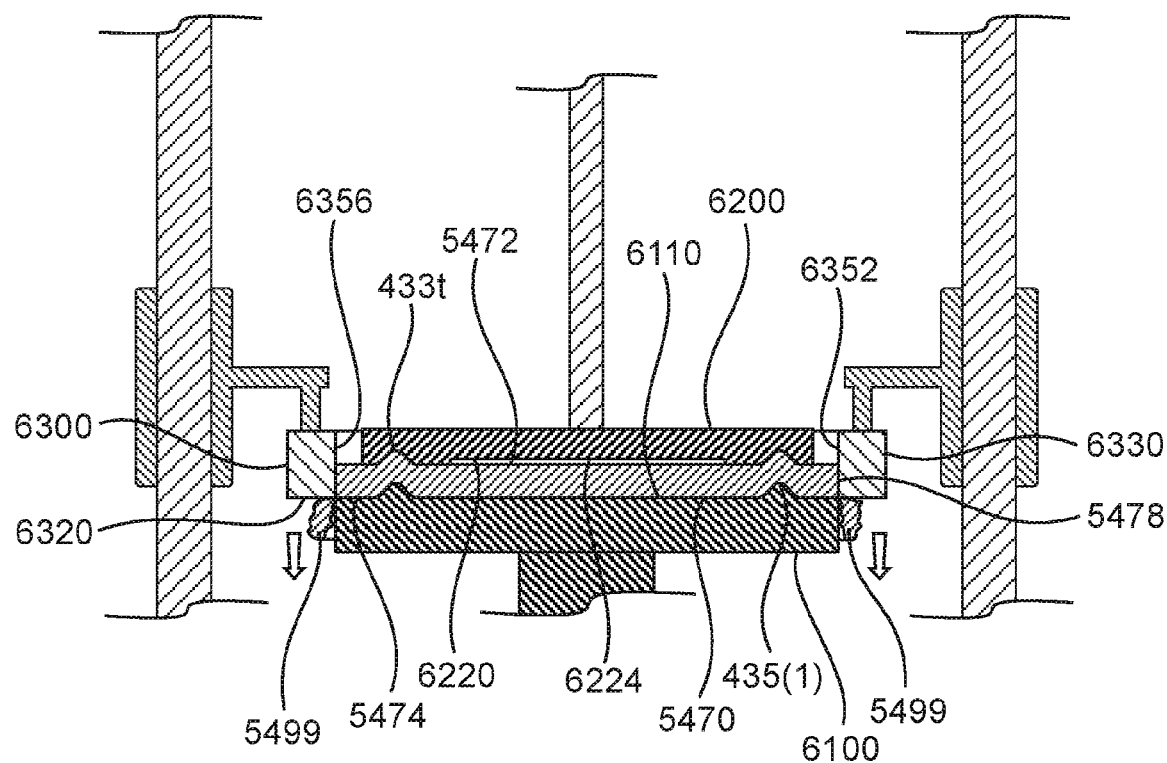
Figure 26E:
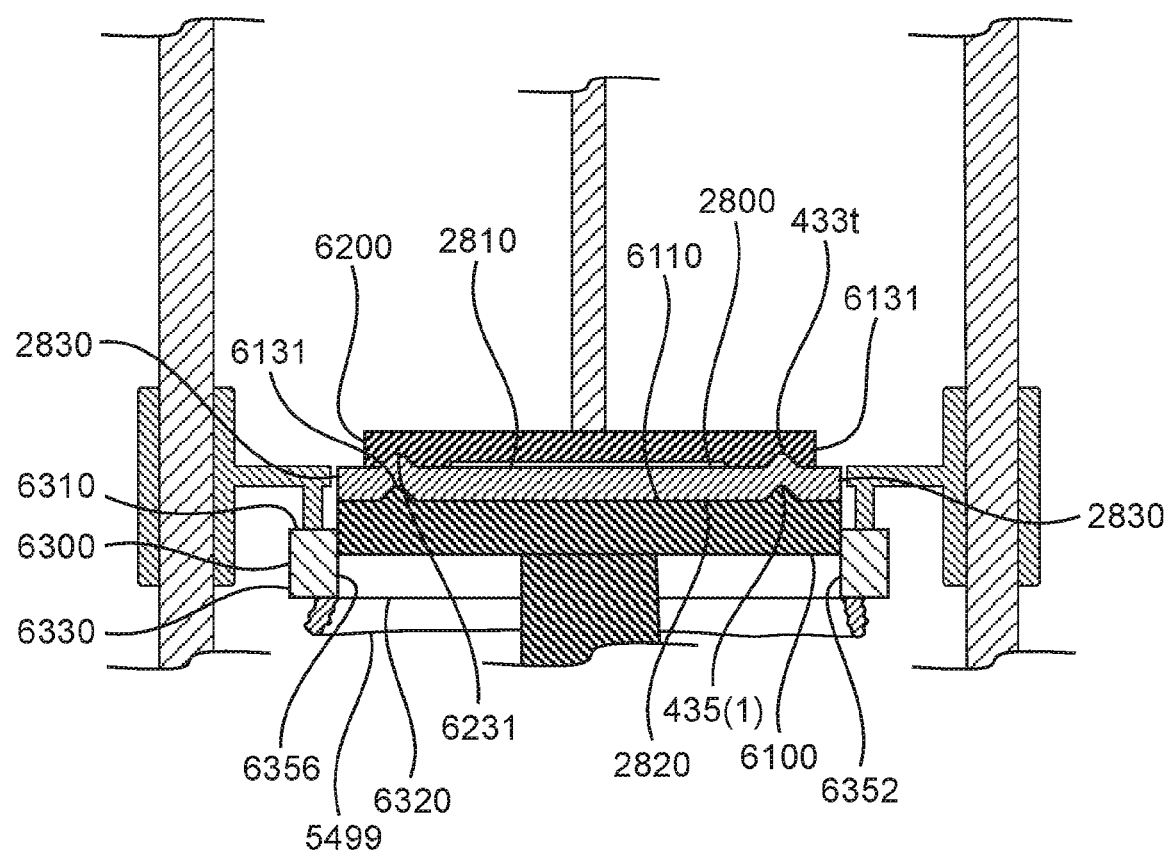

FIGS. 26A-26E present a series of successive cross-sectional views, taken a long a plane parallel to the zx-plane, of sealing system 6000, pre-sealed supercapacitor stack 5400 (in FIGS. 26B-26D), and supercapacitor stack 2800 (in FIG. 26E). The cross-sectional views depict different stages in a sealing procedure, whereby supercapacitor stack 2800 is obtained from pre-sealed supercapacitor stack 5400.

FIG. 26A depicts sealing system 6000 prior to the placement thereon of pre-sealed supercapacitor stack 5400 (e.g. prior to the beginning of step 3040 in method 3000). Both securing fixture 6200 and heating mold 6300 are positioned above base top surface 6110, such that the distance between base top surface 6110 and fixture bottom surface 6220 and the distance between base top surface 6110 and mold bottom 6320 allow for the placing of pre-sealed stack 5400 on placement base 6100. Heating mold 6300 is in the first configuration.

FIG. 26B depicts sealing system 6000 with pre-sealed stack 5400 placed thereon on base top surface 6110, such as to be aligned therewith (and centered relative thereto). Pre-sealed stack 5400 has slightly larger lateral dimensions than base top surface perimeter 6140. The perimeter (not numbered in FIGS. 26B-26C; indicated by dashed-double dotted line L4 in FIG. 16B) of stack internal portion 5470 and base top surface perimeter 6140 are of substantially equal dimensions. As pre-sealed supercapacitor stack 5400 is aligned with base top surface 6110 (and therefore laterally centered relative thereto), substantially the whole of stack edge section 5460 laterally protrudes from base top surface 6110. Securing fixture 6200 is shown descending towards stack top surface 5410. Heating mold 6300 is in the first configuration. Also indicated are current collector 400(1), which is the bottommost current collector in pre-sealed stack 5400, and top current collector 400t, which is the topmost current collector in pre-sealed stack 5400. Further indicated are an indentation 435(1) on the bottom side of the framing structure of first current collector 400(1), and wave-like projection 433t on the top side of the framing structure of the top current collector 400t. (Indentation 435(1) is identical to indentation 435 and wave-like projection 433t is identical to wave-like projection 433.) FIG. 26C depicts sealing system 6000 with pre-sealed stack 5400 secured thereon between base top surface 6110 and fixture bottom surface 6220. Securing fixture 6200 has finished descending and fixture bottom surface 6220 contacts/presses stack top 5410 such as to secure pre-sealed stack 5400 onto placement base 6100 (and, according to some embodiments, to additionally remove air and electrolyte from within pre-sealed stack 5400). In particular, indentation 435(1) is pressed against wave-like projection 6133, and depression 6235 is pressed against wave-like projection 433t. Heating mold 6300 is shown transitioning from the first configuration to the second configuration, that is to say, descending towards pre-sealed stack 5400.

In FIG. 26D, heating mold 6300 is in the second configuration. Stack edge section 5460 has been cut off, being transformed into waste 5499 in the process. Mold inner walls 6350 (which are heated) transfer heat to internal portion side surfaces 5478, thereby effecting the sealing thereof to obtain supercapacitor stack 2800, essentially as described above in the description of FIG. 23C.

It is noted that during the cutting off of stack edge section 5460, securing fixture 6200 may act to secure/stabilize pre-sealed supercapacitor stack 5400/stack internal portion 5470 on base top surface 6110.

FIG. 26E depicts sealing system 6000 with supercapacitor stack 2800 secured thereon between base top surface 6110 and fixture bottom surface 6220. Heating mold 6300 is in the third configuration, thereby allowing supercapacitor stack 2800 to cool prior to being removed from placement base 6100.

It is noted that sealing system 6000 can also be used in the fabrication supercapacitor stacks such as supercapacitor stacks 2000 and 2400, wherein the sealing is effected without cutting, e.g. only by heating. In such embodiments, the pre-sealed supercapacitor stack (e.g. pre-sealed supercapacitor stack 5000 or pre-sealed supercapacitor stack 5400) has a perimeter substantially equal to, or smaller than, base top surface perimeter 6140 and substantially equal to mold inner perimeter 6360, such as to allow heating mold 6300 to be lowered on the pre-sealed stack with mold inner walls 6350 sliding against the sides of the pre-sealed stack. The sealing is effected via heat-fusion resulting from heat transferred to the pre-sealed stack sides from the heated mold inner walls. In such embodiments, mold bottom 6320 need not be configured for cutting, and is preferably blunt.

The skilled person will appreciate that placement base 6100, securing fixture 6200, and optionally heating mold 6300 may be adapted for use in the assembly of supercapacitor stacks from other types of self-aligning current collectors and matching separators, incorporating different geometrical features from geometrical features 431 and 1431, respectively, such as current collectors identical to current collector 600 and separators matching thereto, current collectors identical to current collector 700 and separators matching thereto, current collectors identical to current collector 800 and separators matching thereto, and current collectors identical to current collector 900 and separators matching thereto.

Additional Exemplary Embodiments

According to some exemplary embodiments, there is provided a framed current collector, such as current collector 100 or current collector 400. The width of the framing structure (e.g. framing structure 404) of the current collector is approximately 11.5 mm and the width of the rim portion thereof (e.g. rim portion 430) is between approximately 0.5 mm to about 1.5 mm. The framing structure is made of PVC, and the conductive sheet (e.g. conductive sheet 102) of the framing structure is made of PVC embedded with carbon particles. The conductive sheet is heat-fused onto the framing structure, such as to cover no more than about 75% of the width of the framing structure. In further embodiments, the conductive sheet covers no more than about 70% of the width of the framing structure, no more than about 65%, no more than about 60%, no more than about 55%, or no mora than about 50% of the width of the framing structure. Each possibility represents a separate embodiment of the invention. That is to say, the distance between the outer perimeter (e.g. outer perimeter 122) of the framing structure and the edge (e.g. edge 118) of the conductive sheet is at least approximately 2.9 mm in order to prevent heat-fusion of e.g. conductive sheets from adjacent units during a side-welding sealing process of a pre-sealed supercapacitor stack (e.g. pre-sealed supercapacitor stack 5400), involving the removal of the stack edge section thereof (e.g. stack edge section 5460), as described above in the description of FIGS. 23A-23D and FIGS. 25A-26E. It is noted that conductive sheet material located 1.5 mm or less from the inner border (indicated by dashed-double dotted line L4, e.g. in FIG. 16B) of the rim portion (that is to say, conductive sheet material which is located about 3 mm or less from the outer perimeter of the pre-sealed stack), during the above-mentioned side-welding sealing process, may smear on the externalized side surfaces (e.g. internal portion side surfaces 5478) of the stack, potentially leading to inter-unit short-circuits. According to some embodiments, the width of the inner perimetral portion (e.g. inner perimetral portion 428) of the framing structure, that is to say, the width of the portion of the framing structure onto which the conductive sheet is heat-fused, is about 5 mm. The duration of the heat-fusing generally depends on e.g. the thickness of the framing structures, whether the framing structure includes one dielectric frame (e.g. dielectric frame 511) or a pair of dielectric frames (e.g. first dielectric frame 411 and second dielectric frame 413). The heat-fusing of the conductive sheet onto the framing structure is effected at a temperature of 160°+10°, depending on the type of PVC the framing structure is made of.

According to some such exemplary embodiments, there is provided a framed separator, such as separator 1000 or separator 1400. The width of the framing structure (e.g. framing structure 1404) of the separator is approximately 11.5 mm and the width of the rim portion thereof (e.g. rim portion 1430) is between approximately 0.5 mm to about 1.5 mm. The framing structure is made of PVC, and the insulating sheet (e.g. insulating sheet 1002) of the framing structure is made of e.g. a porous cellulose-based material or ethyl vinyl alcohol (EVOH)-coated polyethylene. The insulating sheet is heat-fused onto the framing structure, such as to cover no more than about 60% of the width of the framing structure. In further embodiments, the insulation sheet covers no more than about 55% of the width of the framing structure, no more than about 50%, no more than about 45%, no more than about 40%, or no more than about 35% of the width of the framing structure. Each possibility represents a separate embodiment of the invention. That is to say, the distance between the outer perimeter (e.g. outer perimeter 1422) of the framing structure and the edge (e.g. edge 1018) of the insulating sheet is at least approximately 4.6 mm in order to prevent leakage of electrolyte resulting from overheating of the insulating sheet during a side-welding sealing process of a pre-sealed supercapacitor stack (e.g. pre-sealed supercapacitor stack 5400), involving the removal of the stack edge section thereof (e.g. stack edge section 5460), as described above in the description of FIGS. 23A-23D and FIGS. 25A-26E. It is noted that insulating sheet material, located about 1.5 mm or less from the inner border (indicated by dashed-double dotted line M4) of the rim portion (that is to say, insulating sheet material which is located about 3 mm or less from the outer perimeter of the pre-sealed stack), during the above-mentioned side-welding sealing process, may result in leakage of electrolyte onto the externalized side surfaces (e.g. internal portion side surfaces 5478) of the stack, potentially leading to inter-unit short-circuits. According to some embodiments, the width of the inner perimetral portion (e.g. inner perimetral portion 1428) of the framing structure, that is to say, the width of the portion of the framing structure onto which the insulating sheet is heat-fused, is between about 4 mm to about 5 mm. The duration of the heat-fusing generally depends on e.g. the thickness of the framing structures, whether the framing structure includes one dielectric frame or a pair of dielectric frames (e.g. first dielectric frame 1411 and second dielectric frame 1413). The heat-fusion of the insulating sheet onto the framing structure is effected at a temperature of 175°±10°, depending on the type of PVC the framing structure is made of.

According to some such exemplary embodiments, a pre-sealed supercapacitor stack (e.g. pre-sealed supercapacitor stack 5400) is assembled, and an initial attachment between adjacent framed structural strata thereof is effected, as follows:

1. Preparation of layers of a first type. Each layer is prepared by pasting or printing a first type of electrode (e.g. first electrode 1110), made of activated carbon paste, on the conductive sheet of a current collector, such as the current collector described in this subsection above.
2. Preparation of layers of a second type. Each layer is prepared by pasting or printing a second type of electrode (e.g. second electrode 1120), made mainly of a transitional metal (e.g. $MnO_2$) paste, on the insulating sheet of a separator, such as the separator described in this subsection above.
3. Placing in a vacuum chamber of a heat-pressing machine (e.g. a machine including work platform 4000 and press 4100 described in the description of FIGS. 22A-22H), in a layered manner, a layer of the first type, a layer of the second type, and another layer of the first type, such as to be mutually aligned.
4. Applying a vacuum (to the vacuum chamber)—thereby removing air from between the layers—and heat-fusing the layers onto one another (that is to say, heat-fusing the framing structures thereof onto one another). The heat-fusion is performed at a temperature of 140° 0 10° (so that adjacent framing structures are thermoformed).
5. Placing on the hitherto heat-fused layers, in a layered manner, a layer of the second type and a layer of the first type and repeating step 4.
6. Repeating step 5 until the pre-sealed stack is fully assembled.

The duration of the heat-fusion of each three layers is dependent on the thickness of the framing structures. It is noted that during the heat-fusion the second electrode is not exposed (i.e. does not come into contact with the heat-press machine), thereby preventing the transitional metal paste from being contaminated by the activated carbon paste and vice-versa. The number of cells or units in the stack is dependent on the desired voltage to be applied to, or applied by, the supercapacitor stack.

According to some such exemplary embodiments, the pre-sealed supercapacitor stack is sealed as follows:

I. Following the assembly thereof, e.g. as described in this subsection above, the pre-sealed stack is placed in a side-welding machine (e.g. sealing system 6000, described in the description of FIGS. 25A-26E).
II. The pre-sealed stack is secured between a placement base (e.g. placement base 6100) and a securing fixture (e.g. securing fixture 6200) at a minimum pressure, e.g. of about 2 atm when the width of the (pre-cut) current collectors is about 11.5 mm. The top surface (e.g. base top surface 6110) of the placement base is heated to a temperature of about 120° at the region whereat the top surface contacts the bottom side of the framing structure of the bottom current collector in the stack (e.g. current collector 400(1)). The bottom surface (e.g. fixture bottom surface 6220) of the securing fixture is heated to a temperature of about 120° at the region whereat the bottom surface (e.g. fixture peripheral bottom surface 6226) contacts the top side of the framing structure of the top current collector in the stack (e.g. current collector 400*t*).
III. A heating mold (e.g. heating mold 6300), aligned with the pre-sealed stack, is lowered thereon. An inner section of the inner walls (e.g. mold inner walls 6350) of the heating mold laterally overlaps with the stack edge section (e.g. mold inner perimeter 6360 is of substantially equal dimensions to the inner border of the rim portion of the framing structures of the current collectors and separators, indicated by dashed-double dotted lines L4 and M4, respectively). The mold inner walls are heated to a temperature of 225°±10°. The lowering of the heating mold peels off a stack edge section (e.g. stack edge section 5460), for example, cutting off the pre-sealed stack at a depth of between approximately 0.5 mm to about 1.5 mm.
IV. The heating mold is lowered until the side surfaces (e.g. internal portion side surfaces 5478) of the cut stack (e.g. stack internal portion 5470) are fully in contact with the mold inner walls. The time of the lowering of the heating mold (i.e. the time duration of the cutting) may vary from about 2 minutes to about 8 minutes, depending on the amount of control afforded by the driving mechanism used. The heating mold then remains stationary for between about 1.5 minutes to about 2 minutes, as heat is conducted from the mold inner walls to the cut stack, thereby completing the sealing of the side surfaces thereof, as the framing structures of adjacent structural strata are heat-fused onto one another. The resulting depth of the heat-fusion is 4.5 mm+1 mm.
V. After about 1.5 minutes of the heating described in step IV, the pressure applied on the stack is increased for about 30 seconds to about 40 seconds in order to compress the cut stack and help uniformize the heat-fusing, thereby improving the sealing of the stack.
VI. The stack is then released and placed on a flat platform to cool. It is noted that the temperature of the mold inner walls and the time of heating (including the time of cutting) should be such that the temperature at the immediate vicinity of the inner perimeters (e.g. inner perimeter 424) of the framing structures does not exceed approximately 70° in order to prevent damage to the conductive sheets and the insulating sheets at this region (i.e. the vicinity of the inner perimeters) and in order not to heat the electrodes, which could lead to undesirable discharge of gases.

According to some such exemplary embodiments, the pre-sealed stack is sealed without initially attaching the framing structures of the current collectors and the separators (as described in this subsection above in the description of the assembly of the pre-sealed stack). The assembly of the pre-sealed stack and the sealing thereof are as implemented as follows:

A. Placing in a vacuum chamber of a side-welding machine, in an alternating layered manner, a layer of the first type followed by a layer of the second type, until n+1 layers of the first type have been laid and n layers of the second type have been laid (such that both the bottom layer and the top layer are of the first type). The side-welding machine is substantially the side-welding machine described in this subsection above with the addition of a vacuum chamber.
B. Applying a vacuum until an ambient pressure of about 0.3 bar to about 0.8 bar is reached (in the vacuum chamber).
C. Exerting a minimum pressure on the assembled stack and heating the framing structure at the top side thereof and the framing structure at the bottom side thereof, essentially as described in this subsection above in step II.

D. Implementing the sealing of the assembled stack, essentially as described in this subsection above in steps III-VI.

As used herein, according to some embodiments, "to effect", "to perform", "to implement", and "to carry out" are used interchangeably.

It is appreciated by persons skilled in the art that the present invention is not limited by what has been particularly shown and described hereinabove. Rather the scope of the present invention includes both combinations and subcombinations of various features described hereinabove as well as variations and modifications. Therefore, the invention is not to be constructed as restricted to the particularly described embodiments, and the scope and concept of the invention will be more readily understood by references to the claims, which follow.

The invention claimed is:

1. A process for fabricating an n-cell supercapacitor stack, comprising:
  a step of providing
    at least n+1 identical, or substantially identical, electrically inert conductive sheets having a defined perimeter;
    n identical, or substantially identical, ion-permeable insulating sheets having a defined perimeter;
    n identical, or substantially identical, first electrodes having a defined perimeter;
    n identical, or substantially identical, second electrodes having a defined perimeter; and
    at least n matching dielectric frames, each having an inner perimeter, which is smaller than the perimeter of the conductive sheet, and/or the perimeter of the insulating sheet, and which is larger than the perimeter of the first electrode and the perimeter of the second electrode, each of the dielectric frames further having an outer perimeter, which is larger than the perimeter of the conductive sheet and the perimeter of the insulating sheet;
  a step of assembling the supercapacitor stack, comprising:
    assembling n units each on top of the other, wherein each unit comprises a conductive sheet, a first electrode, an insulating sheet, a second electrode, and at least one frame, wherein the first electrode is disposed between and aligned with the conductive sheet and the insulating sheet and the second electrode is disposed between and aligned with the insulating sheet and a conductive sheet of the adjacent unit, and wherein the at least one frame extends beyond the edge of the conductive sheet throughout the entire perimeter of the conductive sheet;
    disposing an additional conductive sheet on top of the nth second electrode; and
  a step of attaching adjacent units onto one another, such that at least one of the frames within each unit is attached to at least one of the frames within each respective unit adjacent thereto,
  wherein n is an integer from 1 to 100.

2. The process of claim 1, wherein the outer perimeter of the dielectric frame is larger than the perimeter of the conductive sheet by at least about 25% or wherein a width of the portion of the dielectric frame which extends beyond the edge of the conductive sheet constitutes at least about 12.5% of the total width of the dielectric frame.

3. The process of claim 1, wherein each of the dielectric frames comprises an identical, or substantially identical, geometrical feature rendering the dielectric frames mutually self-aligning.

4. The process of claim 3, wherein the geometrical feature is in the form of a wave-like projection extending fully there around the dielectric frame.

5. The process of claim 1, wherein the at least one frame is disposed between the conductive sheet and the insulating sheet or between the insulating sheet and the conductive sheet of the adjacent unit.

6. The process of claim 5, wherein additional n−1 conductive sheets are provided, and wherein each unit comprises one of the additional conductive sheets disposed above the second electrode thereof, thereby rendering the unit into a supercapacitor cell, and thereby fabricating the n-cell supercapacitor stack in a distinct-cell configuration, wherein n is an integer from 1 to 100.

7. The process of claim 1, wherein the conductive sheet and the dielectric frame within each unit are provided attached onto one another in the form of a framed current collector with an externally extending framing structure.

8. The process of claim 7, wherein the top conductive sheet, disposed on top of nth insulating sheet, is provided together with one or two dielectric frames, in the form of a framed current collector with an externally extending framing structure;
  wherein additional n−1 framed current collectors each with an externally extending framing structure are provided; and
  wherein each of the first n−1 units further comprises a respective one of the additional framed current collectors on a top thereof; and
  wherein said step of attaching further comprises attaching the framing structure of the top framed current collector within a unit to the dielectric frame adjacent thereto from below, thereby rendering the unit into a supercapacitor cell, and thereby fabricating the n-cell supercapacitor stack in a distinct-cell configuration, wherein n is an integer from 1 to 100 and n in nth is an integer from 1 to 100.

9. The process of claim 8, comprising disposing filling material on the top conductive sheet in the cell prior to the attachment of the top dielectric frame in a cell to the bottom dielectric frame in a cell adjacent from above.

10. The process of claim 1, wherein at least some of the units comprise two dielectric frames, comprising a first frame and a second frame, wherein the first frame is disposed below the conductive sheet of the unit, and the second frame is disposed between the conductive sheet and the insulating sheet of the unit, and wherein said step of attaching further comprises attaching the first frame to the second frame.

11. The process of claim 1, wherein at least some of the units comprise three dielectric frames, comprising a first frame, a second frame, and a third frame;
  wherein the first frame is disposed below the conductive sheet of the unit, the second frame is disposed between the conductive sheet and the insulating sheet of the unit, and the third frame is disposed above the insulating sheet of the unit, or wherein the first frame is disposed below the conductive sheet of the unit, and the second frame and the third frame are disposed between the insulating sheet and the conductive sheet of the unit; and
  wherein said step of attaching further comprises attaching the first frame to the second frame and the second frame to the third frame.

12. The process of claim 1, wherein at least some of the units comprise four dielectric frames, comprising a first frame, a second frame, a third frame, and a fourth frame;

wherein the first frame is disposed below the conductive sheet of the unit, the second frame and the third frame are disposed between the conductive sheet and the insulating sheet of the unit, and the fourth frame is disposed above the insulating sheet of the unit; and wherein said step of attaching further comprises attaching the first frame to the second frame, the second frame to the third frame, and the third frame to the fourth frame.

13. The process of claim 1, wherein said step of assembling precedes said step of attaching or wherein said step of assembling is effected simultaneously with at a least a part of said step of attaching.

14. The process of claim 13, wherein said step of attaching comprises two substeps:
- a first substep, effected simultaneously with said step of assembling, wherein an initial attachment is formed; and
- a second substep, wherein the initial attachment is strengthened.

15. The process of claim 14, wherein said forming of the initial attachment establishes a physical connection between the dielectric frames thereby attached, and wherein said strengthening of the attachment establishes a chemical connection between the dielectric frames thereby attached and wherein said forming of the initial attachment is effected by heat-pressing and said strengthening of the attachment is effected by heat-fusing adjacent dielectric frames onto one another.

16. The process of claim 1, wherein each of the first electrodes is provided already applied to the top surface of a respective one of conductive sheets, or applied to the bottom surface of a respective one of the insulating sheets;

wherein each of the second electrodes is provided already applied to the top surface of a respective one of insulating sheets, or applied to the bottom surface of a respective one of the conductive sheets; and wherein the application process is selected from the group consisting of pressing, printing, 3D printing, coating, and casting.

17. The process of claim 1, wherein said step of attaching comprises lowering a heating mold over the assembled supercapacitor stack, with the supercapacitor stack being aligned with the heating mold, the heating mold comprising:
- vertical mold inner walls defining a mold inner perimeter substantially equal to, or slightly smaller than, the outer perimeters of the dielectric frames; and
- a heating element configured to heat the mold inner walls;

wherein the mold inner walls are heated, thereby heating at least a portion of the assembled supercapacitor stack.

18. The process of claim 17, wherein the mold inner perimeter is slightly smaller than the outer perimeters of the dielectric frames of the assembled supercapacitor stack, and wherein the lowering of the heating mold trims off respective rim portions of the dielectric frames.

19. The process of claim 17, wherein the mold inner walls are heated to a temperature slightly below the thermal decomposition temperature of the dielectric material from which the dielectric frames are made.

20. The process of claim 17, wherein prior to said lowering of the heating mold, the supercapacitor stack is placed on a base top surface of a placement base, such as to be aligned therewith, the placement base having vertical sidewalls and a placement base perimeter of substantially equal dimensions to the mold inner perimeter, and wherein the base top surface includes a jig, such as to facilitate aligning the supercapacitor stack on the base top surface.

* * * * *